US010767621B2

(12) United States Patent
Karousos

(10) Patent No.: US 10,767,621 B2
(45) Date of Patent: Sep. 8, 2020

(54) SYSTEM FOR PRODUCING ENERGY VIA USE OF GRAVITY

(71) Applicant: John A. Karousos, Vienna, VA (US)

(72) Inventor: John A. Karousos, Vienna, VA (US)

(73) Assignee: Karousos LLC, Vienna, VA (US)

( * ) Notice: Subject to any disclaimer, the term of this patent is extended or adjusted under 35 U.S.C. 154(b) by 0 days.

(21) Appl. No.: 15/800,103

(22) Filed: Nov. 1, 2017

(65) Prior Publication Data

US 2018/0216598 A1   Aug. 2, 2018

Related U.S. Application Data

(63) Continuation-in-part of application No. 15/353,735, filed on Nov. 16, 2016, now Pat. No. 9,847,696.

(51) Int. Cl.
| | | |
|---|---|---|
| *F03B 17/00* | (2006.01) | |
| *H02K 7/18* | (2006.01) | |
| *F03B 13/06* | (2006.01) | |
| *F03B 7/00* | (2006.01) | |
| *F03D 9/16* | (2016.01) | |

(52) U.S. Cl.
CPC ............ *F03B 17/005* (2013.01); *F03B 7/006* (2013.01); *F03B 13/06* (2013.01); *F03D 9/16* (2016.05); *H02K 7/1807* (2013.01); *F05B 2240/40* (2013.01); *F05B 2260/403* (2013.01); *F05B 2260/504* (2013.01)

(58) Field of Classification Search
None
See application file for complete search history.

(56) References Cited

U.S. PATENT DOCUMENTS

| | | | |
|---|---|---|---|
| 483,645 | A | 10/1892 | Drake et al. |
| 538,881 | A | 5/1895 | Pink et al. |
| 3,934,964 | A | 1/1976 | Diamond |
| 4,034,565 | A | 7/1977 | McVeigh |
| 4,698,516 | A | 10/1987 | Thompson |
| 5,905,312 | A | 5/1999 | Liou |
| 6,445,078 | B1 | 9/2002 | Cieslak, Jr. |
| 6,546,726 | B1 | 4/2003 | Tomoiu |
| 6,803,670 | B2 | 10/2004 | Peloquin |
| 6,817,180 | B2 | 11/2004 | Newman |

(Continued)

FOREIGN PATENT DOCUMENTS

| | | |
|---|---|---|
| CN | 2771506 | 4/2006 |
| WO | WO 2009/120058 A1 | 10/2009 |
| WO | WO 2015/078098 A1 | 6/2015 |

OTHER PUBLICATIONS

PCT International Search Report and Written Opinion (of PCT Application related to U.S. Appl. No. 15/353,735): Int'l App. No. PCT/US2016/062370; Int'l. Filing Date of Nov. 16, 2016 (Nov. 16, 2016); 13 total pgs, dated Mar. 2, 2017, PCT.

*Primary Examiner* — Tulsidas C Patel
*Assistant Examiner* — Joseph Ortega
(74) *Attorney, Agent, or Firm* — Hoang Steve Ngo

(57) ABSTRACT

The present invention is directed to a system for producing energy via use of gravity. The system is for generating energy, and in particular electrical energy, by utilizing the abundant force of gravity that exists and then integrating such a force into a system design of energy power generation by converting the force of gravity into potential energy then into kinetic energy and from kinetic energy back into potential energy again, by using the system's autonomous methodology of fluid recycling to produce electric power generation in the process.

48 Claims, 42 Drawing Sheets

(56) References Cited

U.S. PATENT DOCUMENTS

| | | |
|---|---|---|
| 6,860,068 B2 | 3/2005 | Halloran |
| 7,134,283 B2 | 11/2006 | Villalobos |
| 7,239,037 B2 | 7/2007 | Alstot et al. |
| 7,777,359 B1 | 8/2010 | Gibson |
| 8,166,760 B2 | 5/2012 | Fiske |
| 8,344,537 B2 | 1/2013 | Angulo Valpreda et al. |
| 8,358,021 B2 | 1/2013 | Chow |
| 8,516,812 B2 | 8/2013 | Manakkattupadeettathil |
| 8,872,367 B2 | 10/2014 | Moltion |
| 2002/0194847 A1 | 12/2002 | Halloran |
| 2004/0189009 A1 | 9/2004 | Galich |
| 2005/0052028 A1 | 3/2005 | Chiang |
| 2009/0115195 A1 | 5/2009 | Wang et al. |
| 2010/0000212 A1 | 1/2010 | Snyder |
| 2010/0180587 A1 | 7/2010 | Manakkattupadeettathil |
| 2011/0074163 A1 | 3/2011 | Timcang, Sr. |
| 2011/0278855 A1 | 11/2011 | Chow |
| 2012/0119508 A1 | 5/2012 | Sparks |
| 2012/0280515 A1 | 11/2012 | Huang et al. |
| 2013/0154270 A1 | 6/2013 | Shinohara |
| 2013/0167529 A1 | 7/2013 | Camacho Munoz |
| 2013/0168970 A1 | 7/2013 | Grossman |
| 2014/0042744 A1 | 2/2014 | Daya |
| 2014/0250879 A1 | 9/2014 | Moncada |
| 2015/0130192 A1 | 5/2015 | Palani |
| 2015/0167627 A1 | 6/2015 | Villanueva, Jr. |

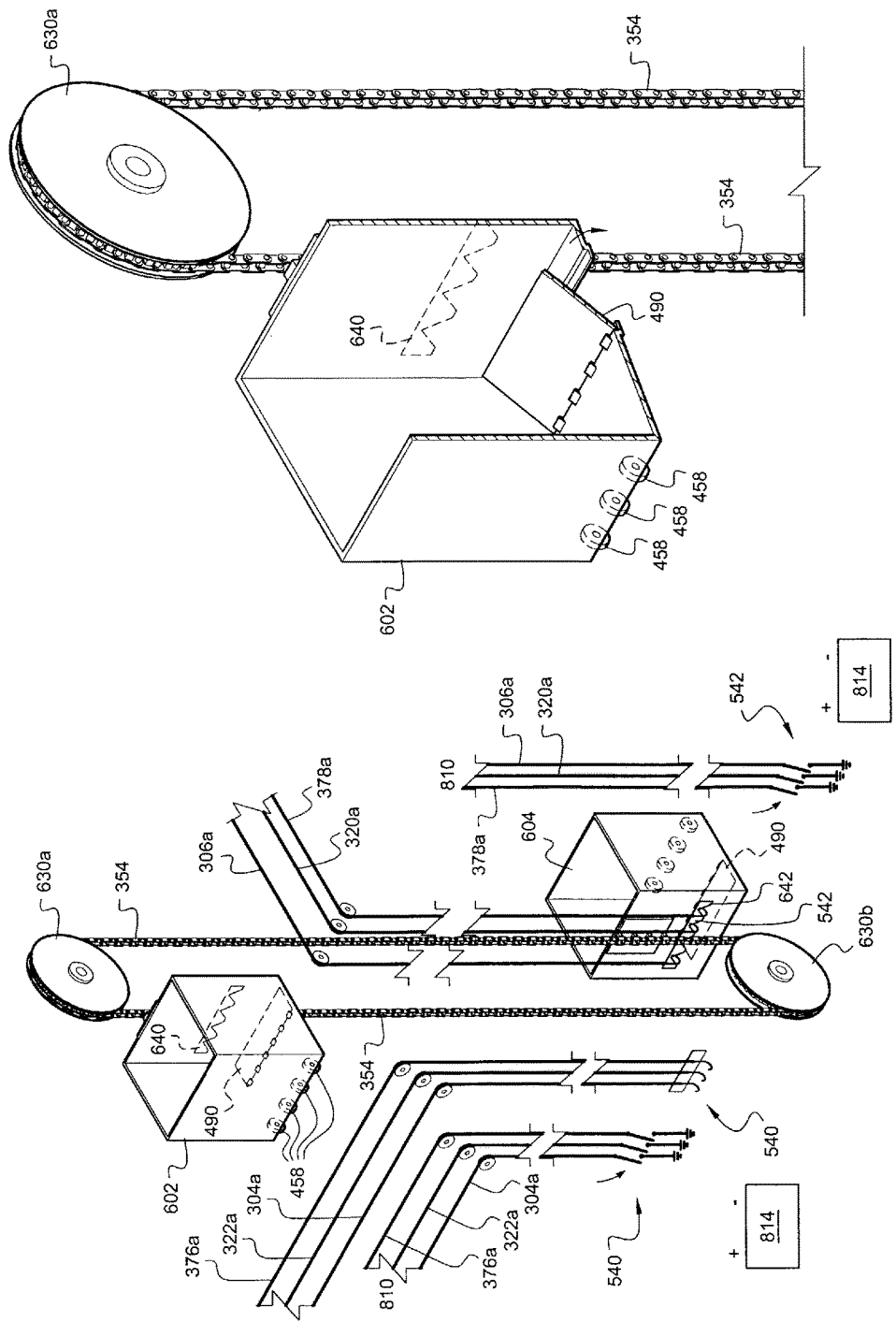

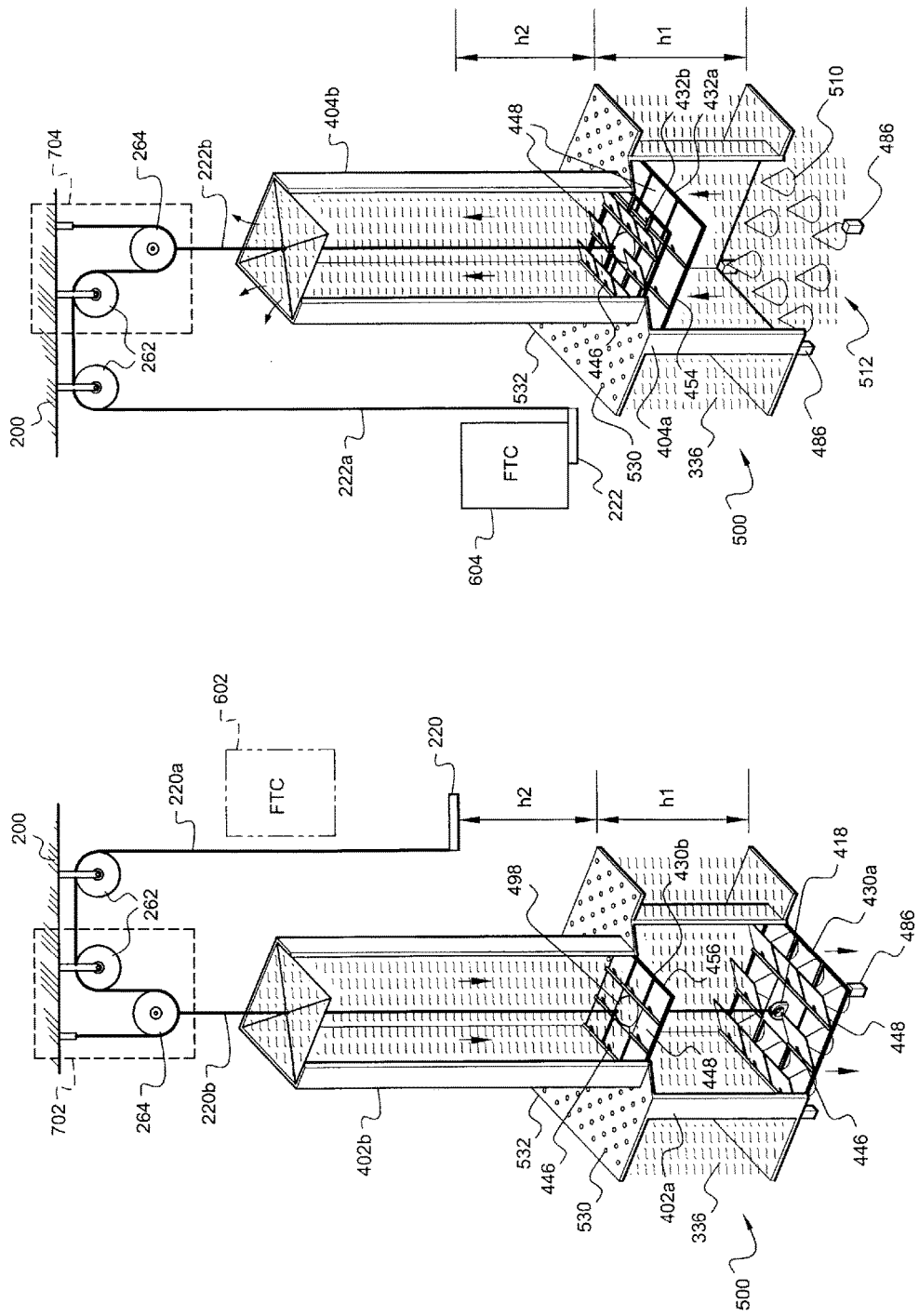

… … …

SYSTEM FOR PRODUCING ENERGY VIA USE OF GRAVITY

CROSS-REFERENCE TO RELATED APPLICATIONS

The present application is a continuation-in-part application of and claims the priority benefit of U.S. Nonprovisional patent application Ser. No. 15/353,735, filed on Nov. 16, 2016 and issued as U.S. Pat. No. 9,847,696 B2 on Dec. 19, 2017, which is a nonprovisional application of and claims the priority benefit of U.S. Provisional Patent Application Ser. No. 62/386,030, filed on Nov. 16, 2015, which are incorporated herein by reference in their entireties.

BACKGROUND OF THE INVENTION

The present invention relates generally to systems for producing energy. More specifically, the present invention is a system for producing energy via use of gravity.

DESCRIPTION OF THE RELATED ART

Many systems for producing energy, including systems for producing energy via use of gravity, are known in the art.

Many patents, published patent applications, and/or non-patent publications in the art disclose and/or show systems for producing energy.

The present invention overcomes one or more of the shortcomings of the above-described prior art. The system for producing energy via use of gravity of the present invention allows the operation of the system with the aid of a minimal amount of external energy. The Applicant is unaware of inventions or patents, taken either singly or in combination, which are seen to describe the present invention as claimed.

SUMMARY OF THE PRESENT INVENTION

The present invention, in this patent application, depicts a system for producing energy by utilizing the abundant force of gravity that exists in the Universe and in this case the gravitational field of the Earth and then integrating such a force into a system design of energy power generation by translating the force of gravity into potential energy then into kinetic energy and from kinetic energy back into potential energy again, by using the system's autonomous methodology of fluid recycling to produce electric power generation in the process. This system can operate with the aid of a minimal amount of external energy, if it is necessary to improve its efficiency. It is modular in design, and is unlimited in its expansion, fully containable in its location. It can possibly operate anywhere on Earth or another stellar body where gravity is present. A mechanical sequence is introduced in the system's operation to prolong the operational functionality of motion to its working components to the point where recycling of fluids takes place and in the process it generates power to run the system's electricity producing generators and supply electricity to the power grid.

In a first, non-limiting embodiment, the system is comprised of at least two main fluid tanks, such as an upper fluid tank or Potential Tank (PT) and a lower fluid tank or Kinetic Tank (KT), that are located vertically with respect to each other. Fluid Displacement Tanks (FDTs) are tank structures connecting the PT and KT. They are the facilitators of raising the system's fluids above the lower container KT into the upper container PT thus reintroducing the recycling of potential fluid status into the system design. In essence, they serve as the transfer media of system fluids by connecting the two said tanks PT and KT and accessing their system's fluids for further recycling into system operation. Furthermore, into its operation, the system utilizes the principles of, but not limited to, pulley systems for the providing of motion to the plurality of cables and pulleys operating the system's many gates, platforms and other system components serving in the functionality of the system's operation. A number of operating gates deprive or provide, interchangeably, fluid recycling and the process of power generation. A pairs of gear wheels between the two main tanks PT and KT are connected together by a chain or belt in a vertical rotating motion having attached to each pair wheel chain two fluid transport containers called Fluid Transport Cells (FTCs), one up on the PT resting on a sliding platform and the other down below resting on the bottom tank platform (KTP). The FTCs facilitate the potential descent of system fluids and contribute to the rotation of both gear wheels of which the bottom gear wheel will provide rotation, through a drive shaft to an electric generator (EG) and supply electricity to the grid for the duration of its descent. The upper tank PT has structural extensions to its shape in order to carry the potential fluid to the system's working components. Such extensions are called fluid feeding bays (FFB). The bottom tank platform (KTP) has perforations to allow the return of the fluid back into KT to aid in the closing loop of the recycling system fluid process and the initiation of a new cycling process. Descending FTCs will engage the next Multiple Energy Producing Unit (MEPU). Sliding platforms called Fluid Transport Cell Release Platform (FTCRP) located on the potential tank facilitated the hold in place and release functions of the fluid transport cells (FTCs). Another set of emergency platforms called Fluid Transport Cell Emergency platform (FTCEP) facilitate the emergency lock in place of the fluid transport cells (FTCs) in an emergency shut-off condition. System cables converge on a platform located on the kinetic tank platform called Strike Point Contact Junction (SPCJ) where the corresponding descending FTC engage or disengage, with their engaging bracket (EB), the cables of the system's working gates and platforms. Pulley systems called Lift Assembly of Desired Mechanical Advantage (LADMA) provide the lifting power to Door Platform Assembly (DPA) systems located within the fluid displacement tanks (FDT) to elevate the system's fluids within the FDTs back up onto the potential tank and thus completing the fluid recycling process. The system of the present invention is comprised by an expendable number of MEPUs in accordance to the desired size of a particular system design. Each MEPU is made-up of having two FFBs. Each one of the two FFBs has within it one emergency gate (Gx), one fluid regulating gate (Gr), and one fluid ejection gate (Gx) with their associated cables attach on to them. The Gx cable is to be deployed only in the event of a system emergency. It is always tense by keeping the Gx always elevated. The other end of the cables associated with the Gr and Ge are looped to the corresponding SPCJ located on the KTP.

Each FTC is associated with its corresponding FTCRP on the PT, and each FTC is associated with its corresponding Lift Door Cones (LDC) located on the top of the KTP. Each MEPU is comprised of two FDTs with their associated functioning components. The main goal of each MEPU is to drive one or more EG to supply power to the electric grid. The characteristic of this MEPU system design is that after each MEPU has completed one full cycle of motion it comes into a temporary rest in order to reset its system fluids and components and be ready for the next full cycle. At the same time, it triggers the adjacent MEPU to perform the same functions and the next one and so on until we reach the last MEPU in the system whereby it will trigger motion automatically again on the original MEPU and restart this motion process which is inherent to the system by its designed "Mechanical Sequence" or it "Electromechanical Sequence".

With regard to a second, non-limiting embodiment, the system is substantially the same as the system of the first, non-limiting embodiment, except for the addition of a lever mechanism(s), which is/are another optional force multiplier system that could be introduced into our system design in a way that each corresponding lever mechanism will work in conjunction with our system's corresponding LADMA in order to better enhance the fluid lift force of the system through the corresponding FDT and therefore enhance our system's recycling efficiency.

BRIEF DESCRIPTION OF THE DRAWINGS

FIG. 14 is a schematic diagram that depicts the relationship between the system's Fluid Transport Cells (FTC), their placement in relation to their Gear Chain (GC) on its Motor Gear Wheels Assembly (MGWA), and its corresponding Strike Point Contact Junction (SPCJ) of one MEPU in the "Mechanical Mode" or "Electromechanical Mode" of operation of a first, non-limiting embodiment of a system;

FIG. 15 is a schematic diagram showing a cross section of the Fluid Transport Cell (FTC) with its Lift Door, its External Wheels, its corresponding Motor Gear Wheel Assembly (MGWA), as well as its associated mounted Engaging Bracket, of a first, non-limiting embodiment of a system;

FIG. 16 is a schematic diagram of the cross-section area of the left Fluid Displacement Tanks (FDT), of one MEPU, with its associated Sub Surface Tank (SST) and Upper Surface Tank (UST), the positioning of their Door Platform Assembly (DPA) and its Between Tank Door Assembly (BTDA) in relationship to FDT inner structure, the mechanical advantage assembly, Lift Assembly of Desired Mechanical Advantage (LADMA) and associated pulleys and cables, its FTC unit, its positioning between the PT and KT as they all come together to operate in accordance with the principles specified in the present application of a first, non-limiting embodiment of a system;

FIG. 17 is a schematic diagram of the cross-section area of the right Fluid Displacement Tank (FDT) of one MEPU and its associated components which are the same as those described in FIG. 16 above, of a first, non-limiting embodiment of a system. Both of FIGS. 16 and 17 comprise the two FDTs associated with each MEPU in the system;

DETAILED DESCRIPTION OF THE PREFERRED EMBODIMENTS

Figure 1:
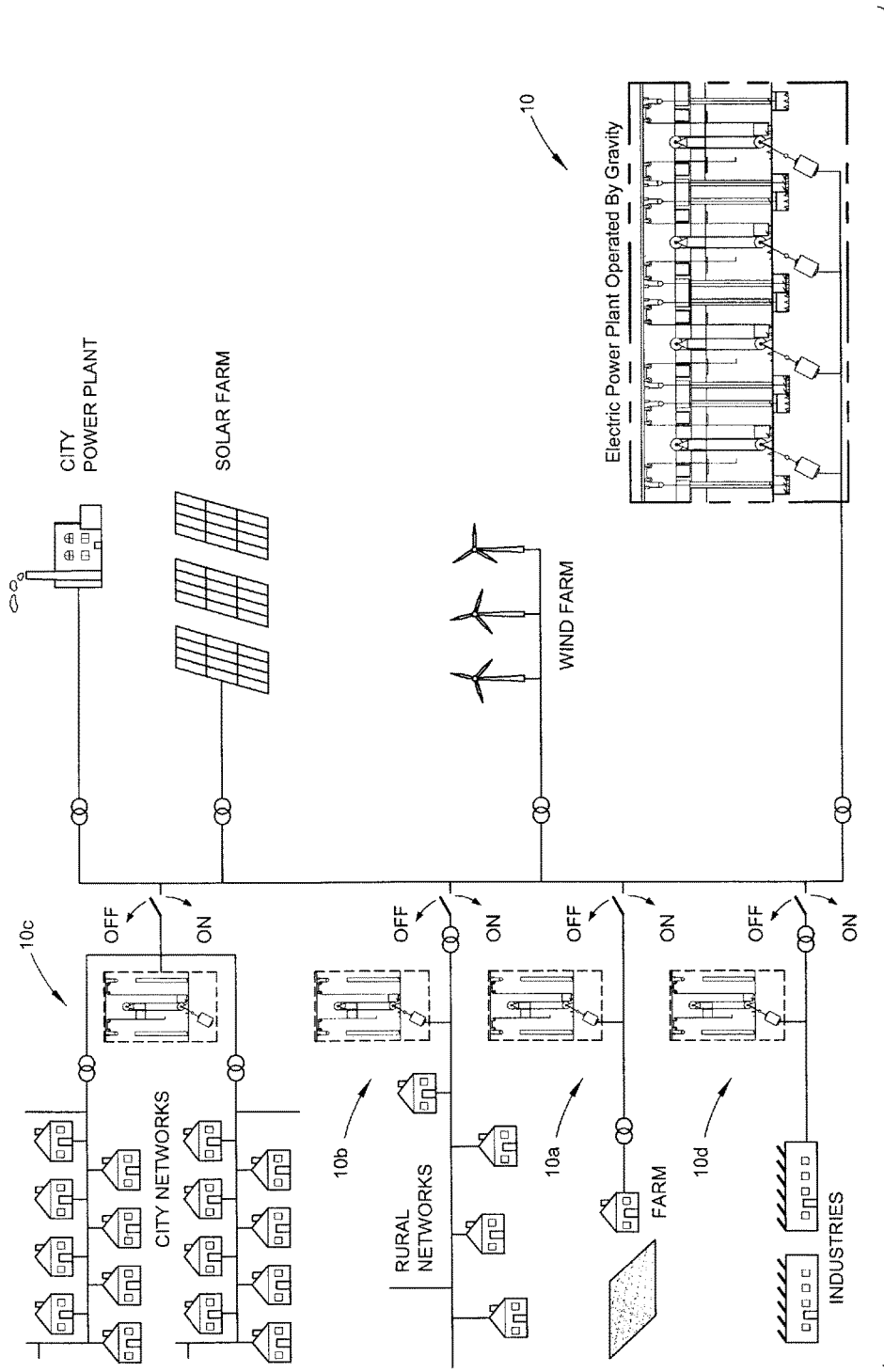
FIG. 1 is a general schematic diagram of a first, non-limiting embodiment of a system for producing energy via use of gravity according to the present invention, wherein the present invention as it relates to its contribution of providing electricity to the electric power grid similar to today's electric power plants, like solar, wind, coal, nuclear being among them. It also depicts the system of the present invention unique characteristics of providing electricity to consumers at the local levels. For example, an entire city can be taken off the grid and be powered independently by the system of the present invention. This can be further scaled down to rural networks, industries and individual farms or houses. Unlike the traditional electric power plants that require long distance transmission power lines to carry their electricity over to consumers, the system of the present invention, because of its flexibility and modularity, can be built next to the user(s)

The present invention depicts a system 10,100 for producing energy via use of gravity, such as, but not limited to, a power plant. The system 10,100 is for generating energy, and in particular electrical energy, by utilizing the abundant force of gravity that exists in the Universe and, in this case, the gravitational field of the Earth and then integrating such a force into a system design of energy power generation by converting the force of gravity into potential energy then into kinetic energy and from kinetic energy back into potential energy again, by using the system's autonomous methodology of fluid recycling to produce electric power generation in the process. System 100 is substantially the same as system 10, except for the addition of a lever mechanism(s) LM, which is/are another optional force multiplier system that could be introduced into our system design in a way that each corresponding LM will work in conjunction with our system's corresponding LADMA 702-716 in order to better enhance the fluid lift force of the system through the corresponding FDT (402a, 402b)-(416a, 416b) and therefore enhance our system's recycling efficiency.

This system 10,100 can produce green and renewable energy, electric energy, and can operate with the aid of a minimal amount of external energy.

In describing a first, non-limiting embodiment and as shown in FIGS. 1-19, the system 10 is comprised of, but not limited to, the following main sections and system components:

(1) Pulley Support Assembly (PSA) 200 (see FIGS. 2, 3, 4A, 5A, 6A, 6B, 13A, 13B, 18 and 19);

(2) Potential Tank (PT) 300 (see FIGS. 2, 3, 4A, 4B, 5B, 6A, 6B, 13A and 13B);

(3) Fluid Displacement Tank(s) (FDT) 402a, 402b to 416a, 416b (see FIGS. 2, 3, 4A, 4B, 5A, 5B, 6A, 13A, 16, 17 and 19);

(4) Kinetic Tank (KT) 500 (see FIGS. 2, 3, 4A, 4B, 4C, 5A, 5B, 16, and 17);

(5) Motor Gear Wheel Assembly (MGWA) 630a,630b to 636a,636b (see FIGS. 2, 3, 4A, 5A, 6A, 6B, 14, 15 and 18);

(6) Lift Assembly of Desired Mechanical Advantage (LADMA) 702-716 (see FIGS. 2, 3, 4A, 4B, 5A, 5B, 6A, 6B, 9, 10, 16, and 17); and (7) Electric Generator(s) (EG) 910-916 (see FIGS. 2, 3, 6A, 6B, 7 and 8).

Pulley Support Assembly (PSA) 200

The PSA 200 is the structure which supports the Fixed Pulleys (FP) 262, the Movable Pulleys (MP) 264, and the cables, such as 220a, 302a, 304a, 320a, 322a, as they are directly engaged in the creation of motion in the operation of most of the system's moving components, such as 302, 304, 320 (see FIGS. 2, 3, 4A, 4C, 5B, 6A, and 6B). Specifically, it supplies the system 10 with the following pulleys and cables as they pertain to the operation of:

(1) Lift Assembly of Desired Mechanical Advantage (LADMA) 702, 704, 706, 708, 710, 712, 714 and 716 (see FIGS. 2, 3, 4A, 9, 10, 16 and 17) comprising:

Kinetic Energy Cable(s) (KEC) 220a, 222a, 224a, 226a, 228a, 230a, 232a and 234a are part of the system's (LADMA) 702-716 (see FIGS. 2, 3, 4A, 4B, 5A, 16, and 17), Kinetic Energy Strike Platform (KESP) 220, 222, 224, 226, 228, 230, 232 and 234 (see FIGS. 2, 3, 4A, 4B, 5B, 16 and 17), and Lift Cables (LC) 220b, 222b, 224b, 226b, 228b, 230b, 232b, and 234b;

(2) Fluid Emergency Shut-off Gate Cables (Gxa) 302a;

(3) Fluid Regulating Gate Cables(s) (Gra) 304a, 306a, 308a, 310a, 312a, 314a, 316a, and 318a; and (4) Fluid Ejection Gate Cables(s) (Gea) 320a, 322a, 324a, 326a, 328a, 330a, 332a and 334a.

Figure 9:
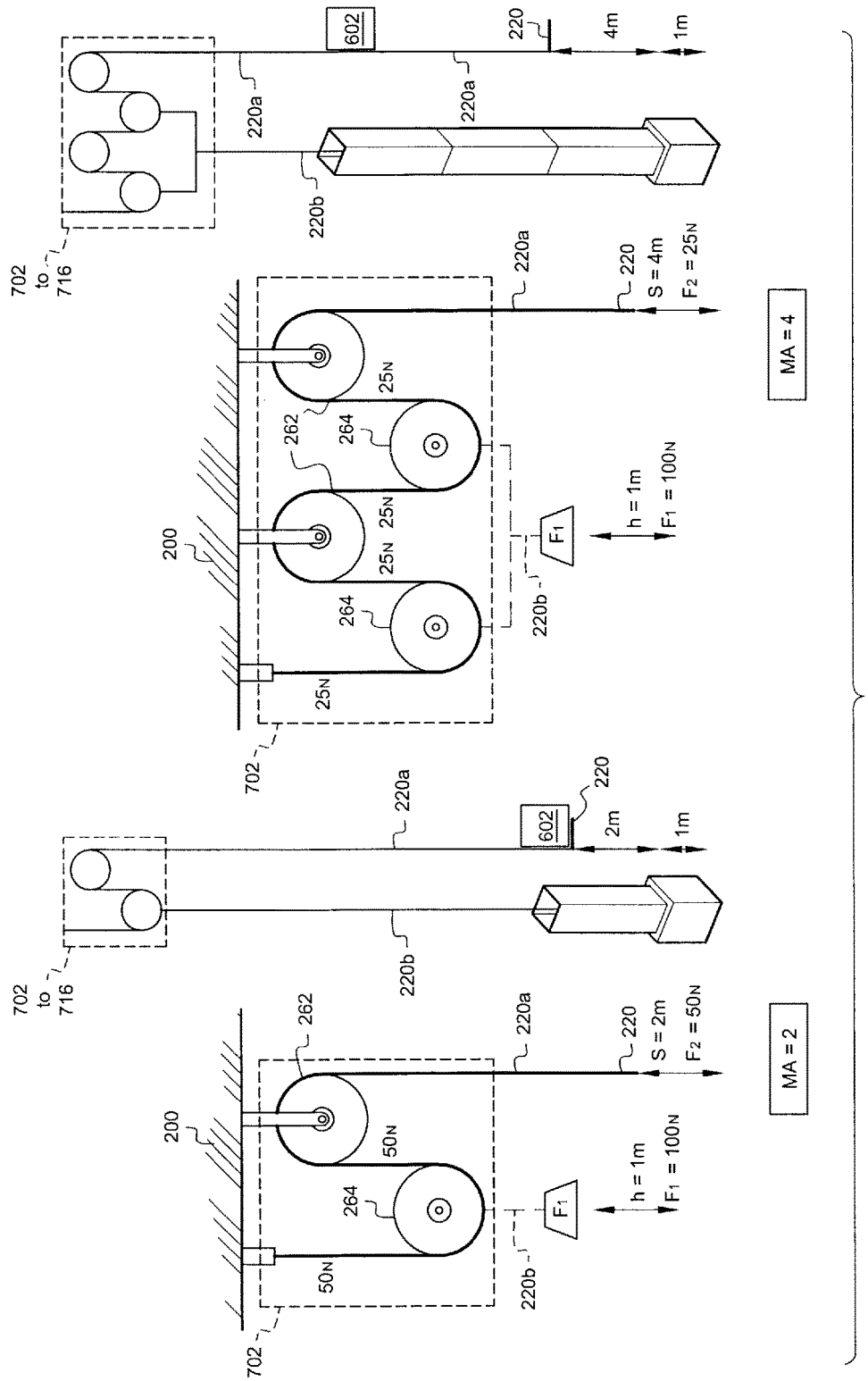
FIG. 9 shows the principle difference between the two pulley systems of a first, non-limiting embodiment of a system. One having a Mechanical Advantage (MA) of MA=2 and the other having a Mechanical Advantage of MA=4. It also shows how the difference in the Mechanical Advantage can increase the separation between the main two tanks, namely upper or Potential Tank (PT) and lower or Kinetic Tank (KT). In the MA=4 pulley system design, the system can achieve three times the distance separation between the PT and the KT than previously achieved by the use of the MA=2 pulley system design.
Figure 10:
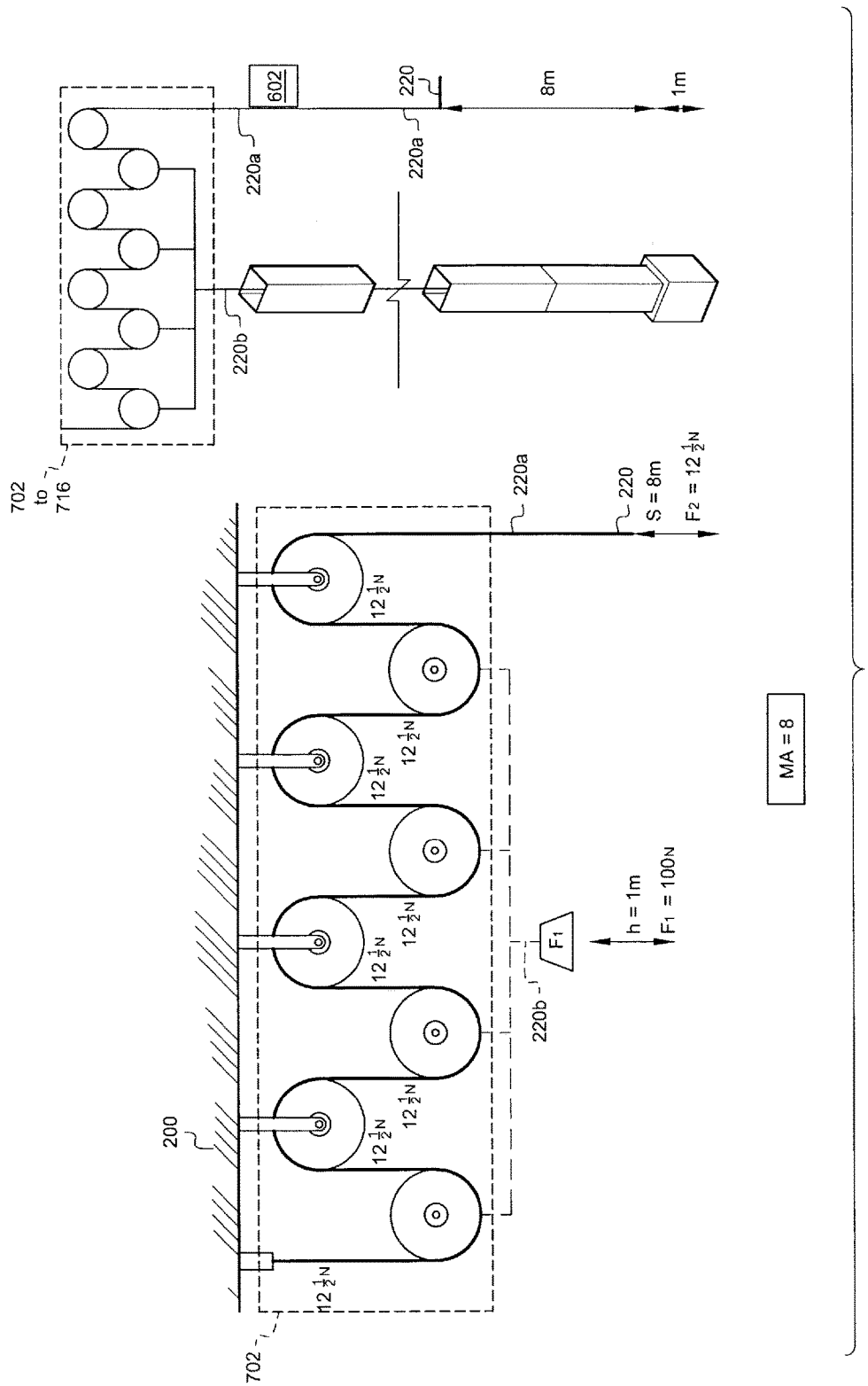
FIG. 10 shows the principles of a pulley system of a first, non-limiting embodiment of a system having a Mechanical Advantage of MA=8 which in translation can give us seven times the separation between the PT and the KT than that in the MA=2 pulley system design.

Lift Assembly of Desired Mechanical Advantage (LADMA) 702, 704, 706, 708, 710, 712, 714 and 716 (see FIGS. 2, 3, 4A, 9, and 10) plays a major role in the operation of our system 10. It facilitates, in conjunction with the Fluid Displacement Tanks (FDT) (402a, 402b)-(416a, 416b) the uplift of potential fluid (PF) 336 to potential heights by transferring such fluids, through the Fluid Displacement Tanks (FDT) (402a, 402b)-(416a, 416b) media from inside the KT 500 back on to the PT 300 thus aiding in the upward fluid recycling process throughout the system. The LADMA 702-716 could make the use of different pulley systems as indicated in FIGS. 9 and 10 in its place if a Mechanical Advantage (MA), MA=2 or MA=4 or MA=8 and so on is desired to be used in any given system design. It should be noted that the higher the MA is the higher the vertical separation could be achieved between the KT 500 and the PT 300 and therefore the higher the potential and kinetic energy of the system. A higher MA will contribute to a higher uplift force. This is because we can lift more PF 336 with less force as we will see below. However, the system could also utilize other fluid lifting mechanisms and techniques that may be available to achieve the same resolve under the same claim criteria governing the scope of this submitted application. For example, hydraulics, being a force multiplier, is another method of uplifting fluids and a viable option in the uplift of PF 336 in our system's design. In order to better understand the guiding principles of the present application, we will use, throughout this patent application, a LADMA with a MA=2. As we see in FIG. 9 that MA=2 is comprised of two pulleys. One pulley is fixed, FP 262 and the other pulley is movable, MP 264 which facilitates the lift of the load. Archimedes principle of pulleys states that in an MA=2 pulley system configuration we can lift twice the load (weight) attached to its lift cable LC 220b-234b by a distance of one unit length by simply applying half of the lift force (weight) to its pulling cable, Kinetic Energy Cable (KEC) 220a-234a and by simply pulling this cable twice the length distance of the weight uplifted distance of its corresponding LC 220b-234b (see FIG. 9). In translation, we can lift 100 kilograms (100 kg×9.81N=981N) of force (weight) attached to the LC 220b-234b one meter high by applying a force of 50 kilograms (50 kg×9.81N=490N) to the KEC 220a-234a and pulling it down the distance of two meters. In the case where an MA=4 pulley system configuration is desired, we utilize two movable pulleys MP 264 and two fixed pulleys FP 262. We can then lift 100 kilograms (981N) of weight attached to the LC 220b-234b one meter high by simply applying a force (weight) of 25 kilograms (245N) to the corresponding KEC 220a-234a and pulling it four meters down in length (see FIG. 9). In the case where a MA=8 pulley system configuration is desired we utilize four movable pulleys MP 264 and four fixed pulleys FP 262. We can then lift 100 kilograms (981N) of weight attached to the LC 220b-234b one meter high by simply applying a force of 12.5 kilograms (123N) to the KEC 220a-234a and pulling it eight meters down in length (see FIG. 10). In implementing the pulley principles of work in our design, we consider the weight to be lifted by the Door Platform Assembly (DPA) 430a-444a, through the use of its lift cable (LC) 220b-234b, to be represented by the summation of the PF 336 within each pair of the corresponding FDTs (402a, 402b)-(416a, 416b). PF 336 within the Sub Surface Tanks (SST) 402a-416a and the Upper Surface Tanks (UST) 402b-416b are located above the Door Platform Assembly (DPA) 430a-444a, and they represent the weight to be lifted by the corresponding LADMA 702-716. The force that pulls the cable is represented by the corresponding descending Fluid Transport Cell (FTC) 602-616 which strikes the corresponding KESP 220-234 and pulls it down the corresponding distance (see FIGS. 2, 9, 10, 16, and 17).

Each LADMA 702-716 is comprised, but not limited, to one each of the following components:

Kinetic Energy Strike Platform (KESP) 220, 222, 224, 226, 228, 230, 232 and 234 (see FIGS. 2, 3, 5B, 16 and 17) are the platforms that are attached to the end of each of the system's KEC 220a-234a. They facilitate the descent and ascent of their corresponding Kinetic Energy Cables (KEC) 220a-234a, and their corresponding Lift Cables (LC) 220b-234b, respectively. The KESP 220-234 will set in motion the mechanism of its corresponding LADMA 702-716 when its KESP 220-234 is stricken by its corresponding Fluid Transport Cell (FTC) 602-616 such that it will lift the load attached to its corresponding LC 220b-234b and pull the distance length its corresponding KEC 220a-234a with its weight as discussed above.

Kinetic Energy Cable(s) (KEC) 220a, 222a, 224a, 226a, 228a, 230a, 232a and 234a are part of the system's LADMA 702-716 (see FIGS. 2, 3, 5B, 9, 10, 16, and 17). One end of the KEC 220a-234a is attached on to PSA 200. The cable loops around the movable pulley (MP) 264 then around its fixed pulley (FP) 262 and attaches to its corresponding KESP 220-234 on the opposite end. When the corresponding FTC 602-616 strikes its corresponding KESP 220-234, the corresponding KEC 220a-234a is pulled the distance length thus causing the corresponding Lift Cables (LC) 220b-234b to lift its load in accordance with the system's desired mechanical advantage (MA) principles, in this case MA=2.

Lift Cables (LC) 220b, 222b, 224b, 226b, 228b, 230b, 232b, and 234b are part of the system's LADMA 702-716 (see FIGS. 2, 3, 5A, 5B, 16, and 17). They facilitate the uplift or descent of their corresponding Door Platform Assembly (DPA) 430a-444a which are located inside their corresponding Sub Surface Tank(s) (SST) 402a-416a of the (FDT) (402a, 402b)-(416a, 416b). Each (LC) 220b-234b on one end, is attached to the (MP) 264 and on the other end is attached to the Door Platform Assembly Lift Ring (DPALR) 418 of the corresponding (DPA) 430a-444a.

LADMA Operation

In order to put together and better understand the mechanics of the LADMA 702-716, we summarize its composition and function as follows: FIGS. 16 and 17 show the cross section area of FDT 402a and 402b pair and FDT 404a and 404b pair of (LADMA) 702 and (LADMA) 704, respectively. FIG. 16 shows that when there is no tension on KESP 220 by FTC 602, corresponding KEC 220a and LC 220b are not at tension and corresponding DPA 430a settles to the bottom of the KT 500 resting on the Lift Door Cones (LDC) 510. The LC 220b and 222b, like the rest of the LC 220b-234b extends from their respective MP 264 through the Beehive Dome (BHD) 498 onto the DPA 430a and 432a, respectively, and tie onto their Door Platform Assembly Lift Ring (DPALR) 418. At this point the KESP 220 sits at a height, h2 above the Kinetic Tank Platform (KTP) 532 which height is twice that of the height of SST 402a or h1. Therefore, we have h2=2h1. Conversely, FIG. 17 shows that when tension is placed onto KESP 222, by the falling FTC 604, KEC 222a and LC 222b are in a state of tension KESP 222 pulls KEC 222a by a distance of h2 which in turn pulls LC 222b by a distance h1 that is half the h2 distance and in turn lifts up DPA 432a and displaces the PF 336 from inside SST 404a into UST 404b and in turn displaces the PF 336 that is already in the UST 404b onto the PT 300 thus moving at least the same amount of PF 336 displaced onto PT 300 as the amount of PF 336 ejected by the FTC 604 onto KTP 532.

Fluid Emergency Shut-off Gate Cables (Gxa) 302a, are the cables attached to their corresponding Emergency Shut-Off Gates (Gx) 302. They secure the gates in the OPEN position throughout the operation of the system only to be deployed in an emergency system shut-off condition where they fall and shut-off the PF 336 from entering the corresponding Fluid Feeding Bay (FFB) 338-352. With the aid of their pulleys the cables extend and are secured tight on to the Anchor Point (AP) 590 on the Kinetic Tank Platform (KTP) 532 (see FIGS. 4A, and 5B).

Fluid Regulating Gate Cables(s) (Gra) 304a, 306a, 308a, 310a, 312a, 314a, 316a, and 318a are the cables that are attached, on one end, to their corresponding Fluid Regulating Gates (Gr) 304-318 and on the other end they extend all the way to their corresponding Strike Point Contact Junction (SPCJ) 540-554. There they will be engaged at tension, upon contact, by their corresponding descending FTC 602-616 that will cause the uplift of its corresponding Fluid Regulating Gate (Gr) 304-318 (gate OPEN) or release from tension, and shut-off close the same Gr 304-318 (gate CLOSED) by the ascend of the same corresponding FTC 602-616. These actions will facilitate the vertical ascending and descending motion of their corresponding Fluid regulating Gates (Gr) 304-318 in an OPEN and CLOSED condition, wherein OPEN denotes fluid is allowed to pass through the Gr 304-318, and CLOSED denotes fluid is stopped passing through the Gr 304-318, as they engaged throughout the operation of the system (see FIGS. 2, 4B, 5B, 6A, 6B, 13A and 13B).

Fluid Ejection Gate Cables(s) (Gea) 320a, 322a, 324a, 326a, 328a, 330a, 332a and 334a are the cables that are attached, on one end, to their corresponding Fluid Ejection Gates (Ge) 320-334 and on the other end they extend all the way to their corresponding Strike Point Contact Junction (SPCJ) 540-554. There they will be engaged at tension, upon contact, by their corresponding descending FTC 602-616 that will cause the uplift of their corresponding Fluid Ejection Gate (Ge) 320-334 (gate OPEN) or released from tension, and shut-off close the same Ge 320-334 upon ascend, by the same corresponding FTC 602-616. These actions will facilitate the vertical rise and descending motion of their corresponding Fluid Ejection Gates (Ge) 320-334 in an OPEN and CLOSED position, wherein OPEN denotes fluid is ejected into corresponding FTC 602-616 and Ge 320-334 while CLOSED denotes fluid is stopped flowing into the same FTC 602-616, as they operate throughout the system (see FIGS. 3, 4A, 5A, 5B, 6A, 6B, 13A and 13B).

Potential Tank (PT) 300

The Potential Tank (PT), or upper fluid tank, 300, the top container, is to provide and harbor the potential fluid PF 336 of the system 10 and offer a physical path of accessibility to these fluids through the tank's media paths in the fluid recycling process by which these fluids will systematically be allowed to access and engage the various moving working system components which create the operating force of motion to such an energy generating power plant. The PT 300 is of desired dimensions and shape. It is located directly above the KT 500 and it could be open at its top (see FIGS. 2, 3, 4A, 4B, 4C, 5A and 5B).

The physical characteristics and components of the PT 300 are but not limited, to the following:

Potential Fluid (PF) 336 is the fluid throughout the entire system, in the: PT 300; KT 500; FTC 602-616; FDT (402a, 402b)-(416a, 416b) which is responsible for the operation and the main transfer of motion to the system's moving components. This PF 336 with its weight converts or translates the weak force of the Earth's gravitational field, or of that of any other stellar body, into a strong potential energy and then into kinetic energy and from kinetic energy back into potential energy again in a fluid recycling process. Our energy source, being gravity, as such has no substantial mass and therefore requires a receptor to lock on to and translate gravity into mass in motion. This receptor which is our PF 336 will translate gravity's, low matter substance, into a real potential and kinetic energy source. Our PF 336 therefore, is what gives our system, in translation, the required kinetic energy fuel to power in operation our system 10. It is important to mention that although solids could possibly be used as receptors to translate gravity into potential energy and then into kinetic energy and from kinetic energy back into potential energy again and so on, we chose our system's receptor to be a state of fluid source because it can be easily manipulated to change its shape into the shape of its hosting container(s). This will, through the process and technique of FLUID VOLUME DISPLACEMENT, provide our electric power plant system with the required recycling fluid capability of fluid uplift to higher elevation through the use of our designed FLUID DISPLACEMENT TANKS (FDT) (402*a*, 402*d*)-(416*a*, 416*b*) along with their corresponding LADMA 702-716 (see FIGS. 2, 4A, 4B, 5B, 6A, 6B, 16 and 17).

Fluid Feeding Bays (FFB) 338, 340, 342, 344, 346, 348, 350 and 352 are physical outward bay extensions of the perimeter walls of the PT 300 extending outward of the main perimeter of the PT 300 wall formation as a continuous part of the PT 300 in order to carry the potential fluid PF 336 to a distance away from the main perimeter wall of the PT 300 for a more efficient distribution of the Potential Fluids PF 336 in our system's operation. From there the PF 336 will be ready, when called upon, to be transferred into the corresponding Fluid Transport Cell (FTC) 602-616. This PF 336 transfers from the FFB 338-352 into its corresponding FTC 602-616 through its corresponding Ge 320-334 will contribute and facilitate the system's downward controlled fluid transfer that will provide the required energy force, torque, to operate the system's Electric Generators (EG) 910-916 that will, in turn, provide electricity to the grid (see FIGS. 2, 4B, 5B, 6A, 6B, 13A and 13B).

Motor Gear Wheel Platform (MGWP) 360 are the platform bases for the spinning Motor Gear Wheels (MGW) 630*a*, 632*a*, 634*a* and 636*a* which are mounted on the top of the PT 300. This platform like the FFB 338-352 and Fluid Return Bay (FRB) 370 follow the same extension path. They extend outward of the main perimeter of the PT 300 wall formations in a way as to make possible their alignment with their corresponding FFB 338-352, Ge 320-334, Gr 304-318, FTC 602-616, UST 402*b*-416*b*, FTCRP 372-386, FTCEP 240-254 and SPCJ 540-554 (see FIGS. 2, 4A, 4B, 5B, 6A, 6B, 13A and 13B).

Fluid Return Bays (FRB) 370 they are part of the PT 300 and like the FFB 338-352 extend outward of the PT 300 main wall formations. This will help bring in alignment the Upper Surface Tanks (UST) 402*b*-416*b* with its corresponding FFB 338-352, Ge 320-334, Gr 304-318, FTC 602-616, UST 402*b*-416*b*, FTCRP 372-386, FTCEP 240-254 and SPCJ 540-554 (see FIGS. 2, 4A, 4B, 5B, 6A, 6B, 13A and 13B).

Fluid Emergency Shut-Off Gates (Gx) 302 are normally OPEN gates that are located on the PT 300 side of the FFB 338-352 and will maintain their OPEN status position throughout the operation of the plant. They will be activated in an emergency situation that will force the denial of PF 336 access to its affected FFB 338-352 by the anomaly FFB 338-352 (see FIGS. 4A, 4B, 5A, 5B, 6A, 6B, and 13A).

Fluid Regulating Gates (Gr) 304, 306, 308, 310, 312, 314, 316 and 318 are the gates involved in an upward and downward motion, in a constantly alternating OPEN or CLOSED position, during the operation of the plant. On one hand, they are designed to regulate the content volume of Potential Fluid PF 336 in each of the corresponding FFBs 338-352, in a way that makes it equal to the PF 336 volume required to feed in to each corresponding FTC 602-616. On the other hand, they serve as temporary shut-off gates to prevent PF 336 excess into their corresponding FFB 338-352 when their corresponding Potential Fluid Ejection Gates Ge 320-334 are in the open position during PF 336 transfers into their corresponding FTC 602-616 (see FIGS. 4A, 4B, 5A, 5B, 6A, 6B and 13A and 13B).

Fluid Ejection Gates (Ge) 320, 322, 324, 326, 328, 330, 332 and 334 are the gates involved in an upward and downward motion in a constantly alternating OPEN or CLOSED position, during the operation of the plant. Their function is to eject the PF 336 into their corresponding FTC 602-616 and set the FTC 602-616 to Potential Status. The other function they serve is to prevent the PF 336 from escaping from the PT 300 when their corresponding Gr 304-318 are in the open position during system operation (see FIGS. 2, 3, 4A, 4B, 5B, 6A, 6B, 13A and 13B).

Fluid Transport Cell Release Platform(s) (FTCRP) 372, 374, 376, 378, 380, 382, 384 and 386 are the platforms that provide the means of temporary support to potential heights on the upper tank PT 300 and release from this potential height position to descent their corresponding FTCs 602-616 as they are designed to operate in an upward and downward motion throughout the operation of our plant. They also serve to stabilize the same corresponding FTCs 606-616 and lock them in place, upon their return from the KTP 532 to potential state position on the PT 300 in an ever recycling process once again. All FTCRPs 372-386 (see FIG. 12) are comprised of: a) an External Frame (EF) 496 that mounts the entire platform underneath each one of their corresponding FFBs, 338-352; b) Platform Springs (PS) 494 that facilitate with their spring action the back and forth motion of their Inner Frame Platform (IFP) 492 and Pivoting Platform (PP) 488 which PP 488 is an extension of its IFP 492; c) the Inner Frame Platform (IFP) 492 is designed to pull in or snap out their corresponding PP 488 from their corresponding FTCRPs, 372-386 External Frame (EF) 496 when its corresponding Fluid Transport Cell Release Platform Cable (FTCRPC) 372*a*-386*a* is engaged or disengaged, respectively, by its corresponding descending FTC 602-616 at their corresponding SPCJ 540-554. This will make possible the release to descend, and upon the return, the lock in place position of their corresponding FTCs, 602-616; d) the Pivoting Platform (PP) 488 is attached to its IFP 492 in a way that it will flip upwards by about 90 degrees when the corresponding FTC 602-616 makes its way up and contact with it, passes over it while lifting it up. The PP 488 will then snap back to its original position and the corresponding FTC 602-616, empty at this point of PF 336, will come to rest upon it. Each PP 488 has a groove that extends from one end to the other, sideways, called Fluid Transport Cell Wheel Rest Groove (FTCWRG) 452 that facilitates the easy release and rest action of their corresponding FTCs, 602-616. This is where the External Wheels (EW) 458 of the corresponding FTC 602-616 come to rest upon the snap back action of the PP 488. Each PP 488 has a Kinetic Energy Cable Pass Through Gap (KECPTG) 450 that allows their corresponding KEC 220*a*-234*a* to continue undisturbed and connect to their corresponding KESP 220-234 (see FIGS. 2, 4A, 6A, 6B, 12, 13A, 13B, 14, and 15).

Fluid Transport Cell Release Platform Cable(s) (FTCRPC) 372*a*, 374*a*, 376*a*, 378*a*, 380*a*, 382*a*, 384*a* and 386*a* are the cables attached on one end to their corresponding Inner Frame Platform (IFP) 492 of their corresponding FTCRPs, 372-386 and on the opposite end they extend all the way to the top of the KTP 532 at their corresponding Strike Point Contact Junction (SPCJ) 540-554 where they become part component of the SPCJ 540-554 in accordance to our system design. When the corresponding FTC 602-616, upon its descent, strikes its corresponding SPCJ 540-554, it will pull the corresponding FTCRPC 372*a*-386*a* and in turn it will cause to pull in its corresponding IFP 492 and PP 488 of its corresponding FTCRP 372-386 thus releasing to descent its resting upon it corresponding FTC 602-616.

We will call this upon release an OPEN position. Then upon release of contact pressure at the SPCJ 540-554 by its corresponding ascending FTC 602-616 it will release pressure on its corresponding FTCRPC 372a-386a thus it will cause the corresponding IFP 492 and PP 488 or their corresponding FTCRPC 372-386 to snap out therefore setting the condition to receive and rest upon it the empty of fluid at this time ascending FTC 602-616. We will call this a CLOSE position. We will describe this operation in more detail in our "Mechanical Sequence" mode of operation (see FIGS. 5B, 6A, 6B, 12 and 13B).

Fluid Transport Cell Emergency Platform(s) (FTCEP) 240, 242, 244, 246, 248, 250, 252 and 254 these platforms operate the same way as the FTCRP 372-386 and they adhere to the same OPEN and CLOSED principles. However, their connecting cables (FTCEPC) 240a-254a are secured on the KTP 532 with tension, into OPEN position at Anchor Point Fluid Transport Cell Emergency Platform (APFTCEP) 240b, 242b, 244b, 246b, 248b, 250b, 252b and 254b. Furthermore, they are always open, never engaging their corresponding FTC 602-616 unless, there is a system emergency situation that requires their deployment to engage the FTC 602-616 and stop system motion or in another case that requires to shut-off the system for maintenance. However, there is one exception to this rule that requires one of the emergency platforms (FTCEP) 240-254 to be at the CLOSED position where it will engage and support at potential status and heights on the top tank PT 300 one of the FTC 602-616. This could preferably be FTCEP 240 and its corresponding FTC 602 upon and before system initiation of system motion or sort of speak at system start-up at time t=0. We will describe this operation in more detail in our "Mechanical Sequence" mode of operation (see FIGS. 6A, 6B, 11, and 13A).

Figure 11:
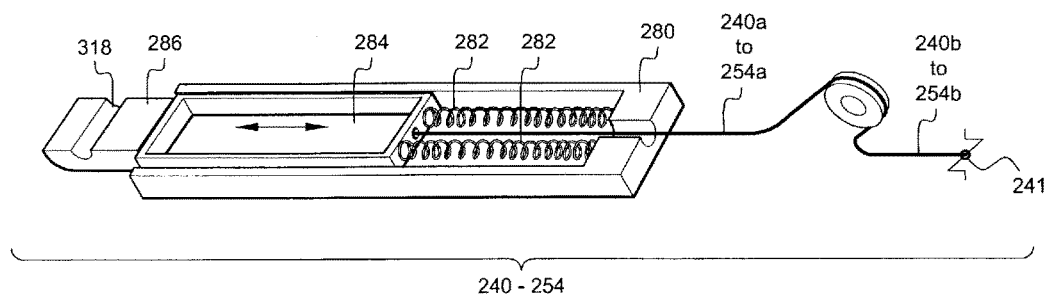
FIG. 11 shows a sliding platform, namely Fluid Transport Cell Emergency Platform (FTCEP) that initiates system operation, when the system is at steady state, of a first, non-limiting embodiment of a system of producing energy via use of gravity according to the present invention. It also makes its use to interrupt system operation in an emergency situation and prevent system damage.
Figure 12:
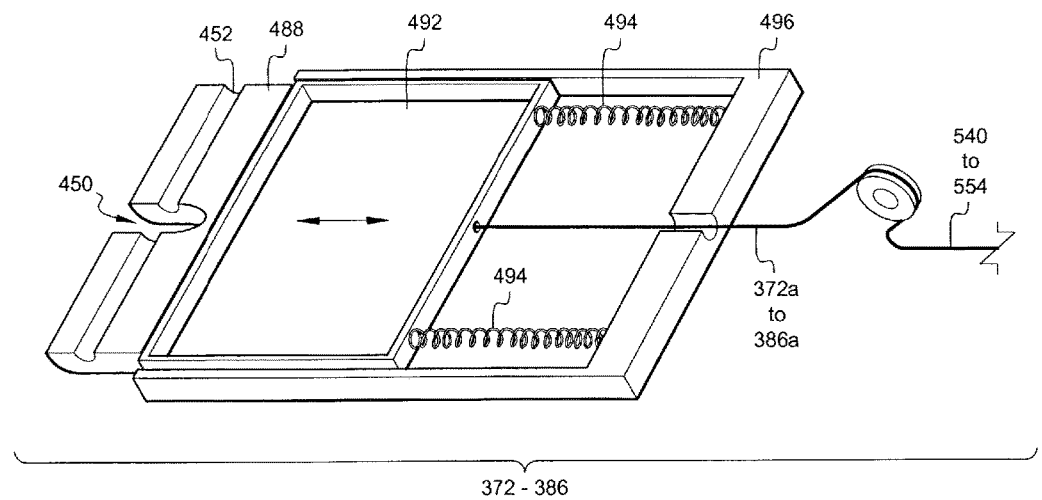
FIG. 12 shows a sliding platform, namely Fluid Transport Cell Release Platform (FTCRP) which makes possible the lock and hold to potential status and then the release from potential status the system's fluid transport cells (FTC), of a first, non-limiting embodiment of a system of producing energy via use of gravity according to the present invention. It is a major contributor of our system's timing motion to its working components and a vital facilitator in implementing the system's "Mechanical Sequence" and "Electromechanical Sequence" mechanisms.

As best shown in FIG. 11, the FTCEP 240, 242, 244, 246, 248, 250, 252 and 254 consist of the following components: a) an External Frame Emergency Platform (EFEP) 280 that houses all of it working components and also mounts its frame underneath the corresponding FFB 338-352 like the FTCRP 372-386; b) Emergency Platform Springs (EPS) 282 that facilitate with their spring action the back and forth motion of their respective Inner Frame Emergency Platform (IFEP) 284 which is designed to keep tense the Pivoting Emergency Platform (PEP) 286 inside the EFEP 280 until such a time it needs to be deployed and stop the systems motion by demobilizing its correspondent FTC 602-616; c) Pivoting Emergency Platform (PEP) 286 will undergo almost a 90 degree flip before its corresponding FTC 602-616 comes to rest upon it for as long as it would take to do the appropriate repairs. The FTCEPs are always tense in the OPEN position always retracted within the confines of their EFEP 280 only to be deployed in an emergency situation to stop the system motion by engaging and supporting upon them and for as long as it takes for the repairs to be completed their corresponding FTC 602-616. In this emergency deployment, tension to its corresponding Fluid Transport Cell Emergency Platform Cable (FTCEPC) 240a-254a will be released and the FTCEP 240-254 will obtain a CLOSED position and the system will stop its operation (see FIGS. 2, 3, 5B, 6A, 6B, 13A, and 13B). As shown in FIGS. 4A, 4B, 6A, 6B and 11, once the system 10 is ready to be re-initiated and its motion processes is ready to be continued after an operation stoppage, then the corresponding FTCEP where the operation stoppage occurred will be deployed by a power source 241 back to its initial start-up position (tense in the OPEN position), t=0.

Fluid Transport Cell Emergency Platform Cable (FT-CEPC) 240a, 242a, 244a, 246a, 248a, 250a, 252a and 254a are the cables that provide constant tension, and hold constantly at OPEN position their corresponding FTCEP 240-254 throughout the operation of the system. They will be released from tension only to be deployed in an emergency situation thus putting the FTCEP 240-254 at CLOSED position. This means that the FTCEP 240-254 not been at tension will snap-out of its EFEP 280 and extended outside the physical walls of its corresponding FFB 338-352 thus ready to engage the upcoming corresponding FTC 602-616 and deprive the system from any further operation (see FIGS. 6A, 6B, 11, 13A, and 13B).

Motor Gear Wheel Platform (MGWP) 360 are the platforms, part of the PT 300 where the top Motor Gear Wheels (MGW) 630a, 632a, 634a and 636a are resting upon (see FIGS. 2, 3, 4A, and 5B).

Motor Gear Wheels (MGW) 630a, 630b; 632a, 632b; 634a, 634b; 636a and 636b are pairs of spinning wheels positioned vertically with respect to one another. One wheel of each pair rests on the top of the PT 300. Their base of support is called Motor Gear Wheel Platform (MGWP) 360 (see FIGS. 2, 3, 4A, and 4B). The wheels resting on the top of the MGWP 360 are: 630a, 632a, 634a and 636a (see FIGS. 2, 3, 4A, and 4B). The corresponding bottom four MGW 630b, 632b, 634b and 636b are mounted on the top the KTP 532. The corresponding top and bottom wheels form linked pairs which are linked together by a Gear Chain (GC) 354 in a vertical rotating motion. They can also use any other type of connecting media like a belt that links them together similar to the gears of a bicycle. The top MGW 630a-636a can serve as free spinning wheels while the bottom wheels mounted on the KTP 532 can serve as the torque or energy generating wheel that provide torque motion to power their respective Electric Generators (EG) 910, 912, 914, 916 (see FIGS. 2, 6A, and 6B). These generators will supply electricity to the electric grid.

Motor Gear Wheel Assembly (MGWA) (630a, 630b); (632a, 632b); (634a, 634b); (636a, 636b) there are four MGWP 360 on the top tank PT 300 that are associated with this plant design. Each one of the four MGWP 360 provides the base support to its corresponding MGW 630a, 632a, 634a and 636a. Directly below these four MGWP 360 are four more spinning motor gear wheels (MGW) 630b, 632b, 634b, 636b secured on the top of the KTP 532 with each one of them associated directly with their corresponding MGW 630a, 632a, 634a, 636a above respectively. A form of a bike like chain called Gear Chain (GC) 354 is wrapped around each Motor Gear Wheel Pair, (630a, 630b); (632a, 632b); (634a, 634b) and (636a, 636b). Connected to each one of the four Gear Chains (GC) 354 at point Fluid Transport Cell/Gear Chain Mounting Point (FTC/GCMP) 368 (see FIGS. 13A and 13B) is a pair of Fluid Transport Cells (FTC) (602, 604); (606, 608); (610, 612) and (614, 616). These pairs are positioned vertically opposite with respect to each other on the same GC 354 (see FIG. 14). While one FTC 602, 606, 610, 614 is resting on the top of the corresponding FTCRP 372-386 its other corresponding FTC 604, 608, 612, 616 of the pair respectively, is resting right below on the top of the KTP 532 (see FIGS. 2, 6A, and 6B). They both are part of the same MGWA (630a, 630b)-(636a, 636b) and subscribe to the same principles of vertical motion. In summation, each one of the four total MGWA (630a, 630b)-(636a, 636b) in this system design is comprised of: a) a pair of MGW, (630a, 630b); (632a, 632b); (634a, 634b) and (636a, 636b); b) a Gear Chain (GC) 354 of each pair that wraps around them like the chain of a bicycle wheel and c) a pair of FTC (602, 604); (606, 608); (610, 612) and (614, 616) (see FIGS. 2, 3, 4B, 4B, 6A, 6B, and 14). Behind each FTC 602-616 on the GC 354 side are mounted the Engaging Brackets (EB) 640, 642, 644, 646, 648, 650, 652, 654 (see FIGS. 6A, 6B, 13A, 13B, 14, and 15). Their primary function is to engage the corresponding cables of: Gra 304a-318a; Gea 320a-334a and FTCRP 372-386 and maybe other cables, if needed to synchronize the operation of the system. This will be described below.

FLUID DISPLACEMENT TANKS (FDTs) (402a, 402b); (404a, 404b); (406a, 406b); (408a, 408b); (410a, 410b); (412a, 412b); (414a, 414b) and (416a, 416b) The Fluid Displacement Tanks (FDTs) (402a, 402b); (404a, 404b); (406a, 406b); (408a, 408b); (410a, 410b); (412a, 412b); (414a, 414b) and (416a, 416b) (see FIGS. 2, 3, 13A, 16, and 17) are open ended tank pair structures connecting the system's main tanks, upper fluid tank so called Potential Tank (PT) 300 and lower fluid tank so called Kinetic Tank (KT) 500. They provide interconnectivity for potential fluid (PF) 336 transfers, exchange and cyclamen in an upward direction cycles during the operation of the system. All tank pairs of the system FDT (402a, 402b); (404a, 404b); (406a, 406b); (408a, 408b); (410a, 410b); (412a, 412b); (414a, 414b) and (416a, 416b) have the same characteristics and functionality. This unique and novel subsystem component, introduced in this system design by itself, will facilitates with its inner design mechanism the fluid displacement technique which will make possible the elevation of potential fluids (PF) 336, within the system, to be lifted to a higher potential elevation or state, that is from the bottom or lower fluid tank (KT) 500 on to the upper fluid tank (PT) 300 and also maintain these fluids at this elevated potential height throughout the operation of the system. Because the fluids have the characteristic of taking the shape of their hosting container it makes it easier then to manipulate the shape of our FDT (402a, 402b)-(416a, 416b) to our advantage in designing a better and more advance system. In this application, we will consider our FDT (402a, 402b)-(416a, 416b) to be of a rectangular shape although other geometric shapes containers could be used in its design, such as, but not limited to, a cylindrical shape. However, this along could not be achieved without the aid of another important subsystem component which is associated and works directly in conjunction with each of the system's FDT (402, 402b)-(416a, 416b). This subsystem is called Lift Assembly of Desired Mechanical Advantage (LADMA) 702, 704, 706, 708, 710, 712, 714, 716 and it will facilitate the elevating force in our system design to uplift its PF 336 to potential heights by transferring such fluids, through the FDT (402a, 402b)-(416a, 416b) inner media, from the bottom fluid tank (KT) 500 onto the top fluid tank (PT) 300 thus aiding in the upward fluid recycling process. This will account for 50% of the system's recycling process. Fluid within each Fluid Displacement Tank (FDT) (402a, 402b)-(416a, 416b) will undergo a volume shape transformation first upon PF 336 lift by displacing the fluid from the wider, but lesser in height, bottom part of the Fluid Displacement Tank (FDT) 402a-416a into the equal in volume but taller in height and thinner in shape upper part of the FDT 402b-416b. The lifted fluid from the bottom section of the FDT 402a-416a will displace the fluid in the upper section of the FDT 402b-416b and the already fluid in the upper section of the FDT 402b-416b will be ejected into the PT 300. This process will be cyclical throughout the operation of the system 10 and it will constantly elevate to the upper fluid tank 300 at least the same amount of fluid as it is discharged on the lower fluid tank 500 by the system's descending FTC 602-616. It should be noted however, that they are not limited to any of these pre-given characteristics and that they will be subject to change if the system 10 needs to be improved or be redesigned with the passage of time (see FIGS. 2, 3, 5B, 16, and 17).

This subsystem component, FDTs (402a, 402b); (404a, 404b); (406a, 406b); (408a, 408b); (410a, 410b); (412a, 412b); (414a, 414b) and (416a, 416b), is comprised, but not limited, to the following:

Sub Surface Tank (SST) 402a, 404a, 406a, 408a, 410a, 412a, 414a and 416a are the bottom tanks of the open ended tan pairs, and for this presentation we will considered them to be of cubical geometric shape, located inside the bottom fluid tank (KT) 500. They are open on the side facing the inner bottom floor of the KT 500 called Kinetic Tank Bottom (KTB) 512. On the opposite side of the same tank they converge open and connected to the base side of the stocked up, open ended, elongated rectangular tanks called Upper Surface Tank (UST) 402b-416b (see FIGS. 2, 16, and 17). Between them at the two tank point connection, we have the Between Tank Door Assembly (BTDA) 430b-444b designed to prevent the backflow of PF 336 from the UST 402b-416b back into the SST 402a-416a (see FIGS. 2, 16, and 17). The SST 402a-416a are separated from the KTB 512 by a number of Sub Surface Tank Spacers (SSTS) 486. The SSTs 402a, 404a, 406a, 408a, 410a, 412a, 414a and 416a are always submerged in PF 336 because the KT 500 is always full of PF 336 all the way up to and just below the Kinetic Tank Platform (KTP) 532 (see FIGS. 2, 3, 5B, 6B, 13A, 16).

Upper Surface Tanks (UST) 402b, 404b, 406b, 408b, 410b, 412b, 414b and 416b are the upper sections of the (FDT) (402a, 402b)-(416a, 416b) tank pairs. They pass through and above the KTP 532, continue up the way and through the floor of the upper fluid tank (PT) 300 to end up above the PF 336 level of the PT 300 at a place behind the walls of the fluid return bay (FRB) 370. These tanks, and for this presentation, will be of a rectangular geometric shape. However, they can be of any other shape if desired, such as, but not limited, a cylindrical shape. They are shaped in a way that the height side of their rectangle is much larger than the length and width sides of their rectangle. However, the PF 336 volume is the same in both tanks, SST 402a-416a and UST 402b-416b for a MA=2 system design. This is very important because the upper rectangular tanks (UST) 402b-416b are giving us the capability and the advantage to elevate our PF 336 to Potential Height, through the use of the LADMA 702, 704, 706, 708, 710, 712, 714, 716 subsystem mechanism which works in conjunction with our FDT (402a, 402b)-(416a, 416b). This artificial height manipulation of PF 336 transfer increases the height distance between the main two fluid bearing tanks (KT) 500 and the (PT) 300 thus increasing the system's Potential and Kinetic Energies. Both tanks, SST 402a-416a and UST 402b-416b are always full with PF 336 because they are set to full fluid condition at the system start-up or steady state, although the UST 402b-416b do not need to be filled with fluid PF 336 at system startup. We do not have a back flowing of PF 336 into SST 402a-416a from the UST 402b-416b. This is because we have installed, at the junction point between the two tank pairs the Between Tank Door Assembly (BTDA) 430b-444b (see FIGS. 2, 16, and 17). Its function is described below.

Fluid Displacement Tank Pairs (FDTP) (402a, 402b); (404a, 404b); (406a, 406b); (408a, 408b); (410a, 410b); (412a, 412b); (414a, 414b) and (416a, 416b) are two section tank pair structures with their bottom sections (SST) 402a-416a been of different geometric shape than their corresponding top sections (UST) 402b-416b. However, both of these sections are of equal volume. These two open ended tanks are connected together and stocked up vertically with respect to each other. For reasons of simplicity and in an attempt to better understand the system's working characteristics, calculations and reasoning, let us assume that the bottom tanks (SST) 406a-416a have a cubical geometric shape. This means that all three dimensions of the tank are equal, Length L=Width W=Height H. On the other hand, the top tanks (UST) 406b-416b, are of rectangular geometric shape with noticeably elongated on the side of height but noticeably shorter in length and width (see FIGS. 2, 3, 4A, 5B, 13A, 13B, 16, and 17).

Door Platform Assembly (DPA), 430a, 432a, 434a, 436a, 438a, 440a, 442a and 444a contain a number of little doors that makeup these platform shaped door assemblies. This movable platform serves a very important function in the operation of our Electric Power Generation Plant design. It consists of: a) a Square Frame (SF) 454 of the size to make possible its upward and downward motion but provide also a tight fit inside the SST 402a-416a; b) attached to the SF 454, in a form of a grid, is an array of vertically swinging open and close Little Doors (LD) 448. They are designed to operate like horizontally placed doors, that will open upward upon DPA 430a-444a descent and allow PF 336 into the SST, 402a-416a from the existing PF, 336 inside the bottom fluid tank (KT) 500 once, upon their descent, they reach the bottom part of the SST 402a-416a and their LD 448 come in contact with their corresponding Lift Door Cones (LDC) 510. The LD 448 will shut-off closed upon DPA 430a-444a upward lift by pushing the already PF 336 from inside the SST 402a-416a through the BTDA 430b-444b up into its corresponding UST 402b-416b which of cause will displace the already existing PF 336 in the UST 402b-416b onto the PT 300; c) part of the SF 454 and behind each LD 448 we have placed a type of an angle door opening regulator so called: Little Door Angle Stopper (LDAS) 446. This is designed to regulate the angle opening tilt, swing, of the LD 448 to the point where it will prevent any of the LD 448 from getting stock in the open position during system operation; d) attached to the center of the SF 454 is the Door Platform Assembly Lift Ring (DPALR) 418 and attached to the DPALR 418 is the corresponding lift cable (LC) 220b-234b that passes through the Beehive Dome (BHD) 498 of the corresponding BTDA 430b-444b to facilitate the upward and downward movement of DPA 430a-444a and its carrying PF 336. The BHD 498 is designed to prevent PF 336 backflow into the SST 402a-416a at the point where the LC 220b-234b is passing through the corresponding BTDA 430b-444b (see FIGS. 2, 3, 5B, 13A, 16, and 17).

Between Tank Door Assembly (BTDA) 430b, 432b, 434b, 436b, 438b, 440b, 442b and 444b is a smaller shaped door assembly than the previous larger and movable DPA 430a-444a. This stationary fixed between tanks platform serves an important function in the operation of this power plant design. It consists of: a) a Rectangular Frame (RF) 456; b) attached to the Rectangular Frame (RF), 456 in a form of a grid is an array of vertically swing open and close Little Doors (LD) 448 similar to those found in the DPA 430a-444a. They are designed to open in an upward swing; c) part of the RF 456 and behind each LD 448 we have placed a type of an angle door opening regulator so called Little Door Angle Stopper (LDAS) 446. This is designed to regulate the angle opening tilt, swing, of the LD 448 to the point where it will prevent any of the LD 448 from getting stock in an open position during system operation; d) attached to the center of the RF 446 is the Beehive Dome (BHD) 498 where the corresponding LC 220b-234b passes through. The BHD 498 provides a tight fit to the passing through corresponding LC 220b-234b to prevent backflow of PF 336 to the lower fluid tank (SST) 402a-416a (see FIGS. 2, 3, 5A, 13A, 16, and 17).

Kinetic Tank (KT) 500

The bottom fluid tank (KT) 500 is a fluid bearing tank or container. It is one of the two main system tanks PT 300 and KT 500. It harbors a large quantity of the system PF 336 as well it houses all of the system's SSTs 402a-446a and pulleys that guyed the FTCRPC 372a-386a to their corresponding SPCJ 540-554 (see FIGS. 6A, and 6B). It is located at the bottom part, directly below the PT 300 of our plan design and it is covered by its platform called Kinetic Tank Platform (KTP) 532.

Kinetic Tank Platform (KTP) 532 is the platform covering the KT 500 and is considered to be the system's working platform where most of the equipment and human activity takes place. For example, the electric motors, electric generators, transmission line facilities, system controls, bottom gear wheels (BGW) 630b, 632b, 634b, 636b, SPCJ 540-554 and so many other units are located on the KTP 532. The KTP 532 has also a unique characteristic. It is designed to have many Kinetic Tank Platform Floor Perforations (KTPFP) 530 on its floor basin that serve as returns of the ejected Potential Fluid (PF) 336 from the descending and full of PF 336 FTC 602-616 back into the KT 500 (closed loop system). On the top of the KTP 532 rest the Lift Door Cones (LDC), 510 that lift the Fluid Transport Cell Inner Door (FTCID) 490 of their corresponding FTC 602-616 once the FTCID 490 comes in contact with its corresponding LDC 510. Gravity will take over and will lift the FTCID 490 of their respective FTC 602-616 which in turn it empties its PF 336 contents, back onto the KTP 532 and then through the KTPFP 530 back into the KT 500. Next to the Lift Door Corns (LDC) 510 are the Fluid Transport Cell Stoppers (FTCS) 520 that the FTC 606-616 come to rest upon once they have ejected their PF 336 onto the KTP 532 (see FIGS. 2, and 3).

The Anatomy of the Inner Part of the KT 500 on the bottom floor inside the KT 500 rest the system's SSTs 402a-416a. They are supported on the top of pedestals called Sub Surface Tank Spacers (SSTS) 486 thus leaving some space between the SST 402a-416a and the bottom floor of the KT 500. On the floor bottom area and directly underneath each SST 402a-416a are a number of LDC 510 required to engage in the open position the LD 448 of their corresponding DPA 430a-444a. Above the LDC 510 rests their corresponding LD 448 of their corresponding DPA 430a-444a and in this contact position they maintain the SST 402a-416a with PF 336 full at all time. We also have inside the KT 500 a number of fixed pulleys FP 262 mounted to its floor bottom that guide and connect the FTCRPC 372a-386a to its corresponding FTCRP 372-386 at one end, and to the corresponding SPCJ 540-554 at the other end by passing through KTPFP 530 (see FIGS. 2, 3, 4A, and 5B).

Fluid Transport Cell (FTC) 602, 604, 606, 608, 610,612, 614, 616 are the system's fluid carrier containers of controlled fluid descent and the power givers of motion to the system's Electric Generators (EG) 910, 912, 914, 916 and the system's working components. They transport the potential fluid (PF) 336 of the system from the top fluid tank (PT) 300 to the bottom fluid tank (KT) 500. PF 336 ejection from inside the FTC 602-616 is facilitated by the Fluid Transport Cell Inner Door (FTCID) 490 which is located on the bottom section of the FTC 602-616 and it can only be opened inward when it comes in contact with its corresponding Lift Door Cones (LDC) 510 which is located on the KTP 532 and aligned to lift the FTCID 490 open, with the aid of gravity, upon contact pressure. The FTCID 490 will shut-off closed when its FTC 602-616 ascends, empty of PF 336, from the KTP 532 towards the PT 300 on the next system cycle (see FIGS. 2, 3, 14, and 15). The system's FTCs 602-616 form FTC pairs: (602, 604); (606, 608); (610, 612) and (614, 616), four pairs in total for this system design, as shown in FIGS. 2, 3, 4A, 4B, 5A, 5B, 6A, 6B, 14, and 15. As we can see from these figures each FTC (602, 604)-(614, 616) pairs is associated with their corresponding MGW (630a, 630b)-(636a, 636b) pairs of their corresponding MGWA respectively. Each one of these corresponding FTC (602, 604)-(614, 616) pairs are positioned vertically and opposite with respect to each other. While one FTC 602, 606, 610, 614 of the pair is resting on top of its corresponding FTCRP 372-386 the other FTC 604, 608, 612, 616 of the pair is resting on top of the KTP 532. The FTC (602, 604)-(614, 616) pairs are designed for a vertical motion operation, up and down forcing into motion their corresponding MGW (630a-630b)-(636a-636b) pairs respectively. A form of a bike like chain called Gear Chain (GC) 354 is wrapped around each MGW (630a, 630b)-(636a, 636b) pair. Mounted on each of the four GC 354 at the point of Fluid Transport Cell/to Gear Chain Mounting Point, FTC/GCMP 368 are the FTC (602, 604)-(614, 616) pairs placed as outlined above. On each chain pair the elevated (top) FTC 602, 606, 610 and 614, at system start-up or at so called t=0, are full of PF 336 and ready to initiate their descent. Therefore, they are at Potential Status at this time. The bottom FTC 604, 608, 612 and 616 are empty. Having exhausted their Kinetic Energy upon descent driving their corresponding EG 910-916 are now resting empty of PF 336 on the top of the KTP 532. They have empty their PF 336 on the KTP 532 because their FTCID 490 has engaged the LDC 510 and have discharged their PF 336 on to the KTP 532 which in turn, through the KTPFP 530 have allowed the PF 336 to return back in to KT 500 through the KTPFP 530. At this point, as we will see further down, we have achieved full fluid recycling. The sizes of the FTC 602-616 are preferably the same throughout the system. However, it can vary by each design or by adding flexibility to change the size of the cell as needed. It should be noted that in this system design the volume of PF 336 in the FTCs 602-616 will be the same as the fluid volume in the Sub Surface Tank (SST) 402a-416a, Upper Surface Tanks (UST) 402b-416b and FFB 338-352. All these four tanks have the same volume in this MA=2 system design. However, this can change as we will see below (see FIGS. 2, 3, 4A, 4B, 5A, 5B, 16, and 17). All FTC 602-616 have an inner opening door (FTCID) 490 (see FIGS. 2, 3, 14, and 15). It is located at the bottom side of each FTC 602-616 and opens inward, preferably, for the purpose of ejecting the PF 336 on to the KTP 532 by engaging the LDC 510 structures located on the surface of the KTP 532 to lift the corresponding FTCID 490 up, by the aid of gravity, and eject the content fluid on to the surface of the KTP 532 where the PF 336 will then enter into the KT 500 through the KTPFP 530. Engaging Brackets (EB) 640-654 are also mounted on their corresponding FTC 602-616 as described above (see FIGS. 2, 3, 5A, 4A, 4B, 6A, 6B, 14, and 15). It should be noted also that the size of the FTC 602-616 in the system design has also to do with the output capacity of the system. That is, the larger the FTC 602-616 and its corresponding FDT (402a,402b)-(416a, 416b), the larger the capacity of the system would be.

Figure 13A:
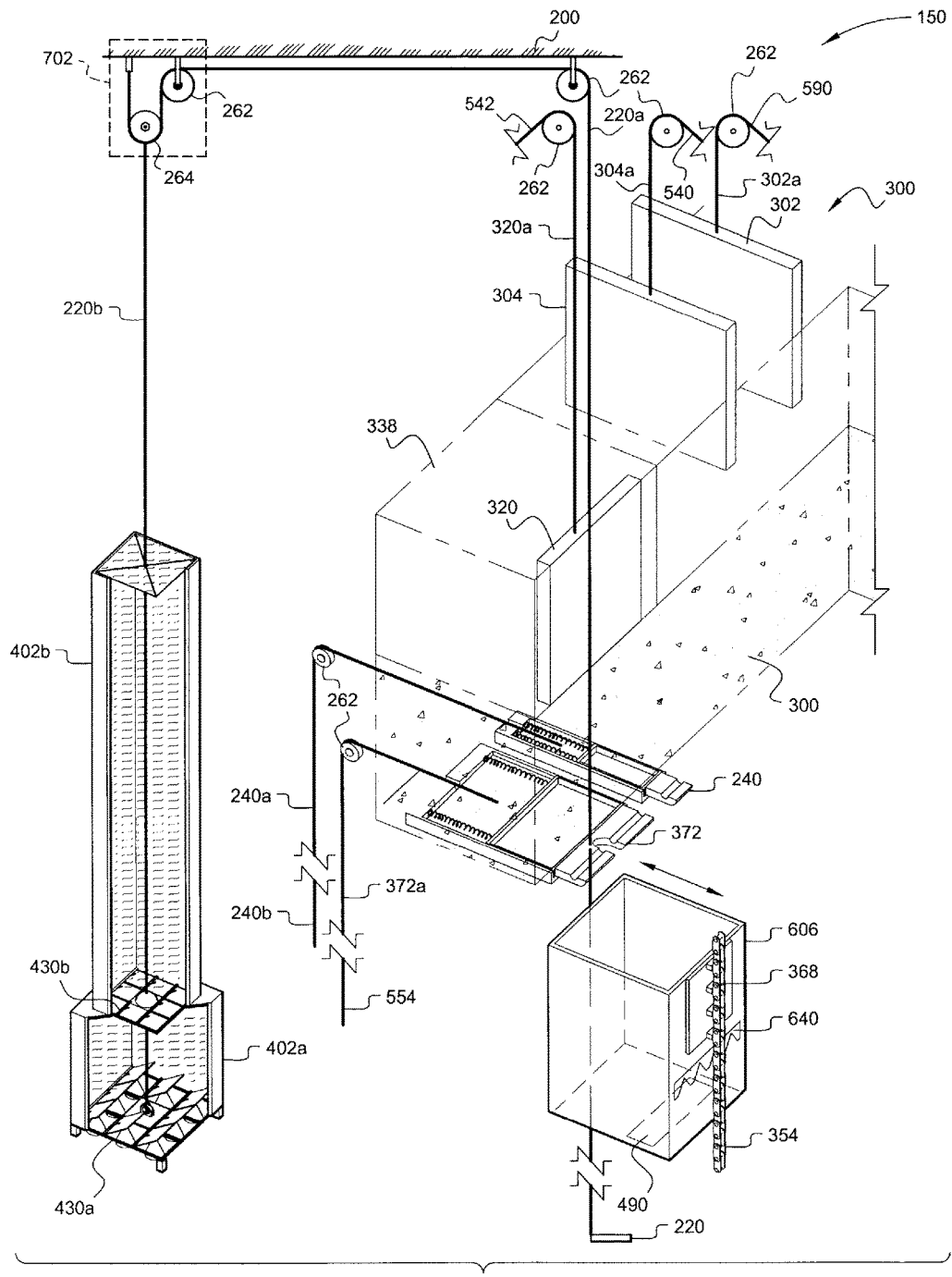
FIG. 13A is a zoom-in drawing which depicts the components associated with the left half side of one MEPU, excluding its Motor Gear Wheel Assembly (MGWA), of a first, non-limiting embodiment of a system. It shows the relationship among its Fluid Feeding Bays (FFB) with its enclosed operating gates (Ejection Gate, Fluid Regulating Gate, and Emergency Shut-Off Gate), as well as its corresponding Fluid Transport Cell Emergency Platform (FTCEP), its Fluid Transport Cell Release Platform (FTCRP), its Fluid Transport Cell (FTC), its Fluid Displacement Tanks (FDT), along with their internal and external mechanism of fluid lift and the associated pulleys and cables in the "Mechanical Mode" of operation.
Figure 13B:
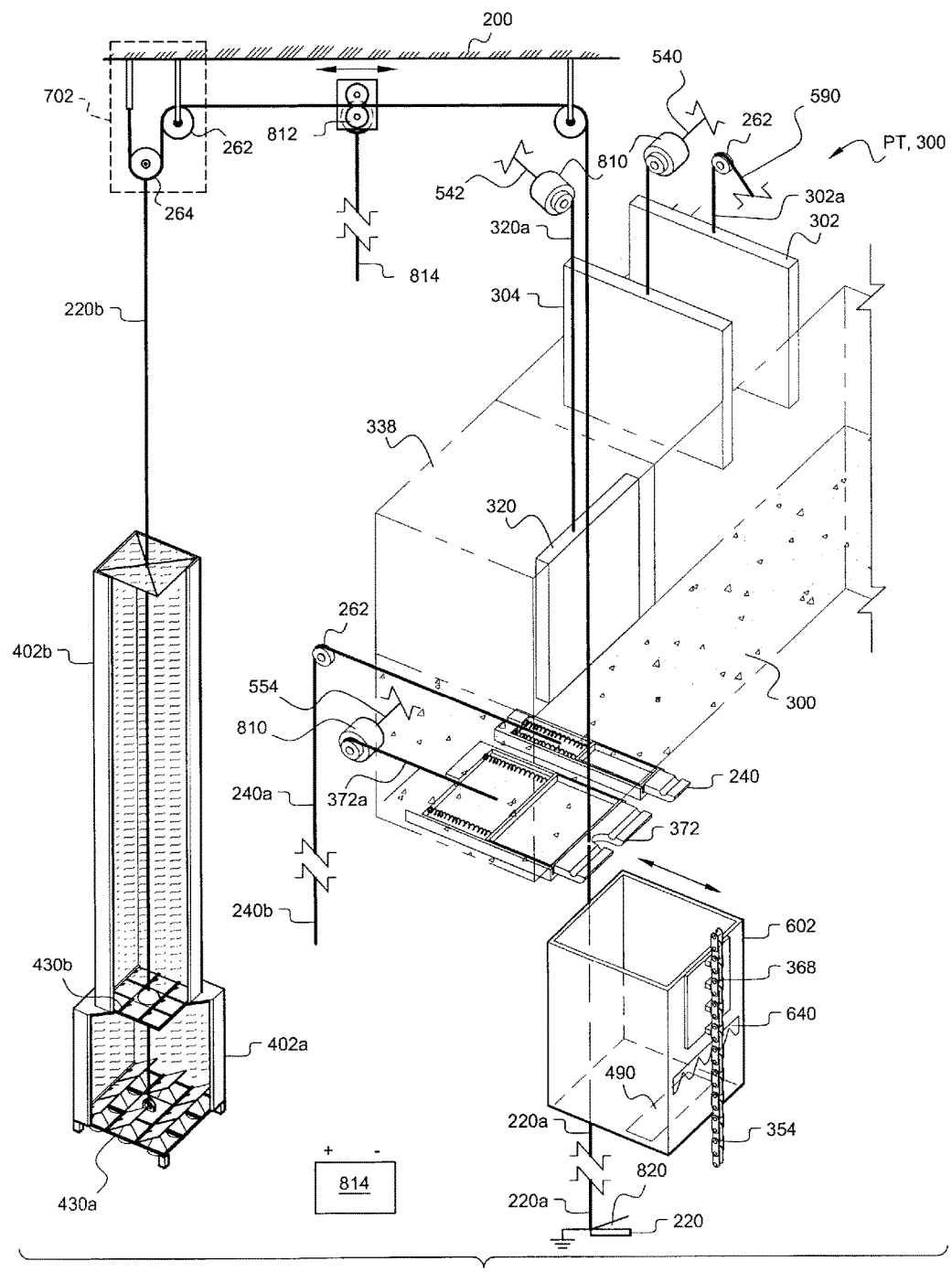
FIG. 13B depicts the same schematic as in FIG. 13A above, but here we make the use of electrical motors instead of just mechanical pulleys to "Electromechanical Mode" to System Operation in order to create the required motion to power the system's moving components that would in turn operate the system of producing energy via use of gravity.

Engaging Bracket (EB) 640, 642, 644, 646, 648, 650, 652, 654 are the brackets mounted on to external cell side of their corresponding FTC 602, 604, 606, 608, 610, 612, 614, 616 that is attached to the Gear Chain (GC) 354 (see FIGS. 13A, 14, and 15). Their function is to engage and disengage a number of: a) cables when the Fully Mechanical Mode of System Operation is used in our design and/or b) a number of contact points when the Electromechanical Mode of System Operation is the preferred choice, at their corresponding Strike Point Contact Junction (SPCJ) 540-554 located on the top of our KTP 532 (see FIGS. 5A, 5B, and 14). Specifically, but not limited to, they are engaging (or disengaging) three basic cables: Fluid Regulating Gate Cable (Gra) 304a-318a that power in motion their corresponding Fluid Regulating Gate(s) (Gr) 304-318; the Fluid Ejection Gate Cable(s) (Gea) 320a-334a that power in motion their corresponding Fluid Ejection Gate(s) (Ge) 320-334 and the Fluid Transport Cell Release Platform Cable (FTCRPC) 376a-386a that power in motion their corresponding Fluid Transport Cell Release Platform(s) (FTCRP) 376-386 (see FIGS. 4A, 6A, 6B, 13, 14, and 15).

Fluid Transport Cell Inner Door (FTCID) 490 is located on the bottom section of all system FTC 602-616 and it's designed to only be opened inwards, towards inside the FTC 602-616, upon its descent and when it comes in contact with its corresponding Lift Door Cone (LDC) 510 which is located on the KTP 532. This contact point will facilitate the ejection of PF 336 from inside the FTC 602-616 on to the KTP 532. The FTCID 490 will shut-off closed when the FTC 602-616 ascends from the KTP 532 towards the PT 300 on the next system cycle (see FIGS. 2, 3, 14, and 15).

Strike Point Contact Junction (SPCJ) 540, 542, 544, 546, 548, 550, 552 and 554 is the point where a number of pulley cables converge and engage (or disengage) mechanically by their corresponding EB 640-654 of their corresponding descending FTC 602-616, in the "Mechanical Mode" of operation, and/or by engaging (or disengaging) a number of electrical contact points (switches) in the "Electromechanical Mode" of operation. Specifically, in both of the above Modes of System Operation, they are engaging (or disengaging) the same three basic cables: the Fluid Regulating Gate Cable (Gra) 304a-318a; the Fluid Ejection Gate Cable (Gea) 320a-334a; and Fluid Transport Cell Release Platform Cable (FTCRPC) 376a-386a (see FIGS. 4A, 6A, 6B, 13, 14, and 15).

Multiple Energy Producing Unit (MEPU) 150,152,154, 156 is the fundamental cell block of the operating system. The summation of these units determines the size and the output capacity of the system. This modular configuration of block by block MEPU 150,152,154,156 expansions defines the tremendous flexibility of our system 10. This versatile, flexible and modular approach to our system design can easily satisfy the broad spectrum electric power requirements by offering a system 10a small enough to power a single home, or a larger system 10b to power a small community, or a system 10c to power a large city, or industrial location system 10d, or a number of cities from a single location or multiple locations (see FIG. 1). In order to provide the reader with a better understanding of what the real component composition of this important subsystem unit is, we will take as an example, MEPU 150, of our system design as reference. MEPU 150 is comprised of, but not limited to: two FTC 602, 604; one GC 354; two MGW 630a, 630b; one MGWP 360; two FFB 338, 340; two Gx 302; two Gxa 302a; two Gr 304, 306; two Gra 304a, 306a; two Ge, 320, 322; two Gea 320a, 322a; two LADMA 702, 704; two KEC 220a, 222a; two LC 220b, 222b; two KESP 220, 222; two DPA 430a,432a; two BTDA 430b, 432b; two DPALR 418; a desired number of SSTS 486; two BHD 498; two SPCJ 540, 542; two pairs of FDT (402a, 402b), (404a,

404*b*); a desired number of LDC 510; two FTCS 520; a KTP 532; a KT 500; a PT 300; a PSA 200; two FTCRP 372, 374; two FTCRPC 372*a*, 374*a*; two FTCEP 240, 242; two FTCEPC 240*a*, 242*a*; one EG 910; one RGB 920; two MP 264; eight FP 262; two FRB 370 (see FIGS. 3, 5A, 5B, 16 and 17).

Complete Operating Unit (COU) is the combination expansion of MEPUs. In this case, four MEPUs 150,152, 154,156 that make up the system 10. We call this a Complete Operating Unit COU. It is a fully operational unit that by itself and in combination with the operating principals of our "Mechanical Sequence" mode of operation or/and "Electromechanical Sequence" mode of operation, as defined in this present application, produces constant power generation and puts electricity onto the electric grid. Our system 10 is comprised by an expandable number of COUs in the system. Each COU in any system design can be comprised of any number of MEPUs. They can commonly use the same PF 336 from the same PT 300 and the same PF 336 from the KT 500 to operate from. This adds to the system flexibility in its design by utilizing the branch out principal approach. For example, the same PF 336 in the PT 300 and the same PF 336 in the KT 500 could supply all of the system's FTCs 602, 604, 606, 608, 610,612, 614, 616 with PF 336 by branching out the PT 300 and KT 500 and supply with PF 336 an infinite number of MEPU that would determine the physical size of our system 10 (see FIGS. 2, 4A, 4B, 4C, 6A, 6B and 19).

System Set-Up at t=0 and System Operation

We defined above, in detail, the main system components and their functions. A complete overview will be provided below as to how the system components come together to work as a complete system that will perform a very valuable function of electric power generation by using the force of gravity as its powering fuel source once the system has been initiated. We can also expand the contribution of this system design to include multiple applications of the system 10. Irrigation application being one of them, general motion generation being another, and so on. Following is a complete overview of this invention as to how it operates. For one embodiment, we will deal with a system 10 comprised of four Multiple Energy Producing Units (MEPUs) 150, 152, 154, 156 having Mechanical Advantage of two (MA=2) (see FIGS. 2, 4A, 4B, 5A, 5B, 6A, and 6B). We could also use, and we will most definitely, in real life applications, Pulley Systems, with higher MA like MA=4, MA=8 and so on for the desired system design. It's worth mentioning that the higher the MA the better the system performance will be because this will facilitate a greater separation between the system's two main tanks, KT 500 and PT 300, as we will see below.

It is very important to note that the operation of our system 10 can be achieved in at least two different ways:

1. Fully Mechanical Mode of Operation. This is facilitated by the mechanical energy produced by the system to power its working components and in addition generate the required force to power its Electric Generators (EG) 910-916 to provide electricity to the grid, or any other source of power consumption, by its own mechanical motion, with a minimal amount of input energy 241. This is further made possible by the inherent in our system design of a "Mechanical Sequence" program, a type of command and control function, which will regulate the component sequences of motion throughout the system operation (see "Mechanical Sequence to Mechanical Mode of Operation" below).

2. Electromechanical Mode of Operation. This is facilitated by the electromechanical energy produced by the system to power its working components and in addition generate the required force to power its Electric Generators (EG) 910-916 to produce electricity to the grid, or any other source of power consumption, by its own Electromechanical Mode of Operation, or, if required, with the aid of a minimal amount of energy 814. This is further made possible by the inherent in our system design of an "Electromechanical Sequence to Electromechanical Mode of Operation" program, a type of command and control function, which will regulate the component sequences of motion throughout the operation of the system (see "Electromechanical Sequence to Electromechanical Mode of Operation" below).

The above two systems differ to the extent that in the "Electromechanical Mode of Operation" we will introduce a power source 814, like a battery, to commence operation and to power internal system components and feedback systems compared to the Fully Mechanical Mode of Operation that produces the same resolve but using only the mechanical energy of the system. In contrast, if we utilize the "Mechanical Mode of Operation," it will produce the same resolve, by using only the mechanical energy generated by the system to power the EG 910-916, internal components and feedback systems, with a minimal amount of input energy 814. This proves that our system can fully function in its "Mechanical Mode of Operation," with a minimal amount of input energy 241.

System Start-Up, at T=0

At its system start-up or Steady State, t=0, and before commencement of initialization of system motion in operation, the entire system 10 is configured and positioned as follows (see FIGS. 2, 3, 4A, 4B, 6A, 6B, 16, and 17):

PT 300 is filled with the desired level of Potential Fluid (PF) 336. FTCs 602, 606, 610 and 614 are also filled with the appropriate amount of PF 336. These four FTCs 602, 606, 610 and 614 are suspended in place and high, on the PT 300 by FTCRP 376 for FTC 606; FTCRP 380 for FTC 610 and FTCRP 384 for FTC 614. However, FTC 602 is a special case. It's held artificially high, at potential status, by its corresponding FTCEP 240 at System Start-up, t=0 only because its corresponding FTCRP 372 is held OPEN by contact of its FTCRPC 372*a* at SPCJ 554 by EB 654 of FTC 616. We identify, at start-up, t=0 the position of FTCRP 374, 376, 380 and 384 as being CLOSED thus supporting at potential height their corresponding FTC 606, 610 and 614 with the exception that FTCRP 374, although in the CLOSE position, it does not have its FTC 604 resting upon it. On the contrary it rests on the top of the KTP 532 (see FIGS. 6A, and 6B). In order to help the reader better understand and follow the thought process below, we define the FTCRP 374, 376, 380, and 384 to be at CLOSED position when it supports upon it its corresponding FTC 606, 610 and 614 at potential status with FTC 602 as discussed above. This is because, at system start-up, t=0 their corresponding FTCRPC 374*a*, 376*a*, 380*a* and 384*a* are NOT engaged at their corresponding SPCJ 552, 540, 544 and 548 by the corresponding EB 652, 640, 644 and 648 of the corresponding FTC 614, 602, 606 and 610.

The opposite is true when the FTCRP 372, 378, 382 and 386 are OPEN and commit to fall when their corresponding: FTCRPC 372*a*, 378*a*, 382*a* and 386*a* are engaged at their respective SPCJ 554, 542, 546 and 550 by their corresponding EB 654, 642, 646 and 650 of their corresponding FTC 616, 604, 608 and 612. When this occurs, the FTCRP 372,

378, 382 and 386 are at tension, retracted under the walls of their corresponding FFB 338, 344, 348 and 352 thus causing the descent of its corresponding FTC 602, 608, 612 and 616. Now having clarified the OPEN and CLOSE conditions of the FTCRP, let us move on. FTCRP 372 is OPEN at System Start-up. The reason being that FTRCP 372 is held OPEN by EB 654 of FTC 616 by putting tension, holding down, FTCRPC 372a at SPCJ 554 and that pulls FTCRPC 372a that in turn pulls FTCRP 372 to OPEN position, meaning not supporting FTC 602. However, FTC 602 is maintained at full potential support, at System Start-up only t=0 by the engagement of its FTCEP 240. This FTCEP 240 is used at the CLOSED position ONLY at System Start-up operation. The rest of the time FTCEP 240 and with the rest FTCEP 242, 244, 246, 248, 250, 252 and 254 are held at the OPEN position, to only be activated by their release, in an emergency situation where the system's operation may need to be interrupted. Corresponding ejection gates (Ge) 320, 324, 328 and 332 are OPEN without potential fluid (PF) 336 in their respective FFB 338, 342, 346 and 350. They are supported OPEN by the engaging bracket (EB) 642 of FTC 604 at SPCJ 542; EB 646 of FTC 608 at SPCJ 546; EB, 650 of FTC 612 at SPCJ 550 and EB 654 of FTC 616 at SPCJ 554 of their respective cables 320a, 324a, 328a and 332a respectively (see FIGS. 4B, 6A, and 6B). Regulating Gates (Gr) 304, 308, 312 and 316 are CLOSED because their respective cables 304a, 308a, 312a and 316a are NOT engaged by their corresponding EB 640 of FTC 602 at SPCJ 540; EB 644 of FTC 606 at SPCJ 544; EB 648 of FTC 610 at STCJ 548 and EB 652 of FTC 614 at SPCJ 552 thus keeping PF 336 outside from entering the respective FFB 338, 342, 346, 350 which at this point are empty of PF 336 (see FIGS. 4A, 4B, 6A and 6B). Furthermore, FTC 604, 608, 612 and 616 are resting a top of the KTP 532 and are empty because FTCID 490 are maintained open by the DLC 510. Fluid Regulating Gates (Gr), 306, 310, 314, and 318 are OPEN because their respective cables, 306a, 310a, 314a and 318a are engaged by their respective EB 642 of FTC 604 at SPCJ 542; EB 646 of FTC 608 at SPCJ 546; EB 650 of FTC 612 at SPCJ 550 and EB 654 of FTC 616 at STCJ 554 thus keeping their respective FFB 340, 344, 348 and 352 full of PF 336. Ejection Gates (Ge) 322, 326, 330 and 334 are CLOSED because their respective cables 322a, 326a, 330a and 334a are NOT engaged by their respective EB 640 of FTC 602 at SPCJ 540; EB 644 of FTC 606 at SPCJ 544; EB 648 of FTC 610 at STCJ 548 and EB 652 of FTC 614 at STCJ 552. FFB 340, 344, 348 and 352 are flooded with Potential Fluid (PF) 336. Looking at the FDTs at System Start-up condition, t=0, we have set all of the SST 402a, 404a, 406a, 408a, 410a, 412a, 414a, and 416a flooded with PF 336 all the time. All UST 402b, 404b, 406b, 408b, 410b, 412b, 414b and 416b are also flooded with PF 336 all the time (see FIGS. 2, 4A, 4B, 5A, 5B, 6A, 6B, 16 and 17).

Sub Surface Tanks (SST) 402a, 406a, 410a, 414a are flooded all the time throughout the operation of the system, and their corresponding DPAs 430a, 434a, 438a and 442a being at rest, not engaged by their respective LC 220b, 224b, 228b and 232b, and resting at the bottom of the SSTs 402a, 406a, 410a and 414a respectively. Their LD 448 are engaging OPEN by contact made by the LDC 510 located on the bottom of the KT 500. This is inherent in the design to maintain fluid accessibility in SST at all time (see FIGS. 2, 3, 4A, 4B, 6A, 6B, 16, and 17).

Sub Surface Tanks (SST) 404a, 408a, 412a and 416a are flooded all the time throughout the operation of the system, and their corresponding DPA 432a, 436a, 440a and 444a being tense, meaning that their respective LC 222b, 226b, 230b and 234b have being engaged. DPA 432a, 436a, 440a and 444a have moved up, their LD 448 are shut from the resting weight upon them by the PF 336 as they move up and they push the PF 336 through the LD 448 of BTDA 432b, 436b, 440b and 444b and now they rest at this position ready for the next cycle.

Upper Surface Tanks (UST) 402b, 404b, 406b, 408b, 410b, 412b, 414b, 416b, although they can be empty at system start-up, t=o, we choose to set them full of PF 336 in order to maintain maximum PF 336 levels in our system.

Fluid Transport Cell Release Platform (FTCRP) 372, (see FIGS. 6A and 6B), is held OPEN at System Start-up or System Motion Initiation by EB 654 of FTC 616 which holds down at tension FTCRPC 372a thus holding in the OPEN position FTCRP 372. However, this presents a problem at System-Start-up because FTCRP 372 can't support FTC 602 up at potential status. For this reason, we make temporary use of the Fluid Transport Cell Emergency Platform (FTCEP) 240 to be held CLOSED at System Start-up thus maintaining FTC 602 at potential status. Therefore, looking at the full picture, FTCRP 374, 376, 380 and 384 are held CLOSED at System Start-up, meaning that they extend outside the walls of their corresponding FFB 340, 342, 346 and 350. This means that their corresponding FTCRPCs 374a at SPCJ 552 is not engaged by EB 652 of FTC 614; 376a at SPCJ 540 is not engaged by EB 640 of FTC 602; 380a at SPCJ 544 is not engaged by EB 644 of FTC 606 and 384a at SPCJ 548 is not engaged by EB 648 of FTC 610. FTCs 606, 610 and 614 are resting on their respective FTCRPs 376, 380 and 384 with the exception of FTC 602 that is resting on FTCEP 240, only at System Start-up. FTCRP 372, 378, 382 and 386 are held OPEN, retracted under their respective FFB 338, 344, 348 and 352 at System Start-up position, because they are engaged by their corresponding FTCRPCs 372a at SPCJ 554 by EB 654 of FTC 616; 378a at SPCJ 542 by EB 642 of FTC 604; 382a at SPCJ 546 by EB 646 of FTC 608 and 386a at SPCJ 550 by EB 650 of FTC 612.

Figure 6A:
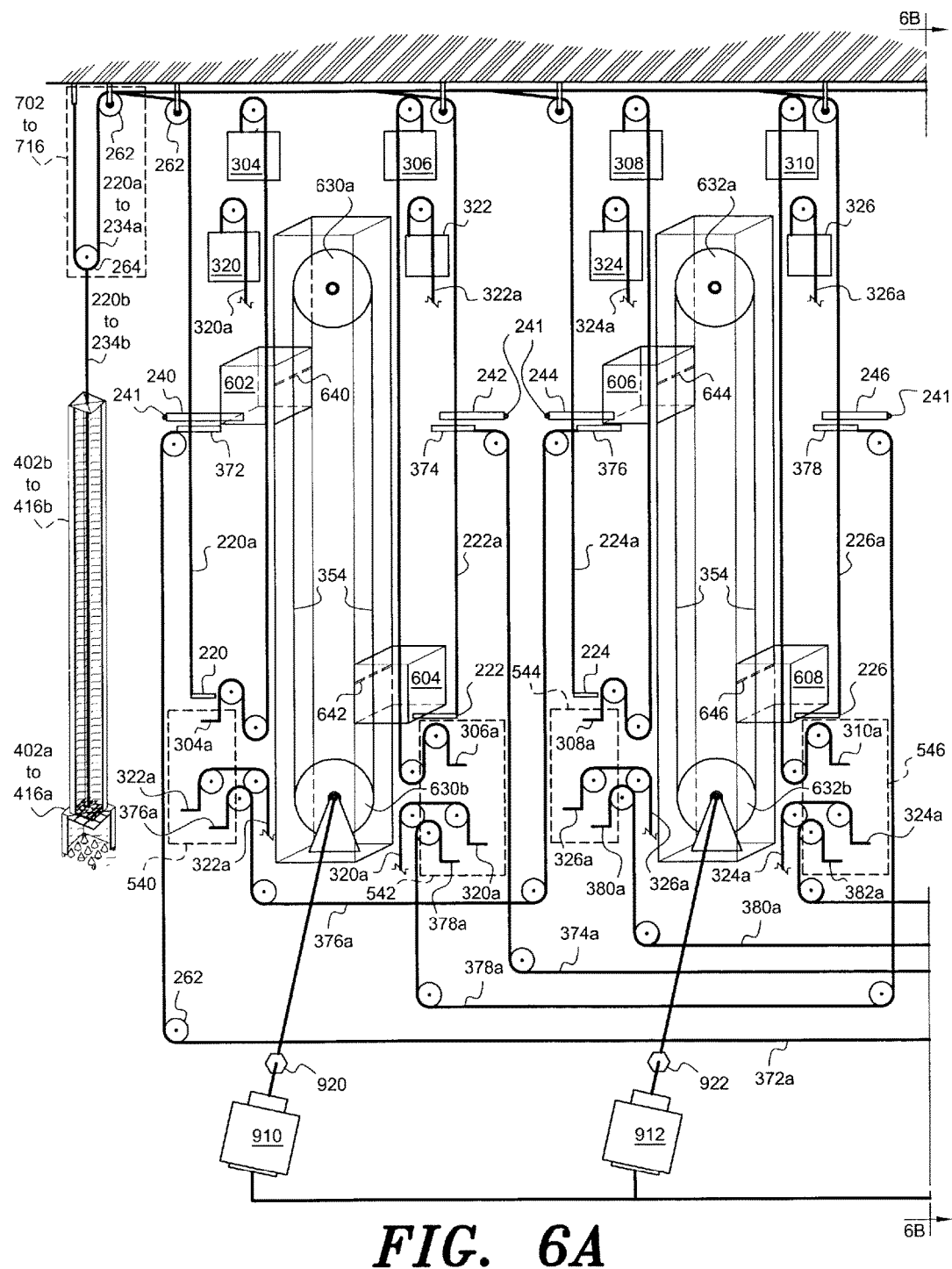
FIG. 6A and FIG. 6B are side views of a first, non-limiting embodiment of a system of producing energy via use of gravity according to the present invention, wherein these two figures, put side by side, depict the "Mechanical Sequence" mechanism of the system as it pertains to its functionality in providing a timing sequence of motion to its moving working components. This "Mechanical Sequence" mechanism is the facilitator of the system's command and control to its moving components that facilitate the system's motion throughout its operation pertaining to the "Mechanical Mode" of operation as well as to the "Electromechanical Mode" of operation.
Figure 6B:
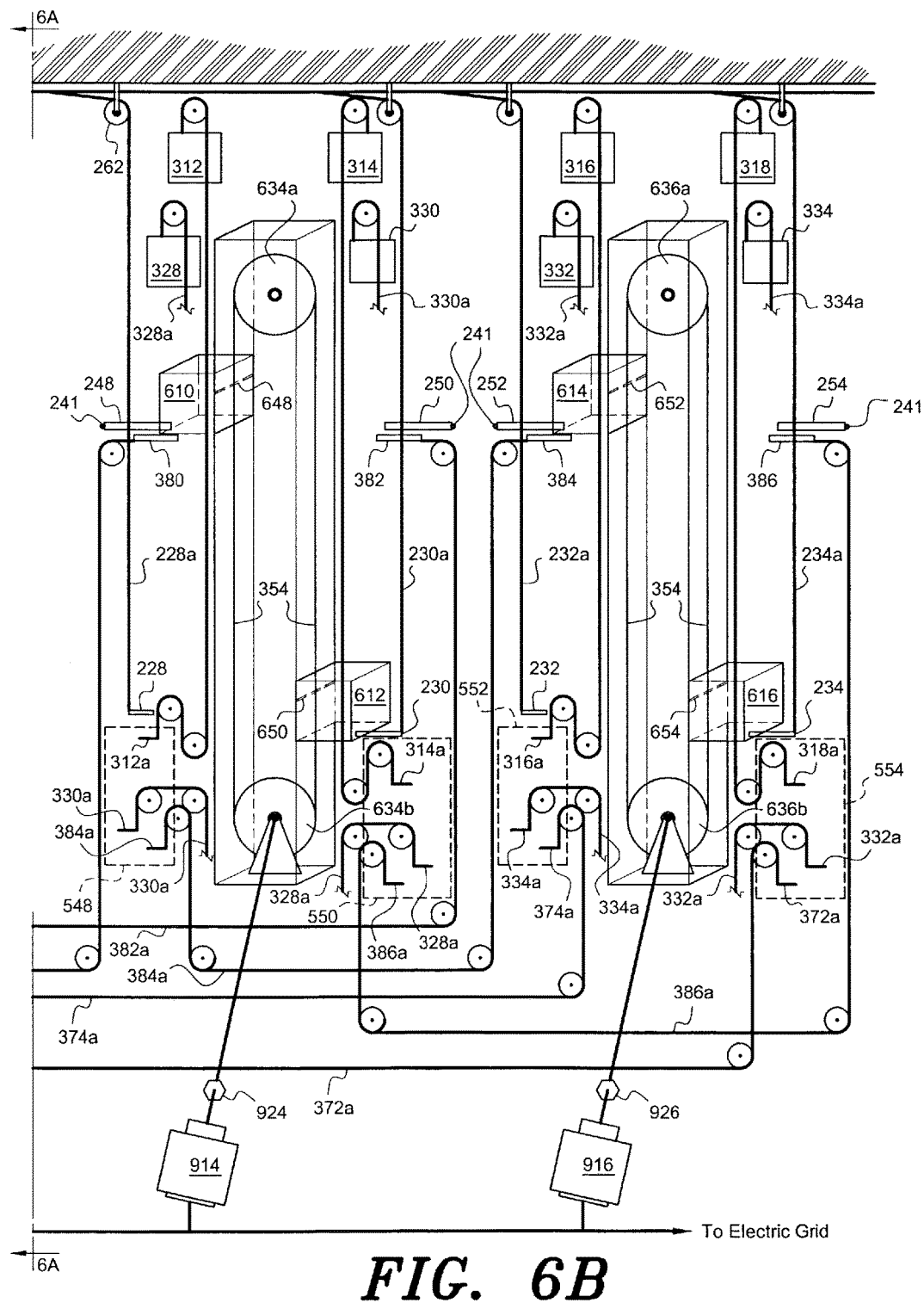
Figure 7:
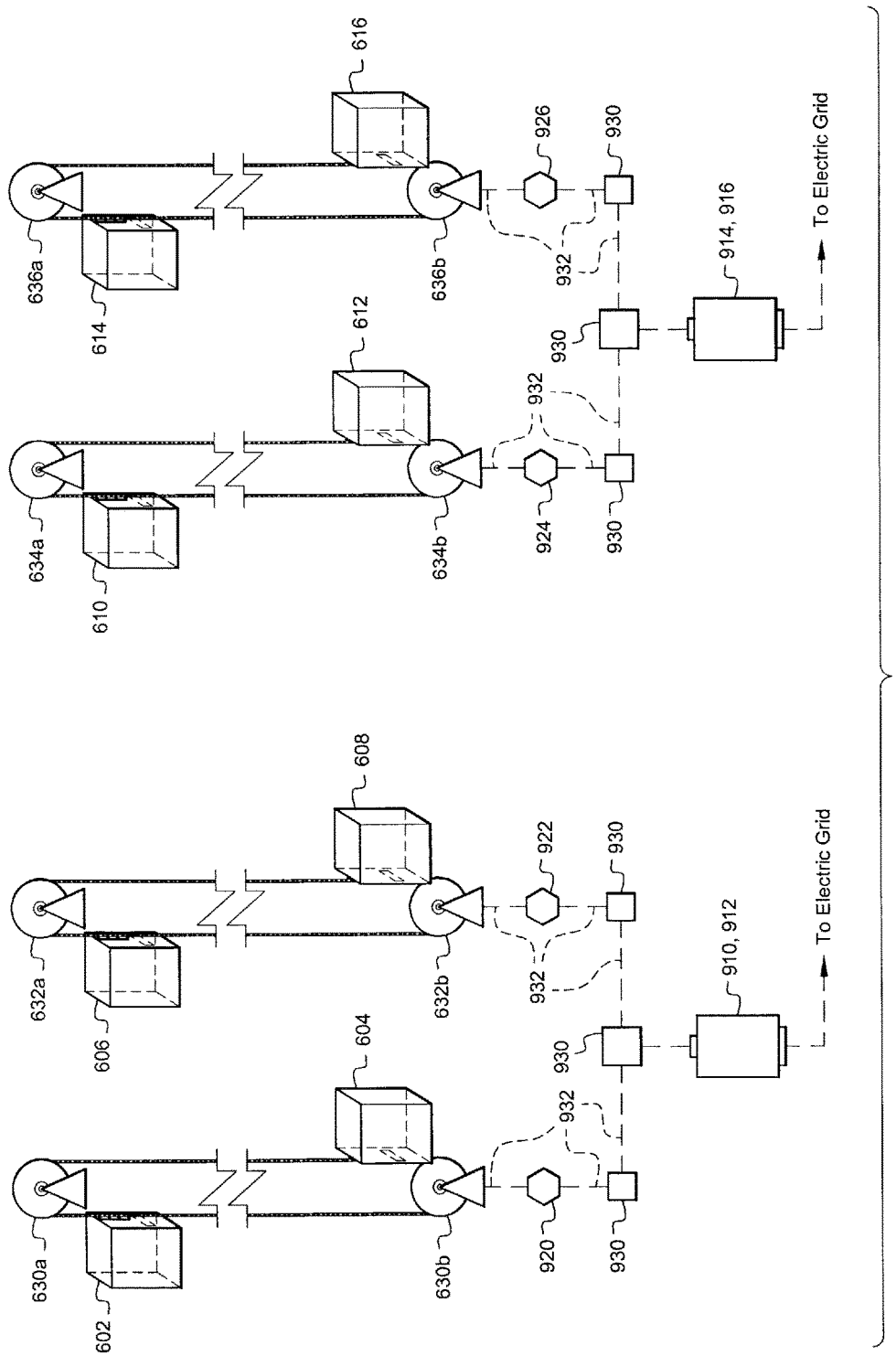
FIG. 7 shows how two system MEPU of a first, non-limiting embodiment of a system can be combined together in their operation to power a single electric generator.
Figure 8:
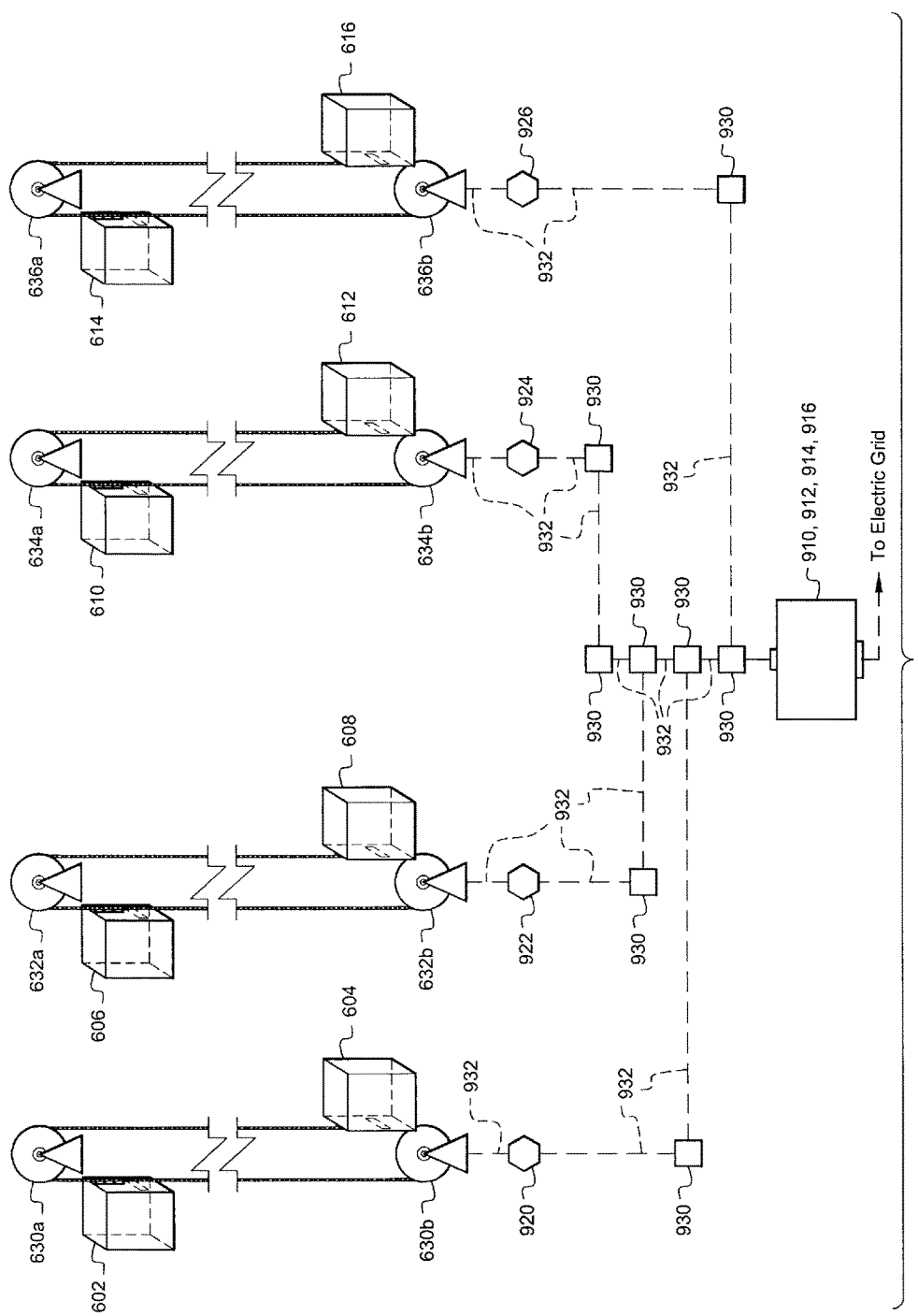
FIG. 8 shows how four system MEPU of a first, non-limiting embodiment of a system can be combined together in their operation to power a single electric generator.

Let us now describe the work motion and operation of FIGS. 6a and 6b.

"Mechanical Sequence" to Mechanical Mode of Operation

In order for our system 10 and its moving components to perform as designed and, tie together the entire system operation in a continues feedback motion in the process of electric power generation, in this present application, we introduce a "Mechanical Sequence" mode of operation and/or an "Electromechanical Sequence" mode of operation. A type of a mechanical or electromechanical program of command and control to motion process regulation throughout the system and its moving components. This very important program of "Mechanical" or "Electromechanical Sequence" mode of operation, command and control, will cycle throughout our system's design operation regulating all component sequences of motion throughout the system in a chain type of reaction that will facilitate: a) the continuous recycling process of fluids through their descending and ascending processes, b) generate continuously the required power to operate the system's internal components and at the same time power the system's Electric Generators (EG) 910, 912, 914, 916 contributing in the continuous generation of electric power output onto the electric grid. This proposed system design, in this submitted present application, can operate with a minimal amount of input energy. Because it is containable, it can operate autonomously anywhere on Earth or on any stellar body or at any place in the universe where gravity is present.

In order to better understand the working processes of this vital part of our system design, we attempt to explain below its working characteristics in detail as they are embodied in FIGS. 2, 6A and 6B. The explanation below pertains to the "Mechanical Sequence Mode of Operation" whereby, the potential and kinetic energies are the main driving forces to these sequence of electric power producing events that set in motion the system components to produce electric power generation by the use of gravity.

It should be made clear that the "Mechanical Sequence" mode of operation and/or the "Electromechanical Sequence" mode of operation is integrated, independently, into the operational design of each one of the plurality of COUs, which will determine the desired size of the system 10. Each COU comprises a plurality of MEPUs.

After system start-up, at time t=0, as indicated above and as best shown in FIGS. 4A, 4B, 5B, 6A and 6B, system 10 initiation begins by pulling FTCEP 240 via a power source 241 and keeping it pulled at a tension point on APFTCEP 240b, while the rest of the FTCEPs 242,244,246,248,250, 252,254 are already at tension at their corresponding tension points on APFTCEP 242b,244b,246b,248b,250b,252b,254b via the power source 241, for as long as the system 10 operates, unless there is an anomaly in the operation of the system 10 that would require the deployment of any FTCEP 240-254 to stop system motion. When the FTCEP 240 is retracted FTC 602 begins its descent then the following occurs:

"Mechanical Sequence" to Mechanical Mode of Operation

When (a) FTC 604 Ascends, (b) FTC 602 Descends:
1a. When FTC 604 Ascends and finally locks on top of FTCRP 374 the following happens:
2a. Ejection gate (Ge) 320 CLOSES, tension is released from its cable 320a by EB 642 of FTC 604 at SPCJ 542
3a. Regulating gate (Gr) 306 CLOSES, tension is released from its cable 306a by EB 642 of FTC 604 at SPCJ 542.
4a. KESP 222 RELEASED from tension from its FTC 604, relaxing cables 222a and 222b thus causing DPA 432a to descent to the bottom of SST 404a and rest on the DLC 510.
5a. FTCRP 378 CLOSES, released, its cable 378a no longer at tension by EB 642 of FTC 604 at SPCJ 542.
1b. When FTC 602 Descends and finally locks on the top of the KTP 532, the following happens:
2b. Ejection gate (Ge) 322 OPENS tension is placed on its cable 322a by EB 640 of FTC 602 at SPCJ 540 and floods FTC 604 with PF 336.
3b. Regulating gate (Gr) 304 OPENS, tension is placed on its cable 304a by EB 640 of FTC 602 at SPCJ 540 and floods FFB 338 with PF 336.
4b. KESP 220 goes to TENSION engaged by its FTC 602, causing cables 220a and 220b to tense thus lifting DPA 430a to the top of SST 402a. This will cause the PF 336 inside SST 402a to be transferred, through BTDA 430b inside UST 402b and the PF 336 already in UST 402b will be displaced onto PT 300. It should be noted that the PF 336 displaced onto PT 300 is at leased of the same volume as that ejected by FTC 602 onto KTP 532. When FTC 602 comes to rest on KTP 532 its FTCID 490 engages LDC 510 and the PF 336 of FTC 602 is emptied onto KTP 532. PF 336 will enter back into KT 500 through the Kinetic Tank Platform Floor Perforations (KTPFP) 530. While FTC 602 descents, it turns MGW pair 630a and 630b which in turn powers EG 910 thus putting electricity to the grid.
5b. FTCRP 376 OPENS, its cable 376a goes to tension by the descending EB 640 of FTC 602 at SPCJ 540 thus, causing FTC 606 to DESCEND.

When (c) FTC 608 Ascends, (d) FTC 606 Descends:
1c. When FTC 608 Ascends and finally locks on top of FTCRP 378 the following happens:
2c. Ejection gate (Ge) 324 CLOSES, tension is released from its cable 324a by EB 646 of FTC 608 at SPCJ 546.
3c. Regulating gate (Gr) 310 CLOSES, tension is released from its cable 310a by EB 646 of FTC 608 at SPCL 546.
4c. KESP 226 is RELEASED from tension from its FTC 608, relaxing cables 226a and 226b thus causing DPA 436a to descent to the bottom of SST 408a and rest on the DLC 510.
5c. FTCPR 382 CLOSES, released, its cable 382a no longer at tension by EB 646 of FTC 608 at SPCJ 546.
1d. When FTC 606 Descends and settles on the top of the KTP 532, the following happens:
2d. Ejection gate (Ge) 326 OPENS, tension is placed on its cable 326a by EB 644 of FTC 606 at SPCJ 544 and floods FTC 608 with PF 336.
3d. Regulating gate (Gr) 308 OPENS, tension is placed on its cable 308a by EB 644 of FTC 606 at SPCJ 544 and floods FFB 342 with PF 336.
4d. KESP 224 goes to TENSION engaged by its FTC 606, causing cables 224a and 224b to tense thus lifting DPA 434a to the top of SST 406a. This will cause the PF 336 inside SST 406a to be transferred, through BTDA 434b inside UST 406b and the PF 336 already in UST 406b will be displaced onto PT 300. It should be noted that the PF 336 displaced onto PT 300 is at least of the same volume as that ejected by FTC 606 onto KTP 532. When FTC 606 comes to rest on KTP 532 its FTCID 490 engages DLC 510 and the PF 336 of FTC 606 is emptied onto KTP 532. PF 336 will enter back into KT 500 through the Kinetic Tank Platform Floor Perforations (KTPFP) 530. While FTC 606 descends, it turns MGW pair 632a and 632b which in turn powers EG 912 thus putting electricity to the grid.
5d. FTCRP 380 OPENS, its cable 380a goes to tension by the descending EB 644 of FTC 606 at SPCJ 544 thus, causing FTC 610 to DESCEND.

When (e) FTC 612 Ascends, (f) FTC 610 Descends:
1e. When FTC 612 Ascends and locks on the top of FTCRP 382 the following happens:
2e. Ejection gate (Ge) 328 CLOSES, tension is released from its cable 328a by EB 650 of FTC 612 at SPCJ 550.
3e. Regulating gate (Gr) 314 CLOSES, tension is released from its cable 314a by EB 650 of FTC 612 at SPCJ 550.
4e. KESP 230 is RELEASED from tension from its FTC 612, relaxing cables 230a and 230b thus causing DPA 440a to descent to the bottom of SST 412a and rest on the LDC 510.
5e. FTCRP 386 CLOSES, released, its cable 386a no longer at tension by EB 650 of FTC 612 at SPCJ 550.
1f. When FCT 610 Descends and settles on the top of the KTP 532, the following happens:
2f. Ejection gate (Ge) 330 OPENS, tension is placed on its cable 330a by EB 648 of FTC 610 at SPCJ 548 and floods FTC 612 with PF 336.

3f. Regulating gate (Gr) 312 OPENS, tension is placed on its cable 312a by EB 648 of FTC 610 at SPCJ 548 and floods FFB 346.

4f. KESP 228 goes to TENSION engaged by its FTC 610, causing cables 228a and 228b to tense thus lifting DPA 438a to the top of SST 410a. This will cause the PF 336 inside SST 410a to be transferred, through BTDA 438b inside UST 410b and the PF 336 already in UST 410b will be displaced onto PT 300. It should be noted that the PF 336 displaced onto PT 300 is at least of the same volume as that ejected by FTC 610 onto KTP 532. When FTC 610 comes to rest on KTP 532 its FTCID 490 engages LDC 510 and the PF 336 of FTC 610 is emptied onto KTP 532. PF 336 will enter back into KT 500 through the Kinetic Tank Platform Floor Perforations (KTPFP) 530. While FTC 610 descents, it turns MGW pair 634a and 634b which in turn powers EG 914 thus putting electricity to the grid.

5f. FTCRP 384 OPENS, its cable 384a goes to tension by the descending EB 648 of FTC 610 at SPCJ 548 thus, causing FTC 614 to Descent.

When (g) FTC 616 Ascends, (h) FTC 614 Descends:

1g. When FTC 616 Ascends and finally locks on top of FTCRP 386 the following happen:

2g. Ejection gate (Ge) 332 CLOSES, tension is released from its cable 332a by EB 654 of FTC 616 at SPCJ 554.

3g. Regulating (Gr) 318 CLOSES, tension is released from its cable 318a by EB 654 of FTC 616 at SPCJ 554.

4g. KESP 234 is RELEASED from tension from its FTC 616, relaxing cables 234a and 234b thus causing DPA 444a to descent to the bottom of SST 416a and come to rest on the LDC 510.

5g. FTCRP 372 CLOSES, released, its cable 372a no longer at tension by EB 654 of FTC 616 at SPCJ 554.

1h. When FTC 614 Descends and settles on the top of KTP 532 the following happen:

2h. Ejection gate (Ge) 334 OPENS, tension is placed on its cable 334a by EB 652 of FTC 614 at SPCJ 552 and floods FTC 616 with PF 336.

3h. Regulating gate (Gr) 316 OPENS, tension is placed on its cable 316a by EB 652 of FTC 614 at SPCJ 552 and floods FFB 350 with PF 336.

4h. KESP 232 goes to TENSION engaged by its FTC 614, causing cables 232a and 232b to tense thus lifting DPA 442a to the top of SST 414a. This will cause the PF 336 inside SST 414a to be transferred, through BTDA 442b inside UST 414b and the PF 336 already in UST 414b will be displaced onto PT 300. It should be noted that the PF 336 displaced onto PT 300 is at leased of the same volume as that ejected by FTC 614 onto KTP 532. When FTC 614 comes to rest on KTP 532 its FTCID 490 engages DLC 510 and the PF 336 of FTC 614 is emptied onto KTP 532. PF 336 will enter back into KT 500 through the Kinetic Tank Platform Floor Perforations (KTPFP) 530. While FTC 614 descents, it turns MGW pair 636a and 636b which in turn powers EG 916 thus putting electricity to the grid.

5h. FTCRP 374 OPENS, its cable 374a goes to tension by the descending EB 652 of FTC 614 at SPCJ 552 thus causing FTC 604 to Descent.

When (i) FTC 602 Ascends, (j) FTC 604 Descends:

1i. When FTC 602 Ascends and finally locks on top of FTCRP 372 we notice the following:

2i. Ejection gate (Ge) 322 CLOSES, tension is released from its cable 322a by EB 640 of FTC 602 at SPCJ 540.

3i. Regulating (Gr) 304 CLOSES, tension is released from its cable 304a by EB 640 of FTC 602 at SPCJ 540.

4i. KESP 220 is RELEASED from tension from its FTC 602, relaxing cables 220a and 220b thus causing DPA 430a to descent to the bottom of SST 402a and rest on the LDC 510.

5. FTCRP 376 CLOSES, released, its cable 376a no longer at tension by EB 640 of FTC 602 at SPCJ 540

1j. When FTC 604 Descends and settles on the top of the KTP 532, we notice the following:

2j. Ejection gate (Ge) 320 OPENS, tension is placed on its cable 320a by EB 642 of FTC 604 at SPCJ 542 and floods FTC 602 with PF 336.

3j. Regulating gate (Gr) 306 OPENS, tension is placed on its cable 306a by EB 642 of FTC 604 at SPCJ 542 and floods FFB 340 with PF 336.

4j. KESP 222 goes to TENSION engaged by its FTC 604, thus causing cables 222a and 226 to tense thus lifting DPA 432a to the top of SST 404a. This will cause the PF 336 inside SST 404a to be transferred, through BTDA 432b inside UST 404b and the PF 336 already in UST 404b will be displaced onto PT 300. It should be noted that the PF 336 displaced onto PT 300 is at least of the same volume as that ejected by FTC 604 onto KTP 532. When FTC 604 comes to rest on KTP 532 its FTCID 490 engages DLA 510 and the PF 336 of FTC 604 is emptied onto KTP 532. PF 336 will enter back into KT 500 through the Kinetic Tank Platform Floor Perforations (KTPFP) 530. While FTC 604 descents, it turns MGW pair 630a and 630b which in turn powers EG 910 thus putting electricity to the grid. Because the direction of the torque that will drive EG 910, this time, is in the opposite direction of that when FTC 602 was descending we can employ, if desired, a Reverse Gear Box (RGB) 920 to convert the torque in the same direction as before (see FIGS. 2, 6A, and 6B).

5j. FTCRP 378 OPENS its cable 378a goes to tension by the descending EB 642 of FTC 604 at SPCJ 542 thus causing FTC 608 to Descend.

When (k) FTC) 606 Ascends, (I) FTC) 608 Descends:

1k. When FTC 606 Ascends and locks on the top of FTCRP 376 we notice the following:

2k. Ejection gate (Ge) 326 CLOSES tension is released from its cable 326a by EB 644 of FTC 606 at SPCJ 544.

3k. Regulating gate (Gr) 308 CLOSES, tension is released from its cable 308a by EB 644 of FTC 606 at SPCJ 544.

4k. KESP 224 is RELEASED from tension from its FTC 606, relaxing cables 224a and 224b thus causing DPA 434a to descent to the bottom of SST 406a and rest on the LDC 510.

5k. FTCRP 380 CLOSES released, its cable 380a no longer at tension by EB 644 of FTC 606 at SPCJ 544.

1l. When FTC 608 Descends and settles on the top of KTP 532 we notice the following:

2l. Ejection gate (Ge) 324 OPENS tension is placed on its cable 324a by EB 646 of FTC 608 at SPCJ 546 and floods FTC 606 with PF 336.

3l. Regulating gate (Gr) 310 OPENS tension is placed on its cable 310a by EB 646 of FTC 608 at SPCJ 546 and floods FFB 344 with PF 336.

4l. KESP 226 goes to tension engaged by its FTC 608, causing cables 226a and 226b to tense thus lifting DPA 436a to the top of SST 408a. This will cause the PF 336 inside SST 408a to be transferred, through the BTDA 436b inside UST 408b and the PF 336 already in UST 408b will be displaced onto PT 300. It should be noted that the PF 336 displaced onto PT 300 is at least of the same volume as that ejected by FTC 608 onto KTP 532. When FTC 608 comes to rest on top of KTP 532, its FTCID 490 engages DLC 510 and the PF 336 of FTC 608 is emptied on to KTP 532. PF 336 will enter back into KT 500 through the Kinetic Tank Platform Floor Perforations (KTPFP) 530. While FTC 608 descents, it turns MGW pair 632a and 632b which in turn powers EG 912 thus putting electricity to the grid. Because the direction of the torque that will drive EG 912, this time, is in the opposite direction of that when FTC 606 was descending we can employ, if desired, a Reverse Gear Box (RGB) 922 to convert the torque in the same direction as before (see FIGS. 2, 6A, and 6B).

5l. FTCRP 382 OPENS its cable 382a goes to tension by the descending EB 646 of FTC 608 at SPCJ 546 thus causing FTC 612 to Descend.

When (m) FTC 610 Ascends, (n) FTC 612 Descends:

1m. When FTC 610 Ascends and finally locks on top of FTCRP 380 we notice the following:

2m. Ejection gate (Ge) 330 CLOSES tension is released from its cable 330a by EB 648 of FTC 610 at SPCJ 548.

3m. Regulating gate (Gr) 312 CLOSES, tension is released from its cable 312a by EB 648 of FTC 610 at SPCJ 548.

4m. KESP 228 is RELEASED from tension from its FTC 610, relaxing cables 228a and 228b thus causing DPA 438a to descent to the bottom of SST 410a and rest on the LDC 510.

5m. FTCRP 384 CLOSES, relaxed, its cable 384a no longer in tension by EB 648 of FTC 610 at SPCJ 548.

1n. When FTC 612 Descends and settles on top of the KTP 532 the following happen:

2n. Ejection gate (Ge) 328 OPENS tension is placed on its cable 328a by EB 650 of FTC 612 at SPCJ 550 and floods FTC 610 with PF 336.

3n. Regulating gate (Gr) 314 OPENS tension is placed on its cable 314a by EB 650 of FTC 612 at SPCJ 550 and floods FFB 348 with PF 336.

4n. KESP 230 goes to TENSION engaged by its FTC 612 causing cables 230a and 230b to tense thus lifting DPA 440a to the top of SST 412a. This will cause the PF 336 inside SST 412a to be transferred, through BTDA 440b inside UST 412b and the PF 336 already in UST 412b will be displaced onto PT 300. It should be noted that the PF 336 displaced onto PT 300 is at least of the same volume as that ejected by FTC 612 onto KTP 532. When FTC 612 comes to rest on KTP 532 its FTCID 490 engages DLC 510 and the PF 336 of FTC 612 is emptied on to KTP 532. PF 336 will enter back into KT 500 through the Kinetic Tank Platform Floor Perforations (KTPFP) 530. While FTC 612 descends, it turns MGW pair 634a and 634b which in turn powers EG 914 thus putting electricity to the grid. Because the direction of the torque that will drive EG 914, this time, is in the opposite direction of that when FTC 610 was descending we can employ, if desired, a Reverse Gear Box (RGB) 924 to convert the torque in the same direction as before (see FIGS. 2, 6A, and 6B).

5n. FTCRP 386 OPENS, its cable 386a goes to tension by the descending EB 650 of FTC 612 at SPCJ 550 thus causing FTC 616 to Descent.

When (o) FTC 614 Ascends, (p) FTC 616 Descends:

1o. When FTC 614 Ascends and locks on the top of FTCRP 384 we notice the following:

2o. Ejection gate (Ge) 334 CLOSES tension is released from its cable 334a by EB 652 of FTC 614 at SPCJ 552.

3o. Regulating gate (Gr) 316 CLOSES tension is released from its cable 316a by EB 652 of FTC 614 at SPCJ 552.

4o. KESP 232 RELEASED from tension from its FTC 614, relaxing cables 232a and 232b thus causing DPA 442a to descent to the bottom of SST 414a and rest on the LDC 510.

5o. FTCRP 374 CLOSES, released, its cable 374a no longer at tension by EB 652 of FTC 614 at SPCJ 552.

1p. When FTC 616 Descends and settles on the top of the KTP 532 we notice the following:

2p. Ejection gate (Ge) 332 OPENS, tension is placed on its cable 332a by EB 654 of FTC 616 at SPCJ 554 and floods FTC 614 with PF 336.

3p. Regulating gate (Gr) 318 OPENS, tension is placed on its cable 318a by EB 654 of FTC 616 at SPCJ 554 and floods FFB 352.

4p. KESP 234 goes to TENSION engaged by its FTC 616 causing cables 234a and 234b to tense thus lifting DPA 444a to the top of SST 416a. This will cause the PF 336 inside SST 416a to be transferred, through BTDA 444b inside UST 416b and the PF 336 already in UST 416b will be displaced onto PT 300. It should be noted that the PF 336 displaced onto PT 300 is at least of the same volume as that ejected by FTC 616 onto KTP 532. When FTC 616 comes to rest on KTP 532, its FTCID 490 engages DLC 510 and the PF 336 of FTC 616 is emptied onto KTP 532. PF 336 will enter back into KT 500 through the Kinetic Tank Platform Floor Perforations (KTPFP) 530. While FTC 616 descents, it turns MGW pair 636a and 636b which in turn powers EG 916 thus putting electricity to the grid. Because the direction of the torque that will drive EG 916, this time, is in the opposite direction of that when FTC 614 was descending we can employ, if desired, a Reverse Gear Box (RGB) 926 to convert the torque in the same direction as before.

5p. FTCRP 372 OPENS, its cable 372a goes to tension by the descending EB 654 of FTC 616 at SPCJ 554 thus releasing FTC 602 to Descend.

And the entire process starts automatically all over again.

"Electromechanical Sequence" to Electromechanical Mode of Operation

As it is shown above, our plant or system 10, with its unique and novel way of providing electricity to the grid, can fully function in its "Mechanical Mode of Operation" with the aid of a minimal amount of external energy. Our system 10 has proven to generate the said power, electricity, in the sole "Mechanical Mode of Operation" and therefore, it is fair to assume that we can achieve the same resolve of power generation by using a "Hybrid Mode of Operation", so called, "Electromechanical Mode of Operation" in the process. Here we can divert some of the system's own generated electricity to power internal components and feedback systems. This could introduce a more efficient way of system operation without compromising our system's unique characteristics as they are claimed in this present application (see FIGS. 5A, 6A, 6B, 13A, 13B, 14 and 19).

In its "Mechanical Mode of Operation", as described in the "Mechanical Sequence" above, this Electric Power Plant is using the brute force of the Potential and Kinetic Energies, in combination with the inherent program of command and control, "Mechanical Sequence", to produce and transmit operating power to its working system components in motion and at the same time provide the required power to drive, effectively, the Electric Generators (EG) 910, 912, 914, 916 of the system by mechanical means. In doing so it employs a plurality of pulleys and cables which cables are connected on one end to corresponding moving system components and on the other end they are connected to impact points SPCJ 540, 542, 544, 546, 548, 550, 552, 554 and KESP 220, 222, 224, 226, 228, 230, 232, 234 which will energize or de energize their associated cables that produce the required operating conditions to most of our system's components in motion. The overwhelming produced force that powers our system's motion is facilitated by the unleashed kinetic energy produced upon impact contact by the descending FTC 602-616 at the point of impact with their corresponding SPCJ 540-554 and KESP 220-234. The FTC 602-616 are the system's power givers of motion, upon descent, to the design of our system's Electric Generators (EG) 910-916, and working components. They also facilitate the uplift force of PF 336 in the recycling process by transferring such PF 336 from the KT 500 back onto the PT 300 through the fluid transfer path of corresponding FDTs (402a,402b)-(416a,416b).

In the "Electromechanical Mode of Operation," our system 10 will employ a Hybrid System Design. Some of the system components will be driven mechanically and some other system components will be driven electrically. Therefore, it is possible to divert some of the system's own generated electricity to power internal components and feedback systems. In doing so, the system 10 employs a plurality of electric cables in lieu of mechanical cables and electric motors connected to such cables. The rest of the system 10 remains the same for the most part. On one end these electrical cables connect to their corresponding electric motors (EM) 810 that will provide the force of motion to operate their corresponding system components, electrically powered instead of mechanically powered as it was done in the "Mechanical Mode of Operation". On the opposite end, the electric cables are connected to an electric power source, also called Internal Power Source (IPS) 814. Between these two extreme ends, we have placed the impact points of SPCJ 540-554 and KESP 220-234 serving as contact pressure switchboards that will energize, upon contact pressure, or de energize upon lift of contact pressure the various system motors. The source of contact pressure to these impact points is facilitated mechanically by their corresponding EB 640-654 of their corresponding descending FTC 602-616. As we mentioned before, the SPCJ 540-554 are connected electrically to IPS 814 by forming a close loop electric circuit which will provide the electric energy required to power the system's electric motors (EM) 810. Additionally, other systems components could tap-on to the same internal source of power to facilitate their operation (see FIGS. 5A, 6A, 6B, 13B, 14 and 19).

The "Electromechanical Mode of Operation" has its advantages vis a vis its "Mechanical Mode of Operation" to the extent that the descending FTC 602-614 do not have to divert some of their Kinetic Energy to power into motion their corresponding subsystems, like Gr 304-318, Ge 320-334, FTCRP 372-386 at their corresponding SPCJ 540-554. This additional kinetic energy, for example, can now be applied by the descending FTC 602-616 to power a larger EG 910-916 or be used to elevate the desired amount of PF 336 from the KT 500 on to the PT 300. Furthermore, as an optional feature in our "Electromechanical Mode of System Operation", we could introduce an Electric Motor Buster (EMB) 812 installed to all Kinetic Energy Cables (KEC) 220a-234a of the system in a type of an elevator motor arrangement to be energized by its corresponding descending FTC 602-616 upon impact contact to TS 820 to its corresponding KESP 220-234 and enhance the pull force on the KEC 220a-234a in the direction of the fall. The same TS 820 can also be designed to be used as a double switch to enhance the pull of force in the opposite direction, if desired. This in turn will increase the lift force to its corresponding LC 220b-234b thus enhancing the uplift efficiency of system fluids that will be transferred from the bottom fluid tank (KT) 500 to the top fluid tank (PT) 300 through the media path of their corresponding FDTs (402a, 402b)-(416a, 416b). This will also contribute in the increased output efficiency of our system by providing the system with a lager capacity EG 910-916. As we know, the FTCs 602-616 are the power givers of motion to our system's Electric Generators (EG) 910-916 and to the overall system design (see FIGS. 5A, 6A, 6B, 13B, 14 and 19).

Once we decide to adopt the "Electromechanical Mode of Operation" in our system design, we could then introduce a time delay functions to our system's electric motors (EM) 810 and EMB 812 or to other motor or devices in the system 10, in order to better synchronize the timing of operation to their corresponding electrical driven components. This could enhance our system's flexibility in its design characteristics, add-on capabilities, precession in its operation and greater output in its efficiency. The "Electromechanical Mode of Operation", if chosen as our system design, could not be complete without integrating in it the "Electromechanical Sequence" of Motion. This Electromechanical program of system sequence in operation, a type of command and control, is to our Electromechanical system design what the "Mechanical Sequence" of Motion was to the previous described system which utilized the "Mechanical Mode of Operation".

Let us now describe the "Electromechanical Sequence" to our "Electromechanical Mode of Operation" system design. In doing so, let us assume that the entire system of our system, is configured the same way as described before. After system start-up, at time t=0, as indicated above and as best shown in FIGS. 4A, 4B, 5A, 6A and 6B, system initiation begins by pulling FTCEP 240 via a power source 241 and keeping it pulled at a tension point on APFTCEP 240b, while the rest of the FTCEPs 242,244,246,248,250, 252,254 are already at tension at their corresponding tension points on APFTCEP 242b,244b,246b,248b,250,252b,254b via a power source 241, for as long as the system operates, unless there is an anomaly in the operation of the system 10 that would require its reengagement to stop system motion. When the FTCEP 240 is retracted, FTC 602 begins its descent, then the following happens below (see FIGS. 2, 6A, 6B, 13B, 16, and 17).

Note: Our "Electromechanical Sequence" to Electromechanical Mode of Operation follows exactly the same methodology in the path of its description as that of our "Mechanical Sequence" to "Mechanical Mode of Operation" as described above. It uses exactly the same description (see FIGS. 6A, 6B, and 14), with the addition of FIG. 13B, of the Sequential Process of motion, namely "Mechanical Sequence" to "Mechanical Mode of Operation" and the same of everything with the exception that in the operation to four of our existing system components we implement the use of electrical motors (EM) 810 instead of pulleys (SP) 262 and electrical cables instead of wire cables to trigger to motion these basic system components. The specific system components affected by this change because of the switch over to the "Electromechanical Sequence" in the "Electromechanical Mode of Operation" are: SPCJ 540-554; FTCRP 372-386; Ge 320-334; Gr 304-318 and SP 262 systems common to both modes of operation. In addition to these four system components, we introduce three additional system components: Internal Power Source (IPS) 814; Electric Motor Buster (EMB), 812 to every KEC 220a-234a and Trigger Switch (TS) 820 to every KESP 220-234 throughout the system (see FIGS. 5A, 13B and 14). The affected change will replace all impact activated SPCJ 540-554 and within them the prior corresponding impact activated system components with electrical switches, which feed off power source 814 (as shown in FIGS. 5A, 13B, 14 and 19). In doing so we are replacing every existing SP 262 located in front of each FTCRP 372-386; Ge 320-334; Gr 304-318 with EM 810. Wire cables with electrical cables between the SPCJ 540-554 and any of the said before EM 810 of the corresponding FTCRP 372-386; Ge 320-334; Gr 304-318 (see FIGS. 13B, and 14). All of their cables between their EM 810 and the FTCRP 372-386; Ge 320-334; Gr 304-318 will be the same wire cable as before that they will be activated or be deactivated according to the power supplied to their corresponding EM 810 by establishing electrical circuit continuity by their corresponding descending FTC 602-616 at their corresponding SPCJ 540-554. Because our numbering system is so complex and to avoid confusing the reader in the explanation process to our "Electromechanical Sequence" to "Electromechanical Mode of Operation," we will use the same numbering system as before, in our description of the "Mechanical Sequence" but making clear that the affected wire cables, FTCRPC 372a-386a; Gea 320a-334a and Gra 304a-318a, have been bifurcated to electrical cables between SPCJ 540-554 and the corresponding EM 810 and wire cables left alone the same way, between EM 810 and the corresponding FTCRP 372-386; Ge 320-334; Gr, 304-318. In this way when electric contact is made to switches at the corresponding SPCJ 540-554 by their corresponding descending FTC 602-616 it will energize or de-energize the corresponding EM 810 thus pulling to tension or release from tension their corresponding: FTCRPC 372a-386a; Gea 320a-334a and Gra 304a-318a (see FIGS. 6A, 6B, 14, and 13B).

The Electromechanical Mode of Operation will operate as follows:

When (a) FTC 604 Ascends, (b) FTC 602 Descends:

1a. When FTC 604 Ascends and finally locks on top of FTCRP 374 the following happens:

2a. Ejection gate (Ge) 320 CLOSES. Corresponding EM 810 loses power and tension is released from its cable 320a by breaking electrical contact continuity with pressure switch contact at point EB 642 of FTC 604 at SPCJ 542.

3a. Regulating gate (Gr), 306 CLOSES. Corresponding EM 810 loses power and tension is released from its cable 306a by breaking electrical contact continuity with pressure switch contact at point EB 642 of FTC 604 at SPCJ 542.

4a. KESP 222 RELEASED from tension from its FTC 604, is relaxing cables 222a and 222b thus causing DPA 432a to descent to the bottom of SST 404a and rest on the DLC 510.

5a. FTCRP 378 CLOSES. Corresponding EM 810 loses power and tension is released, its cable 378a no longer at tension by breaking electrical contact continuity with pressure switch contact at point EB 642 of FTC 604 at SPCJ 542.

1b. When FTC 602 Descends and finally locks on the top of the KTP 532, the following happens:

2b. Ejection gate (Ge) 322 OPENS. Corresponding EM 810 powers up and tension is placed on its cable 322a by establishing electrical circuit continuity with contact switch at point EB 640 of FTC 602 at SPCJ 540 and floods FTC 604 with PF 336.

3b. Regulating gate (Gr) 304 OPENS. Corresponding EM 810 powers up and tension is placed on its cable 304a by establishing electrical circuit continuity with contact switch at point EB 640 of FTC 602 at SPCJ 540 and floods FFB 338 with PF 336.

4b. KESP 220 goes to TENSION engaged by its FTC 602, causing cables 220a and 220b to tense thus lifting DPA 430a to the top of SST 402a. While FTC 602 engages its corresponding KESP 220, EMB 812 is activated by closing contact TS 820 that further busts the pull of KEC 220a in the direction of the fall. This will cause the PF 336 inside SST 402a to be transferred, through BTDA 430b inside UST 402b and the PF 336 already in UST 402b will be displaced onto PT 300. It should be noted that the PF 336 displaced onto PT 300 is at leased of the same volume as that ejected by FTC 602 onto KTP 532. When FTC 602 comes to rest on KTP 532 its FTCID 490 engages LDC 510 and the PF 336 of FTC 602 is emptied on to KTP 532. PF 336 will enter back into KT 500 through the Kinetic Tank Platform Floor Perforations (KTPFP) 530. While FTC 602 descents, it turns MGW pair 630a and 630b which in turn powers EG 910 thus putting electricity to the grid.

5b. FTCRP 376 OPENS. Corresponding EM 810 powers up and tension is placed on its cable 376a by establishing electrical circuit continuity with contact switch at point EB 640 of FTC 602 at SPCJ 540 thus, causing FTC 606 to DESCEND.

SAME PRINCIPLES STAND FOR THE FOLLOWING AS THEY ARE OUTLINED IN THE "MECHANICAL SEQUENCE" TO MECHANICAL MODE OF OPERATION ABOVE.

When FTC 608 Ascends, FTC 606 Descends: . . .
When FTC 612 Ascends, FTC 610 Descends: . . .
When FTC 616 Ascends, FTC 614 Descends: . . .
When FTC 602 Ascends, FTC 604 Descends: . . .
When FTC 606 Ascends, FTC 608 Descends: . . .
When FTC 610 Ascends, FTC 612 Descends: . . .
When FTC 614 Ascends, FTC 616 Descends: . . .

Single MEPU Operation

Our system 27 is comprised of a plethora of MEPU forming COU. All COU work independent from one another throughout the system to produce renewable electric energy and provide power to the electric grid. This modular plant design of COU and MEPU expansion will determine the size of our plant's capacity to satisfy consumption needs. However, our system design in this present application, through its flexibility, makes it possible to scale down the size of our system design to satisfy a single consumer requirement by utilizing the same technological principles claimed in our present application. This would be to power a single home, a farm, or a remote utility station in a remote location where power is scarce. This could be achieved by the deployment of a single MEPU. The operation of this single MEPU can be facilitated by the "Mechanical Mode of Operation" or by the "Electromechanical Mode of Operation" (see FIGS. 5A, 6A, 6B, 13B, 14 and 19). For a more efficient use of our drawings, we will consider using our application's technical principles of MEPU 150 as the example of our system's single source of sustainable green power, electric power generation, as outlined below in the "Electromechanical Mode" of operation.

In doing so, let us set the stage for this single MEPU 150, at system start-up or at t=0. Upper fluid tank (PT) 300 and lower fluid tank (KT) 500 are full of PF 336. FDT (402a, 402*b*) and (404*a*, 404*b*) pairs are full of PF 336. FFB 338 is empty of PF 336 and FFB 340 is full of PF 336. FTC 602 is resting on the top of FTCRP 372 and is full of PF 336. FTC 604 is empty of PF 336 and is resting on the KTP 532. KESP 220 is not at tension by its FTC 602 and therefore LC 220*b* and KEC 220*a* are relaxed thus placing its DPA 430*a* on the bottom of SST 402*a* and rests on the top of the LDC 510. KESP 222 is at tension by its FTC 604 and therefore LC 222*b* and KEC 222*a* are tense thus placing its DPA 432*a* on the top of SST 404*a*. Resting on the KTP 532 are EB 642 of FTC 604 establishing electric circuit continuity with contact pressure switches at SPCJ 542 thus powering the two EM 810 to keep Ge 320 and Gr 306 OPEN through their tense cables 320*a* and 306*a* respectively. Resting on the top of FTCRP 372, EB 640 of FTC 602 is not engaging the contact pressure switches at SPCJ 540 and therefore, corresponding Ge 322 and Gr 304 are CLOSED because power is not applied to their corresponding EM 810 to keep at tension their Gea 322*a* and Gra, 304*a*, respectively.

Figure 19:
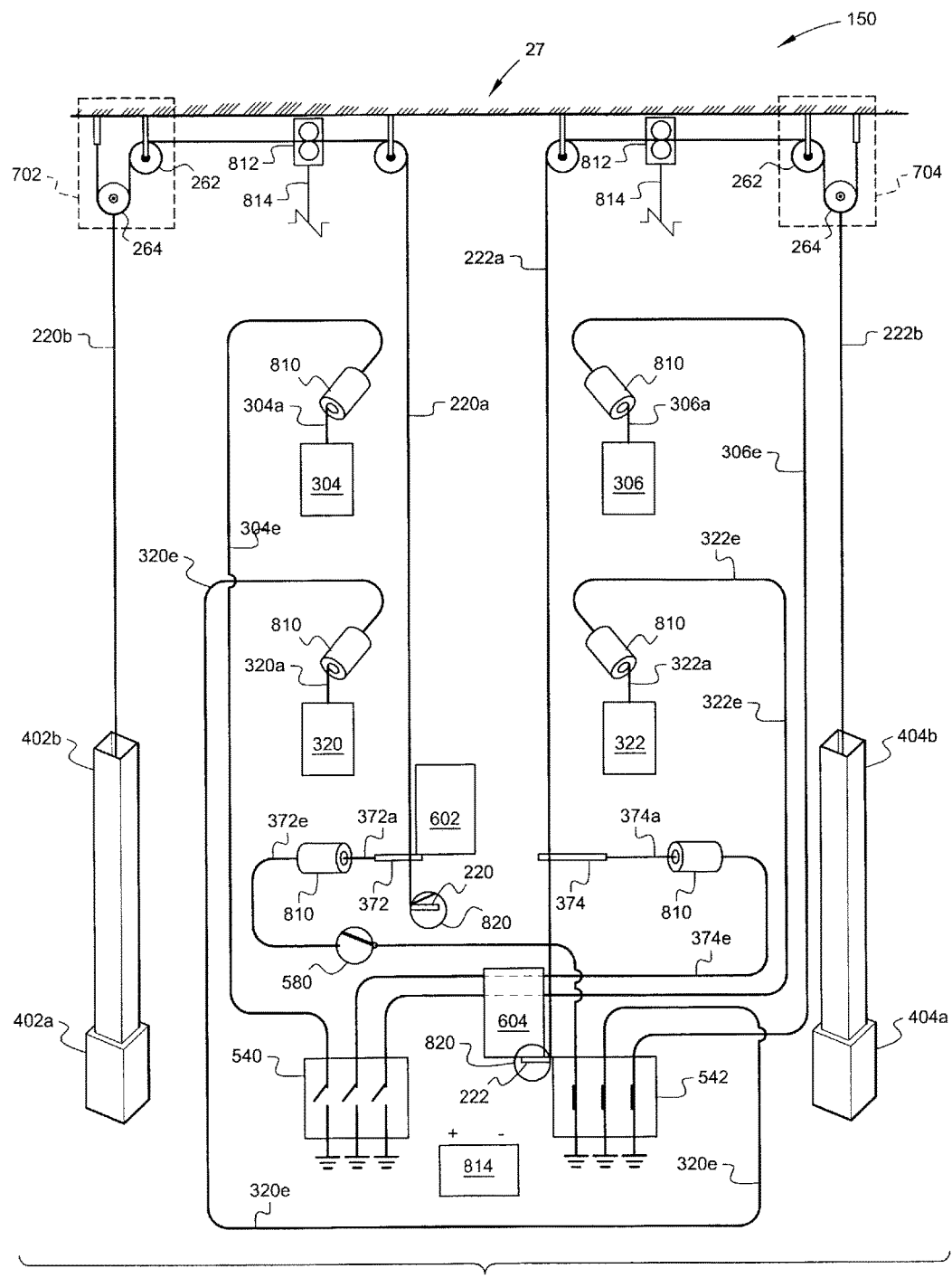
FIG. 19 is a schematic diagram of the "Single MEPU Operation" in the "Electromechanical Mode" of operation of a first, non-limiting embodiment of a system.
Figure 20:
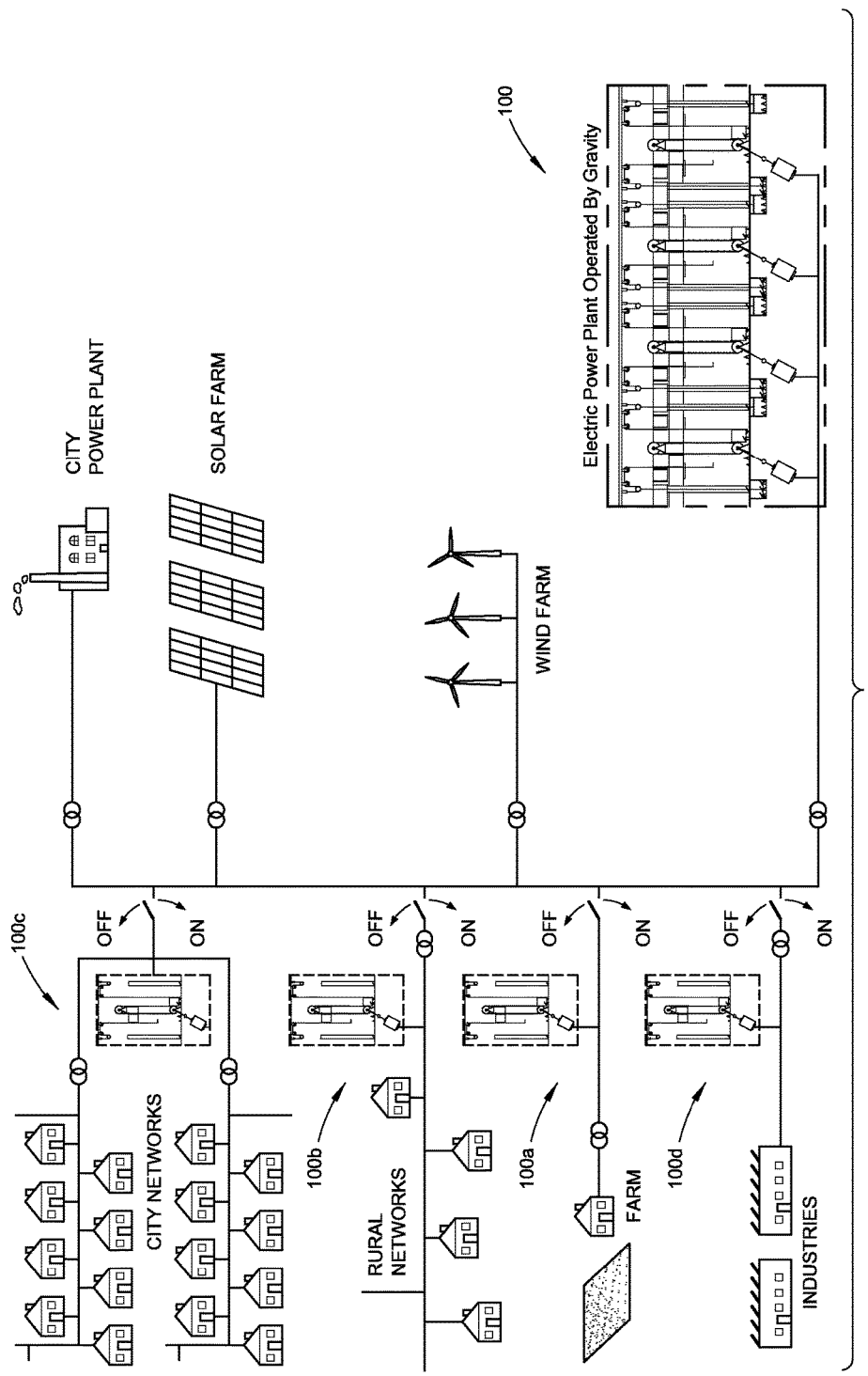
FIG. 20 is a general schematic diagram of a second, non-limiting embodiment of a system for producing energy via use of gravity according to the present invention, wherein the present invention as it relates to its contribution of providing electricity to the electric power grid similar to today's electric power plants, like solar, wind, coal, nuclear being among them. It also depicts the system of the present invention unique characteristics of providing electricity to consumers at the local levels. For example, an entire city can be taken off the grid and be powered independently by the system of the present invention. This can be further scaled down to rural networks, industries and individual farms or houses. Unlike the traditional electric power plants that require long distance transmission power lines to carry their electricity over to consumers, the system of the present invention, because of its flexibility and modularity, can be built next to the user(s)

Corresponding FTCRPC 372*a* of FTCRP 372 and FTCRPC 374*a* of FTCRP 374 are not at tension and this is why: 1) Although FTC 604 is making electrical switch contact with electric cable 372*e* at SPCJ 542 the fact that SW 580 is open at t=0 there is no electric power supplied to its EM 810 by power source 814 (as shown in FIG. 19) to put at tension FTCRPC 372*a* and therefore set into descent FTC 602 by pulling to the OPEN position FTCRP 372. 2) FTC 602 is not engaging the corresponding electrical switches at SPCJ 540 and therefore is not energizing electrical cable 374*e* to power EM 810 of FTCRP 374 and therefore FTCRP 374 is CLOSED ready to receive FTC 604 upon ascend. It should be noted that all EM 810 could have a build in time delay function in order to allow adequate time for the system to recycle and complete the discharge of PF 336 transfers into their corresponding FTC 602, 604 through their respective Ge 320, 322 from inside their respective FFB 338, 340 and also refine the feedback process. At system start-up, t=0, the electric circuit connection between EM 810 of FTCRP 372 and SPCJ 542 is OPEN and therefore both FTCRP 372 and FTCRP 374 are in the CLOSED position supporting FTC 602 and ready to support the upcoming FTC 604. Upon initiation of system motion we CLOSE, and maintain CLOSE for the duration of the MEPU 150 operation, the previous OPEN state condition that existed between SPCJ 542 and FTCRP 372 by closing SW 580 (see FIG. 19).

Power now will be supplied to the EM 810 by power source 814 and after a small time delay it will power its EM 810 to set FTCRP 372 to OPEN condition thus committing FTC 602 to descend. FTC 602 upon descent will cause FTC 604 to ascend thus breaking electric circuit continuity with its corresponding SPCL 542. This will cause FTCRP 372; Ge 320; Gr 306 to CLOSE position because of lock of further electric power supplied from the power source 814 through SPCJ 542 to them. Below we are describing how MEPU 150 and its components operate in a single MEPU 150 mode of operation.

Once the system 27 is set into motion, we observe the following:

When (a) FTC 604 Ascends, (b) FTC 602 Descends:
1a. When FTC 604 Ascends and finally locks on top of FTCRP 374 the following happens:
2a. Ejection gate (Ge) 320 CLOSES, corresponding EM 810 loses power through electrical cable 320*e* and tension is released from its cable 320*a* by breaking electrical switch contact with EB 642 of FTC 604 at SPCJ 542 thus isolating it from the power source 814.
3a. Regulating gate (Gr) 306 CLOSES, corresponding EM 810 loses power through electrical cable 306*e* and tension is released from its cable 306*a* by breaking electrical switch contact with EB 642 of FTC 604 at SPCJ 542 thus isolating it from the power source 814.
4a. KESP 222 RELEASED from tension from its FTC 604, relaxing cables 222*a* and 222*b* causing DPA 432*a* to descent to the bottom of SST 404*a* and rest on the DLC 510.
5a. FTCRP 372 CLOSES, corresponding EM 810 loses power through electrical cable 372*e* and releases tension to its cable 372*a* that is no longer at tension by breaking electrical contact with EB 642 of FTC 604 at SPCJ 542 thus isolating it from the power source 814.
1b. When FTC 602 Descends and finally locks on the top of the KTP 532, the following happens:
2b. Ejection gate (Ge) 322 OPENS, corresponding EM 810 powers up through electrical cable 322*e* and tension is placed on its cable 322*a* by making electrical contact with EB 640 of FTC 602 at SPCJ 540 thus connecting it to the power source 814 and floods FTC 604 with PF 336.
3b. Regulating gate (Gr) 304 OPENS, corresponding EM 810 powers up through electrical cable 304*e* and tension is placed on its cable 304*a* by making electrical contact with EB 640 of FTC 602 at SPCJ 540 thus connecting it to the power source 814 and floods FFB 338 with PF 336.
4b. KESP 220 goes to TENSION engaged by its FTC 602, causing cables 220*a* and 220*b* to tense thus lifting DPA 430*a* to the top of SST 402*a*. While FTC 602 engages its corresponding KESP 220, EMB 812 is energized by its corresponding TS 820 located on KESP 220 thus adding an extra pull to the KEC 220*a* in the direction of the fall. This will cause the PF 336 inside SST 402*a* to be transferred, through the BTDA 430*b* inside UST 402*b* and the PF 336 already in UST 402*b* will be displaced onto PT 300. When FTC 602 comes to rest on KTP 532, its FTCID 490 engages LDC 510 and the PF 336 of FTC 602 is emptied on to KTP 532. PF 336 will enter back into KT 500 through the Kinetic Tank Platform Floor Perforations (KTPFP) 530. While FTC 602 descents, it turns MGW pair 630*a* and 630*b* which in turn powers EG 910 thus supplying electric power to a small user.
5b. FTCRP 374 OPENS, corresponding EM 810 is activated, after a small delay, through electrical cable 374*e* and tension is placed on its cable 374*a*. This is facilitated by the electrical contact made with EB 640 of FTC 602 at SPCJ 540 thus connecting it to the power source, through electrical cable 374*e*, causing FTC 604 to DESCENT. While FTC 604 descents, it turns MGW pair 630*a*, 630*b* which in turn powers EG 910 thus supplying electricity to the remote user. It should be noted that the direction of the torque rotation, to operate EG 910, this time will be in the opposite direction than when FTC 602 was descending. For this reason, if desired, we can install RGB 920 to redirect the rotation force in the same direction as before. When FTC 604 descends and comes to rest on the KTP 532, its FTCID 490 makes contact with LDC 510, discharges PF 336 on the KTP 532 and at the same time FTC 604 makes electrical contact, through electrical cable with the corresponding pressure point switch at SPCJ 542 through its EB 642 of FTC 604. We are now at the same recycling point as we were at system start-up, t=0 and before we flipped the SW 580 and initiated system motion for the very first time. Because the SW 580 is now closed, and it will remain closed for as long as the system is in operation, then after set time delay its corresponding EM 810 will fire again, FCTRP 372 will be pulled through its FTCRPC 372a in the open position and FTC 602 will start its descent once again. This back and forth recycling process of FTC 602 and FTC 604 descent and ascend to motion will contribute to the continuous operation of MEPU 150 into electric power production. (see FIGS. 3, 5A, 13B, 14, 16, 17 and 19).

Combining MEPU to Reduce the Number of Electric Generators in the System

Figure 2:
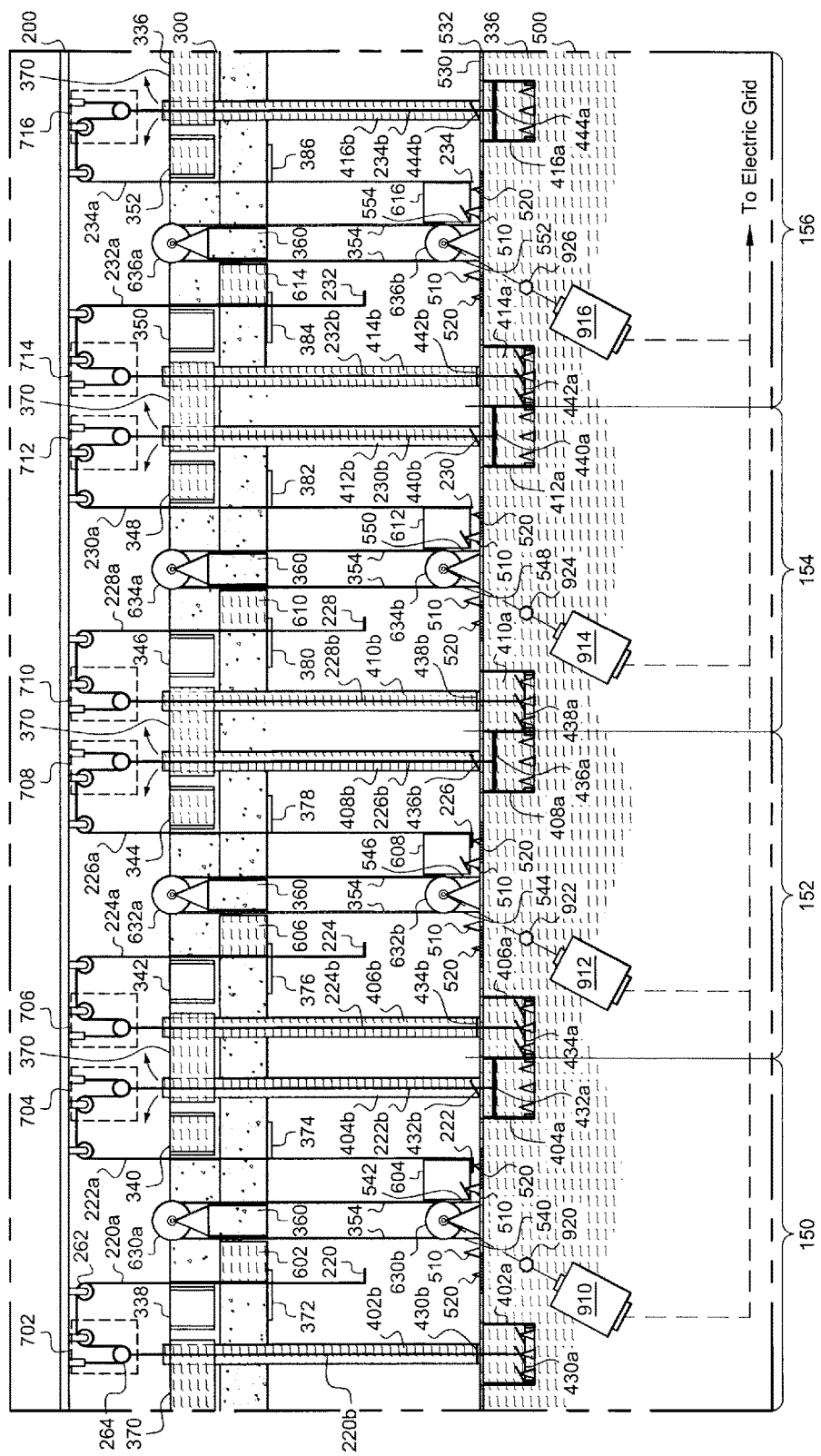
FIG. 2 is a side view of a first, non-limiting embodiment of a system of producing energy via use of gravity according to the present invention. It depicts four Multiple Energy Producing Units (MEPU) along with most of their working components as they form together one Complete Operating Unit (COU). This COU, by itself, is capable of providing electric power to the electric grid. They can be duplicated many times over, in a form of modular expansion, to increase the output capacity of the system of producing energy as desired.
Figure 3:
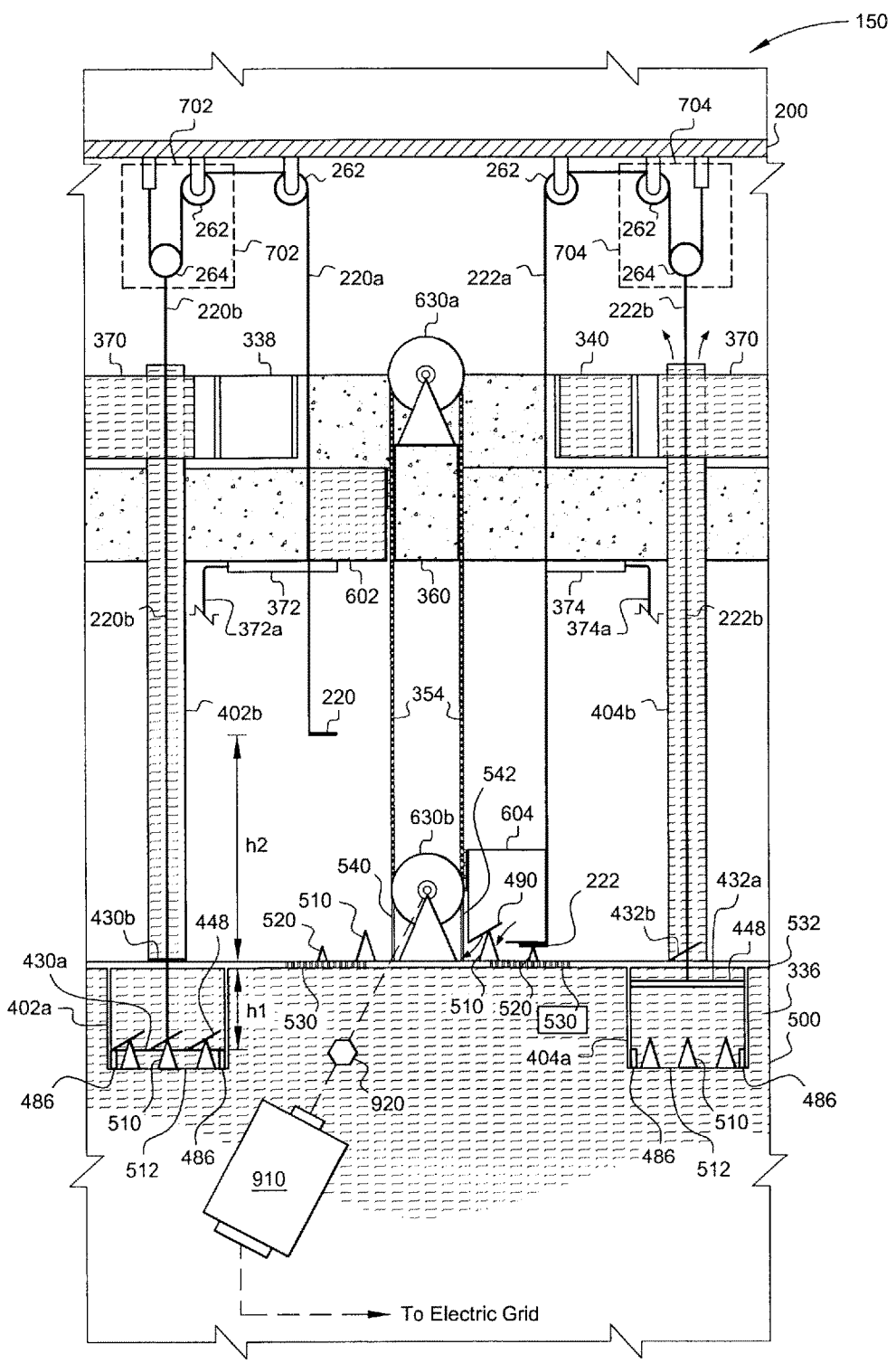
FIG. 3 is a side view of the working components associated with one MEPU of a first, non-limiting embodiment of a system of producing energy via use of gravity according to the present invention. A desired number of these units in a form of modular expansion forming COU could determine the size requirements of the system.
Figure 4A:
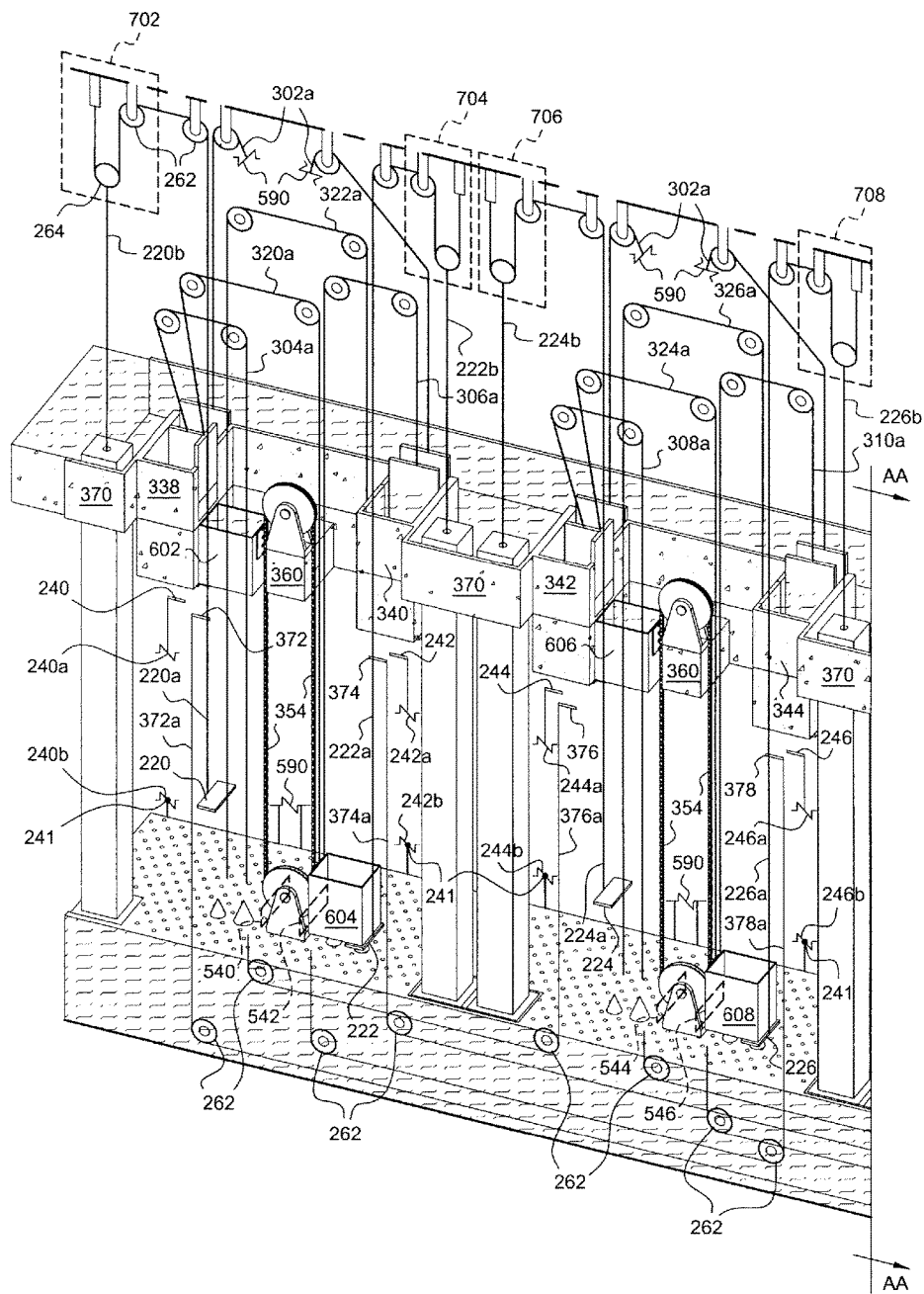
FIG. 4A and FIG. 4B are perspective, side views of a four MEPU system design, or COU, of a first, non-limiting embodiment of a system of producing energy via use of gravity according to the present invention, showing most of the system components, pulleys, cables, gates, Fluid Feeding Bays (FFB) and so on as they pertain to the four MEPU system design configuration and operation. This COU can clearly be identified with most of its working components.
Figure 4B:
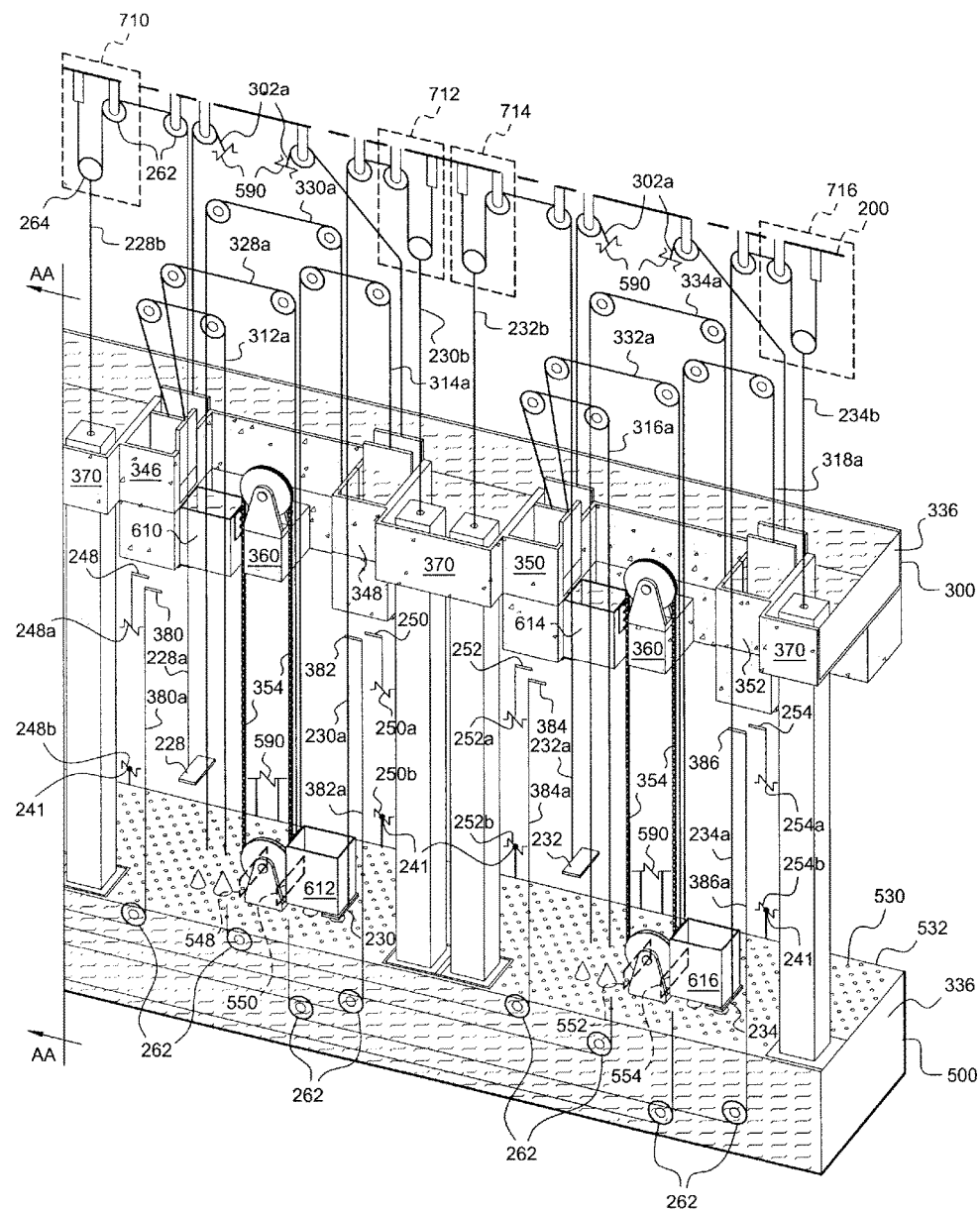
Figure 4C:
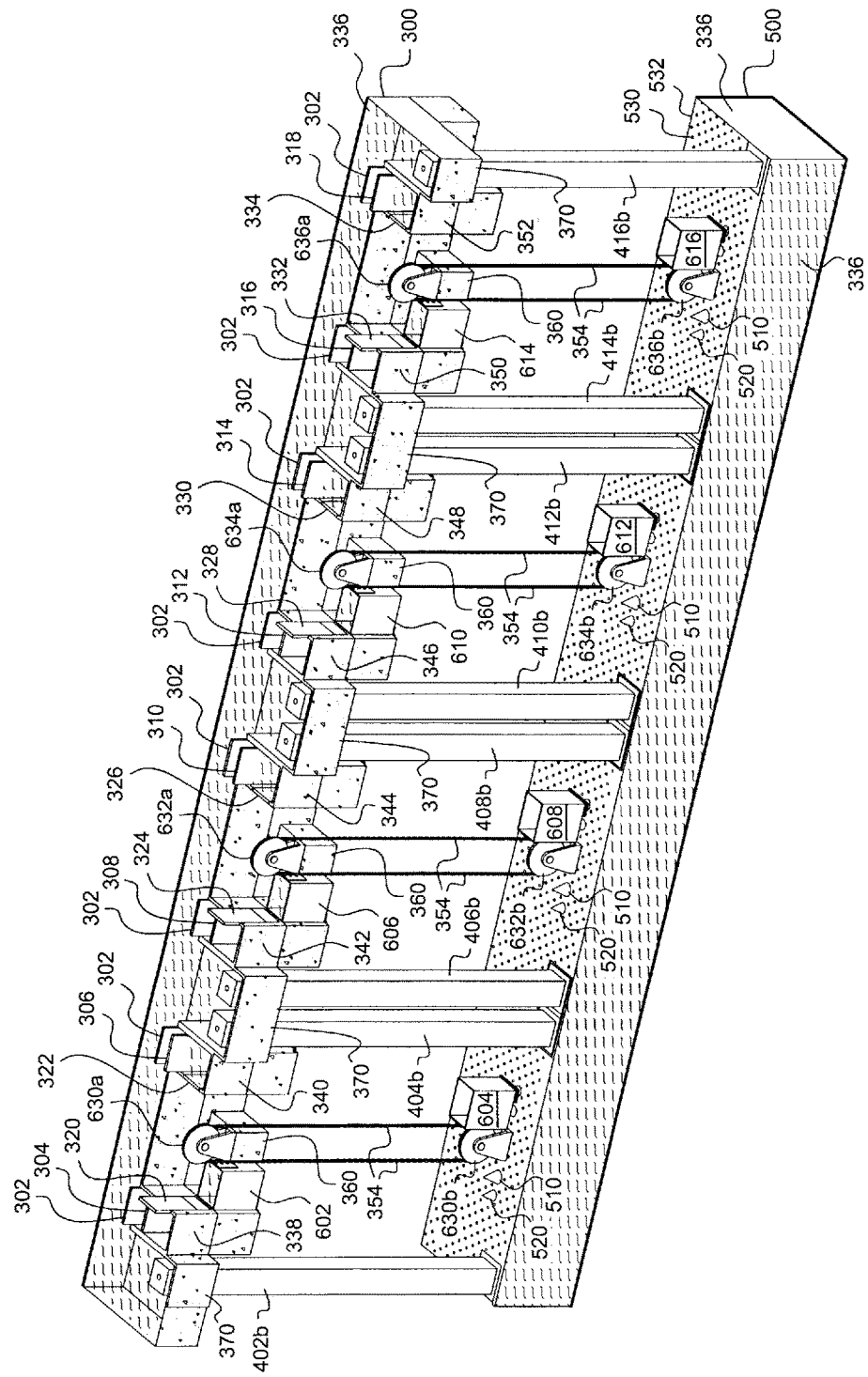
FIG. 4C is a perspective, side view of a four MEPU system design, or COU, of a first, non-limiting embodiment of a system of producing energy via use of gravity according to the present invention, showing most of the system components as they pertain to four MEPU system design operation without the system's pulleys and cables.
Figure 5A:
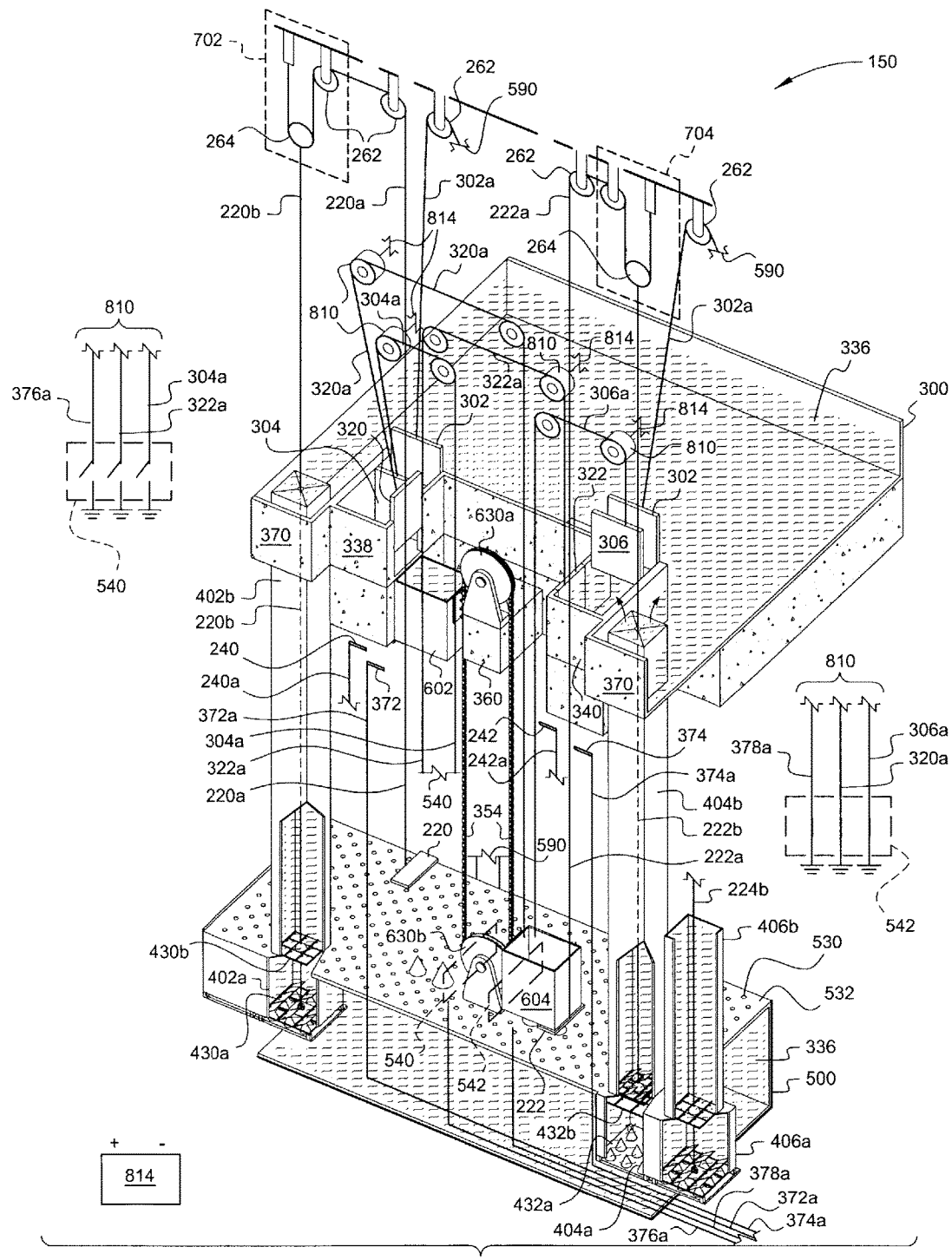
FIG. 5A is a perspective, side view of one MEPU of a first, non-limiting embodiment of a system of producing energy via use of gravity according to the present invention, showing most if not all, of the MEPU components along with its corresponding Fluid Displacement Tanks (FDT). The MEPU in this figure is comprised practically of the same system working components and operate in a similar manner as all MEPU in the system, adhering to the guiding principles discussed in the "Electromechanical Mode" of operation.
Figure 5B:
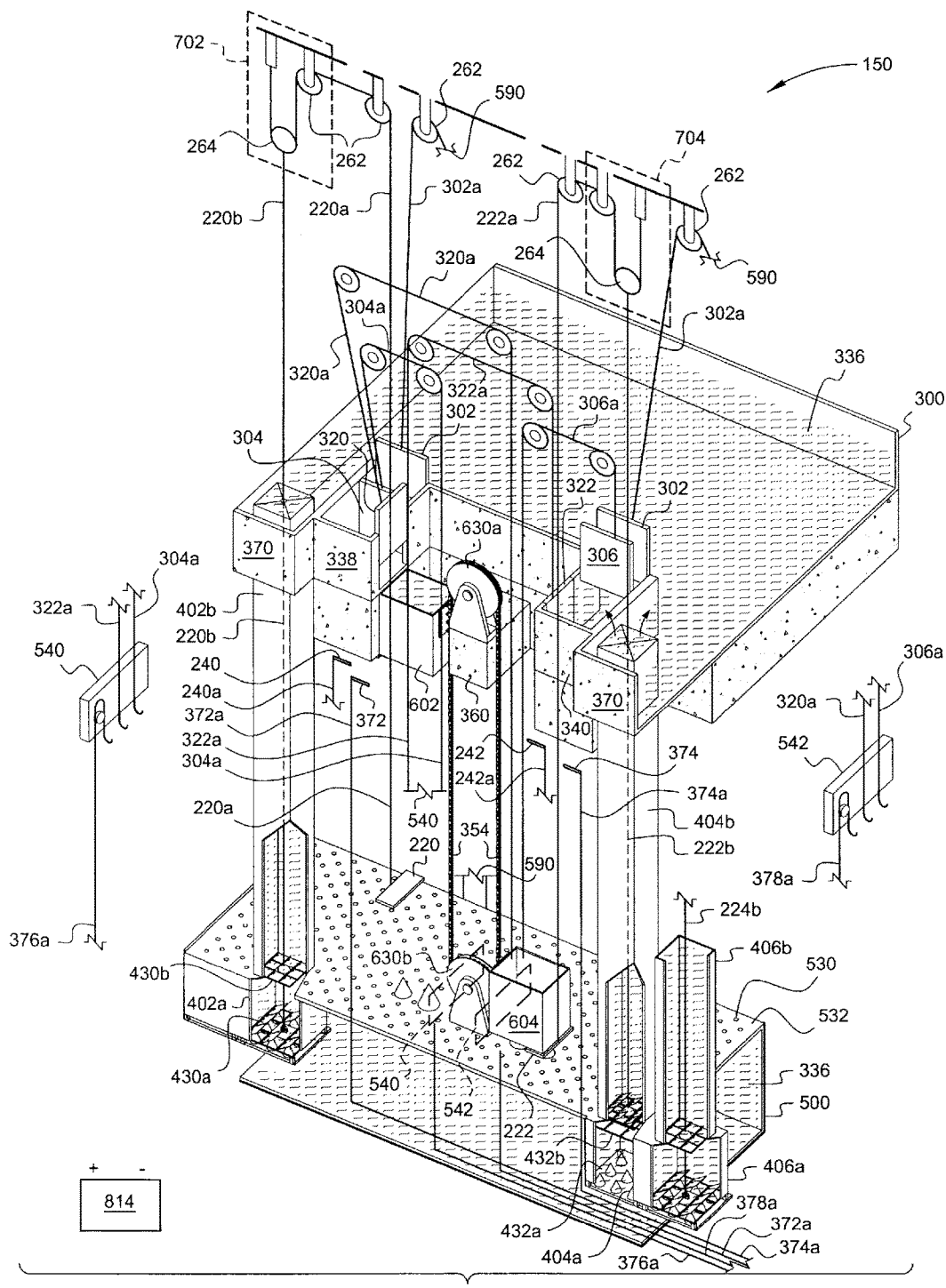
FIG. 5B is a perspective, side view of one MEPU of a first, non-limiting embodiment of a system of producing energy via use of gravity according to the present invention that is similar to FIG. 5A, showing most of the system components along with the perspective view of its corresponding FDT as outlined above. The MEPU in this figure is comprised and operated in a similar manner like all MEPU in the system, adhering to the guiding principles as discussed in the "Mechanical Mode" of operation.

In FIG. 2, we have four EGs 910, 912, 914, 916 powered by their corresponding MEPUs 150, 152, 154, 156. Specifically, each generator is powered, separately, by the decent of their corresponding FTC (602, 604); (606, 608); (610, 612); (614, 616) pairs of their respective MEPUs 150, 152, 154, 156, as specified by the above Mechanical or Electromechanical Sequence (see FIGS. 6A and 6B). That is to say that each EG 910-916 is activated sequentially according to the operation of their corresponding MEPUs 150-156 and according to the "Mechanical Sequence" and/or "Electromechanical Sequence" of the system operation as described above. In this way, for example, when one of the four generators EG 910 is powered and provides electricity to the grid the other three EG 912, 914, 916 remain idle, waiting for their turn, while the system 10 is recycling its potential throughout. However, in FIG. 7, we make a case where by we combine the operation of two adjacent MEPUs 150, 152 to drive one single EG 910 or 912. In this case, on one hand, we have MEPU pair 150 and 152 driving one EG 910 or 912, thus combining EG 910 and EG 912 to a single EG half the time. On the other hand, we have MEPU pair 154 and 156 driving the combination of EG 914 and EG 916 to a single EG the second half of the time. Taking it one step further, in FIG. 8, we have the combination of the system's four MEPUs 150, 152, 154, 156 to drive a single EG, the combination of EG 910, 912, 914 and 916 continuously or so called all the time. The "Mechanical Sequence" or the "Electromechanical Sequence" of the system in this combined operation is not compromised and it remains the same, as before, throughout the operation of the system 10. Gear boxes (GB) 930 and Connecting Shafts (CS) 932 are employed for this purpose.

Examples of Mechanical Advantage Used by Our System's LADMA

Example 1

As previously stated, our system 10 is employing LADMA 702-716, with MA=2. The system's way of operation and the unique characteristics of its FTCs 602-616 to be the receptors that bind and ride on the force of gravity, that represents the fuel, and translates its energy of force into motion through the principals of potential energy to kinetic energy conversion, coupled with the use of the system's unique design of its FDT (402a, 402b)-(416a, 416b) to obtain fluid height and fluid recycling, has provided us with the required system motion. Let us for example say that our system's dimensions, in meters (1 m=3.3 ft), of its SST 402a-416a are L=1 m, W=1 m, H=1 m and that the converging dimensions of their corresponding UST 402b-416b are L=0.4 m, W=0.4 m then we have H=6.25 m (20.63 ft) for the same volume of fluid. If the PF 336 is water in the system then the volume inside the SST 402a-416a, UST 402b-416b and FTC 602-616 would be 1,000 kg or 1 tone or 9,806.65 Newtons being of equal volume. We can then lift LC 220b-234b with 2,000 kg (19,612N) one meter of height by simply applying 1,000 kg (9,806.7N) of force to its corresponding KEC 220a-234a by its corresponding descending FTC 602-616 and pulling it two meters down (see FIG. 9). In essence what we have here is a system with an approximate separation of about 5 m (16.5 ft) of potential height between its PT 300 and its KT 500. The extra 1.25 m in height is lost due to the PF 336 heights above the base measuring point of the PT 300 and its clearance provided to the upper part of the UST 402-416 that clears this PF 336 on the PT 300 (see FIGS. 2, 3, 4A, 9, 16, and 17).

Example 2

We now apply the same system design as above but we increase the LADMA 702-716 from MA=2 to MA=4. Using the same SST 402a-416a dimensions as before, L=1 m, W=1 m, H=1 m and the converging dimensions of their corresponding UST 402b-416b of L=0.4 m and W=0.4 m but we now have increased the UST 402b-416b H=18.75 m (61.88 ft). This is derived by increasing the previous height above the KTP 532 by a factor of three (6.25 m×3=18.75 m). Therefore, the PF 336 volume in the UST 402b-416b is three times greater than that in the corresponding SST 402a-416b and in its corresponding descending FTC 602-616 of 1,000 kg (9,806N). This is because in a MA=4 pulley configuration, under the principle of pulley theory, defines the lift force as being four times as greater than the applied force to the KESP 220-234 by traveling the KEC 220a-234a four times the distance as that of the lifted distance by its corresponding LC 220b-243b. If for example the PF 336 in our system is made out of water then the SST 402a-416a and FTC 602-616 would contain 1,000 kg (9,806N) each of PF 336. The UST 402b-416b would contain 3,000 kg (29,418N) each of PF 336. We would now be able to lift LC 220b-234b with 4,000 kg (39,224N) each one meter height by simply applying a force of 1,000 kg (9,806.7N) to its corresponding KEC 220a-234a by its corresponding descending FTC 602-616. In essence what we now have is a new version of the previous system, system design, but with an approximate separation of about 17 m (56.1 ft) of potential height between its PT 300 and its KT 500. The extra 1.75 m in height is lost due to the potential fluid 336, height above the base measuring point of the PT 300 and its clearance provided to the upper part of the UST 402b-416b that clears the said PF 336 (see FIGS. 2, 3, 4A, 9, 16, 17). It should be noted that this increase in potential height was mainly achieved by simply changing the system's MA from M=2 to M=4 to its LADMA 702-716 and the change in composition of their corresponding FDT (402a, 402b)-(416a, 416b) by adding two more height lengths for a total of three to the previous UST 402b-416b plus the PF 336 volume in the SST 402a-416a that counts for one more unit thus giving us a total of four unites of volume vis a vis one PF 336 of volume In the corresponding FTC 602-616. We should point out that the higher the separation between the system's PT 300 and KT 500 is, the higher the efficiency of the system will be and its output capacity. The higher the separation between the PT 300 and the KT 500 is, the longer the distanced of travel by the system's descending FTC 602-616 will be thus also contributing to a longer time operation of each of their corresponding EG 910-916. In addition, the higher the system's separation the higher the system's potential energy to kinetic energy conversion will be thus aiding in the overall efficiency of the system's output power generation (see FIGS. 2, 3, 4A, 9, 16, 17 and 19).

Example 3

Let us now apply the same system design as in the above two examples but increase the LADMA 702-716 from MA=2 and MA=4 to MA=8. Using the same SST 402a-416a dimensions as in the previous two examples, L=1 m, W=1 m, H=1 m and the same L=0.4 and W=0.4 of their corresponding UST 402b-416b we can now increase the UST H=43.75 m (165 ft). This is because in a MA=8 pulley configuration the principle of pulley theory defines the lift force on LC 220b-234b as being eight times as greater as the applied force to the KESP 220-234 by forcing the KEC 220a-234a to travel eight times as much as the lifted distance of LC 220b-243b. If for example the PF 336 is made out of water in the system then the volume inside the SST 402a-416a and FTC 602-616 would be 1,000 kg (9,806N) being of equal volume. We can then lift LC 220b-234b with 8,000 kg (78,448N) one meter height by simply applying 1,000 kg (9,806N) of force to its corresponding KEC 220a-234a by its corresponding descending FTC 602-616 and pulling it eight meters down (see FIG. 10). In essence what we have now is a new version of the previous systems, system designs, but with an approximate separation of about 48 m (159 ft) of potential height between its PT 300 and its KT 500. The extra 2 m (6.6 ft) in height is lost due to the potential fluid PF 336 height above the base measuring point of the potential PT 300 and that of the upper part of the UST 402b-416b that clears the said PF 336 (see FIG. 10). Again, this tremendous increase in potential height was mainly achieved by simply changing the system's MA from MA=4 to MA=8 of its LADMA 702-716 and the change in composition of their corresponding FDT (602a, 602b)-(616a, 616b). In translation, in this MA=8 system design, we have increased the height of the UST 402b-416b above the KTP 532 by sevenfold (6.25 m×7=43.75 m or 144.38 ft). Therefore, the PF 336 volume in the newly configured UST 402b-416b is seven times more than the PF 336 volume of its corresponding SST 402a-416a and the PF 336 volume in its corresponding descending FTC 602-616 (see FIGS. 2, 3, 9, 10, 16, 17 and 19)

Note: In the above three examples, we outlined the methodology whereby we achieved increased potential height separation between the system's PT 300 and KT 500. This is premised upon the process and working component design as claimed and described in this present application which produces energy to power our system 10. Here for each volume of PF 336 ejected by each descending FTCs 602-616 onto the KTP 532 we have, at least, an equal amount of PF 336 recycling on to the PT 300 through the system's unique patent design to its corresponding FDT (402a, 402b)-(416a, 416b) and its corresponding fluid lift mechanism, LADMA 702-716. As we can see, we have managed to successfully recycle to the upper fluid tank (PT) 300 the same amount of fluid as that ejected by each of the system's FTC 602-616 on to the KTP 532 and at the same time we have managed to provide motion to its corresponding EG 910-916 to produce electricity to the grid for the duration of the FTC 602-616 descent.

Example 4

Let us now take it a step further. We can now say that our system electric power generation, can maintain the same PF 336 volume in the corresponding FTC 602-616 but change the volume shape configuration in their corresponding FDT (402a, 402b)-(416a, 416b). Let us use the following example: In an MA=4, LADMA, 702-716 system design configuration, we set our PF 336 to be made out of water. Therefore, its weight is 1,000 kg (1,000 kg×9.806 m/s2=9,806N) per cubic meter. The PF 336 volume in each corresponding FTC 602-616 is 1,000 kg (9,806.7N). Our corresponding SST 402a-416a is set to have a PF 336 volume of 1,250 kg (12,257.5N) and our corresponding UST (402b, 416b) is set to have a PF 336 volume of 2,750 kg (26,966.5N). This will give us a total of 4,000 kg (39,224N) of PF 336 weight to be lifted by the corresponding LC 220b-234b of our LADMA 702-716 when the corresponding FTC 602-616 strikes its corresponding KESP 220-234 as described above. The distance separation between the PT 300 and the KT 500 will be approximately 10 meters (33 ft) in height in this configuration, provided that the SST 402a-416a have a H=1 m and a volume of 1,250 kg; and UST 402b-416b have L=0.5M, W=0.5N and H=11 m (one meter is taken off the UST 402b-416b because of the equivalent PF 336 of 250 kg contained in the L=0.5 m, W=0.5 m and H=1 m to be used in the increased new volume of the SST 402a-416a). This is in line with the MA=4 pulley principles of operation. The PF 336 volume displaced on the PT 300 will be that of the PF 336 elevated by the SST 402a-416a, 1,250 kg (12,257.5N) and transferred into UST 402b-416b. Since the UST 402b-416b has already 2,750 kg (26,966.5N) of PF 336 it will displace 1,250 kg (12,257.5N) of it into the PT 300. Therefore, the descending FTC 602-616 will facilitate the elevation of PF 336 of 1,250 kg (12,257.5N) onto the PT 300 while the same FTC 602-616 will eject 1,000 kg (9,806N) of PF, 336 into the KT 500 through the FP 530 of KTP 500. The force that each descending FTC 602-616 strikes its corresponding KESP 220-234 of each corresponding LADMA 702-716 is much greater than the force required to lift its corresponding load, on DPA 430a-444a and in turn recycle, through its corresponding FDT (602a, 602b)-(616a, 616b) a larger amount of PF 330 on to PT 300 than that ejected by the FTC 602-616 on to the KTP 532. If for example in the above MA=4 system design the required weight placed on the KESP 220-234 is 1,000 kg (1,000 kg×9.806N=9,806N) to lift a load of 4,000 kg (4,000 kg×9.806=39,224 N), the descending FTC 602-616 with its kinetic energy momentum due to its descending force when it strikes the KESP 220-234 will be much greater and therefore it can lift much more PF 336 in to the upper PT 300 from the bottom KT 500 than that ejected on the KTP 532 by the descending FTC 602-616. At the same time, it will provide the power in a form of torque that it is required to operate its corresponding EG 910-916 for the duration of its descent and supply electricity to the grid (see FIGS. 2, 3, 9, 16, 17 and 19).

Note: The tremendous power that is generated by the above system designs, as claimed in this present application, is due to the conversion of the potential energy to the kinetic energy by the process of the descending FTC 602-616 of the system 10 and then by the recycling process of PF 336 to convert kinetic energy back in to potential energy by the recycling PF 336 process through the system's FDT (402a, 402b)-(416a, 416b), LADMA 702-716 and system's "Mechanical Sequence" and or "Electromechanical Sequence" processes. As explained before, each MEPU 150, 152, 154, 156 drives its corresponding EG 910-916 by their corresponding descending FTC 602-616. The higher the distance separation between the PT 300 and the KT 500 the more the traveling FTC 602-616 descending distance would be, and the higher the power output to drive the EG 910-916 through the conversion of potential energy to kinetic energy. The larger the system's FTC 602-616 and its corresponding FDT (602a, 602b)-(616a, 616b) are, the higher the output power and efficiency of the system will also be.

Continuous Descent and Dynamic Descent

Figure 18:
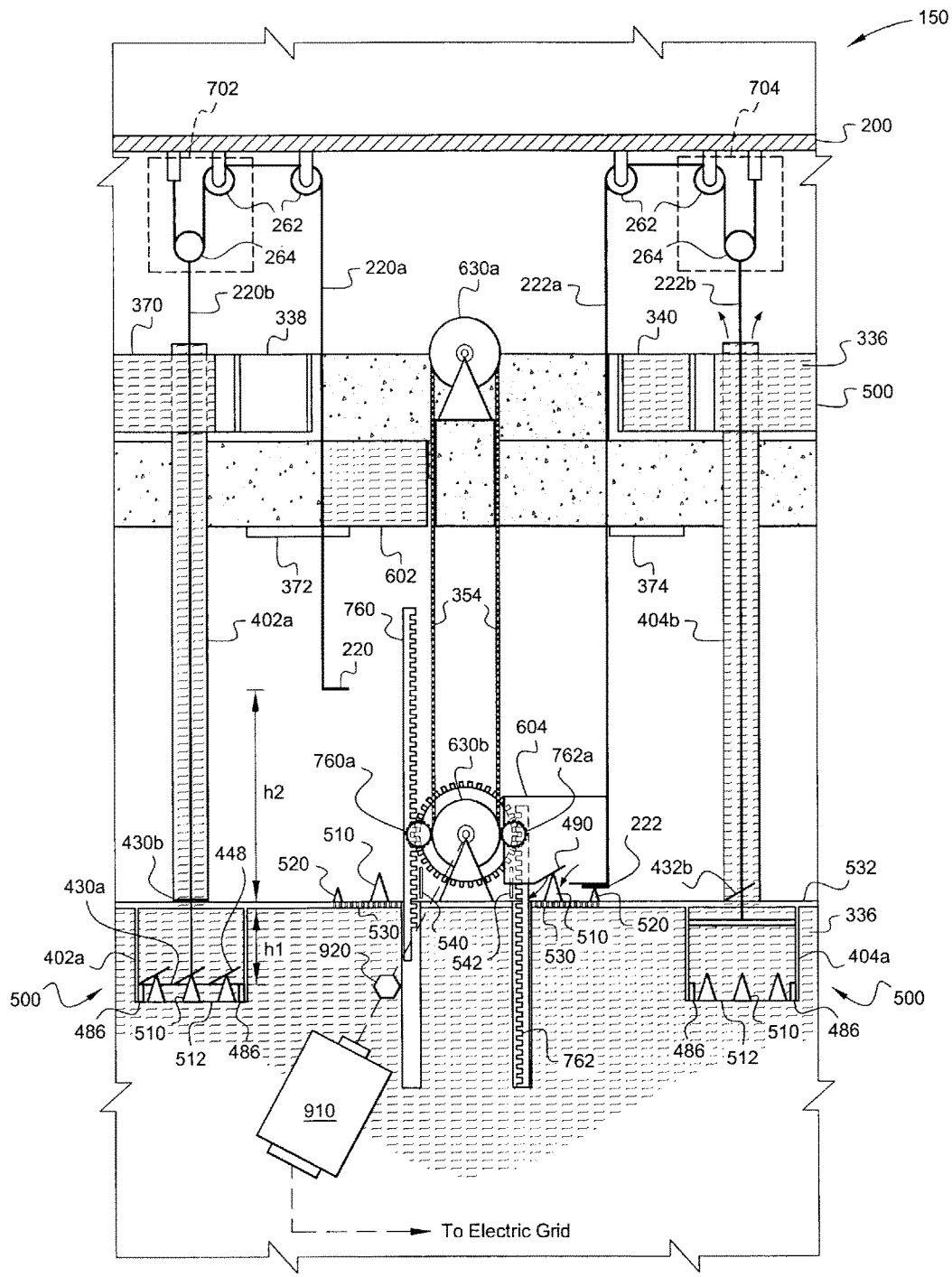
FIG. 18 is a side view of a schematic diagram of one MEPU of a first, non-limiting embodiment of a system that utilizes the concept of Dynamic Descent to System operation.

There are two methods of operation that are mentioned in this patent application. One of them is the CONTINUOUS DESCENT which is used throughout our above system design and the other method is the DYNAMIC DESCENT which is depicted in FIG. 18 and briefly explained below. However, there could be other ways of FTC 602-616 descent, that are not mentioned here, that could be used under the principles of this system design.

CONTINUOUS DESCENT is the methodology used above throughout our system design. Specifically, the bottom four Motor Gear Wheels (MGW) 630b-636b of our system 10 are constantly engaged in driving their corresponding electric generators EG 910-916 throughout the descending period of their corresponding FTC 602-616. This continuous mechanical power placed by the corresponding MGW 630b-636b on their corresponding electric generators EG 910-916 for the duration of their corresponding FTC 602-616 descent justifies this Method to be called CONTINUOUS DESCENT (see FIGS. 2, 3, 4A, 4B, 5A, and 5B).

DYNAMIC DESCENT is the methodology used, when the bottom four Motor Gear Wheels (MGW) 630b-636b of our system are not engaged in rotation upon most of the descending distance of their corresponding FTC 602-616. The electric generators are engaged only when their corresponding FTC 602-616 strikes their corresponding Gear Bar Rod (GBR) 760, 762, 764, 766, 768, 770, 772, 774 and it will through a Transmission Unit (TU) 760a, 762a, 764a, 766a, 768a, 770a, 772a, 774a engage their corresponding EG 910, 912, 914, 916 thus supplying electricity to the grid for the duration of their motion (see FIG. 18). This Free Fall methodology of the FTC 602-616 descent unleashes a lot of kinetic energy in the process and it can drive larger EG 910-916 to deliver higher quantity of electricity to the grid, but for a shorter duration of time. In FIG. 18, we see the design of the system's MEPU 150 in the dynamic descending operation. We could now duplicate this Dynamic Descent design for MEPUs 150, 154 and 156 and therefore, we have converted the entire system to Dynamic Descent System Operation. All of the rest system functions and components operate the same way as described before in the Continuous Descent method of operation. Therefore, we have an easy conversion of system preference from Continuous Descent to Dynamic Descent.

Figure 21:
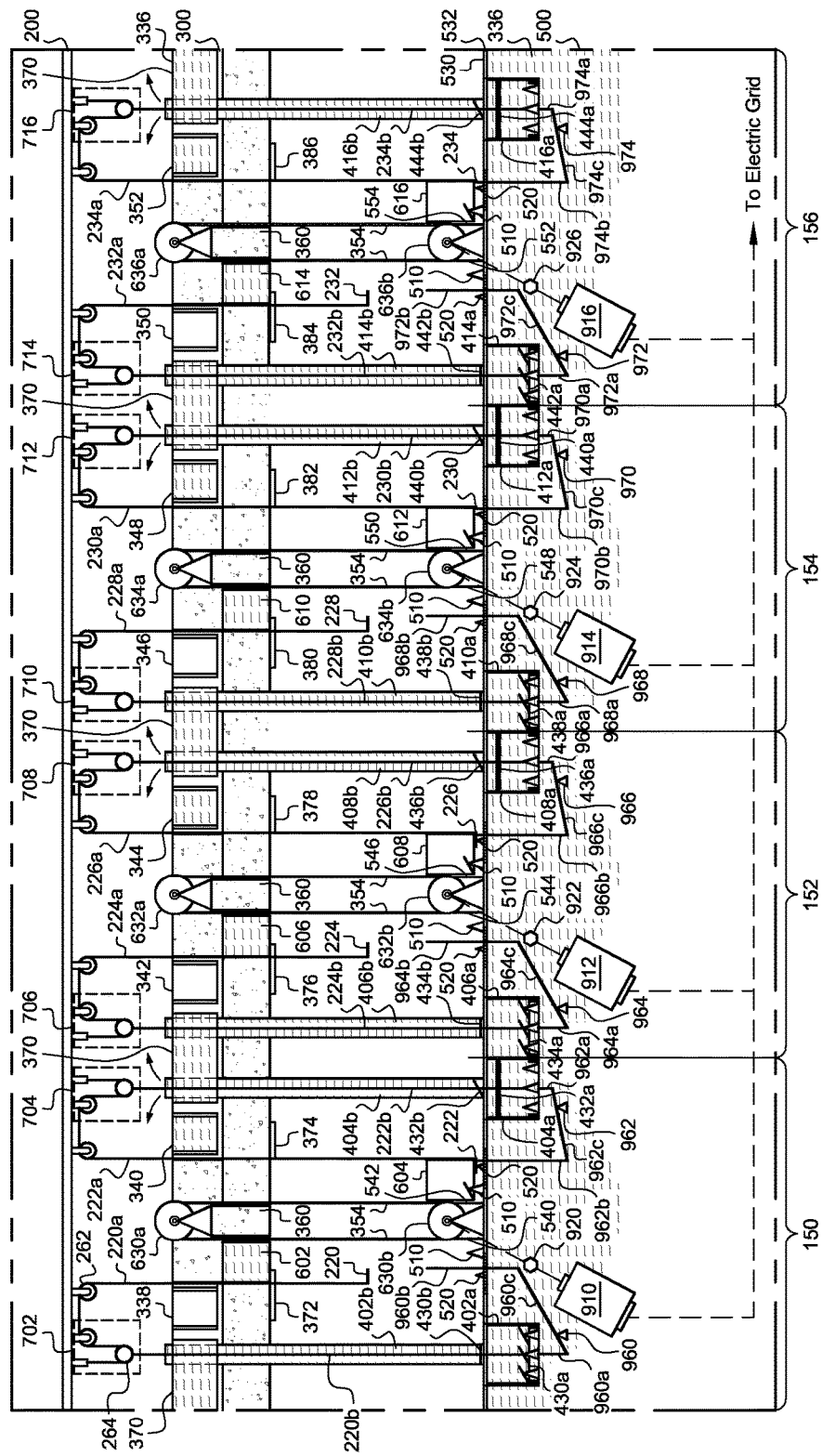
FIG. 21 is a side view of a second, non-limiting embodiment of a system of producing energy via use of gravity according to the present invention. It depicts four Multiple Energy Producing Units (MEPU) along with most of their working components as they form together one Complete Operating Unit (COU). This COU, by itself, is capable of providing electric power to the electric grid. They can be duplicated many times over, in a form of modular expansion, to increase the output capacity of the system of producing energy as desired. This second embodiment now further includes (preferably) a pair of lever mechanisms associated with each corresponding MEPU.
Figure 22:
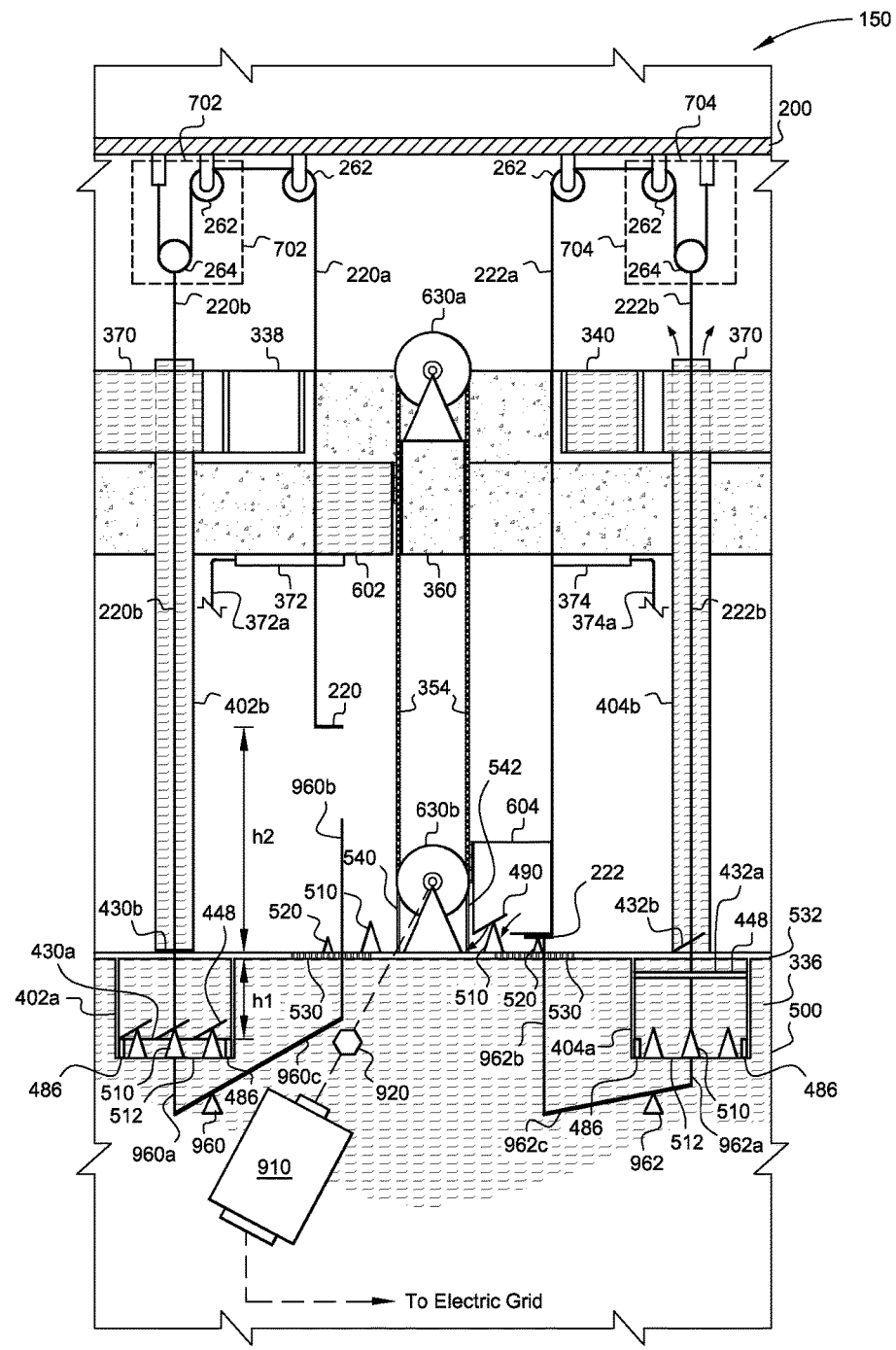
FIG. 22 is a side view of the working components associated with one MEPU of a second, non-limiting embodiment of a system of producing energy via use of gravity according to the present invention. A desired number of these units in a form of modular expansion forming COU could determine the size requirements of the system. This second embodiment now further includes (preferably) a pair of lever mechanisms associated with the MEPU.
Figure 23A:
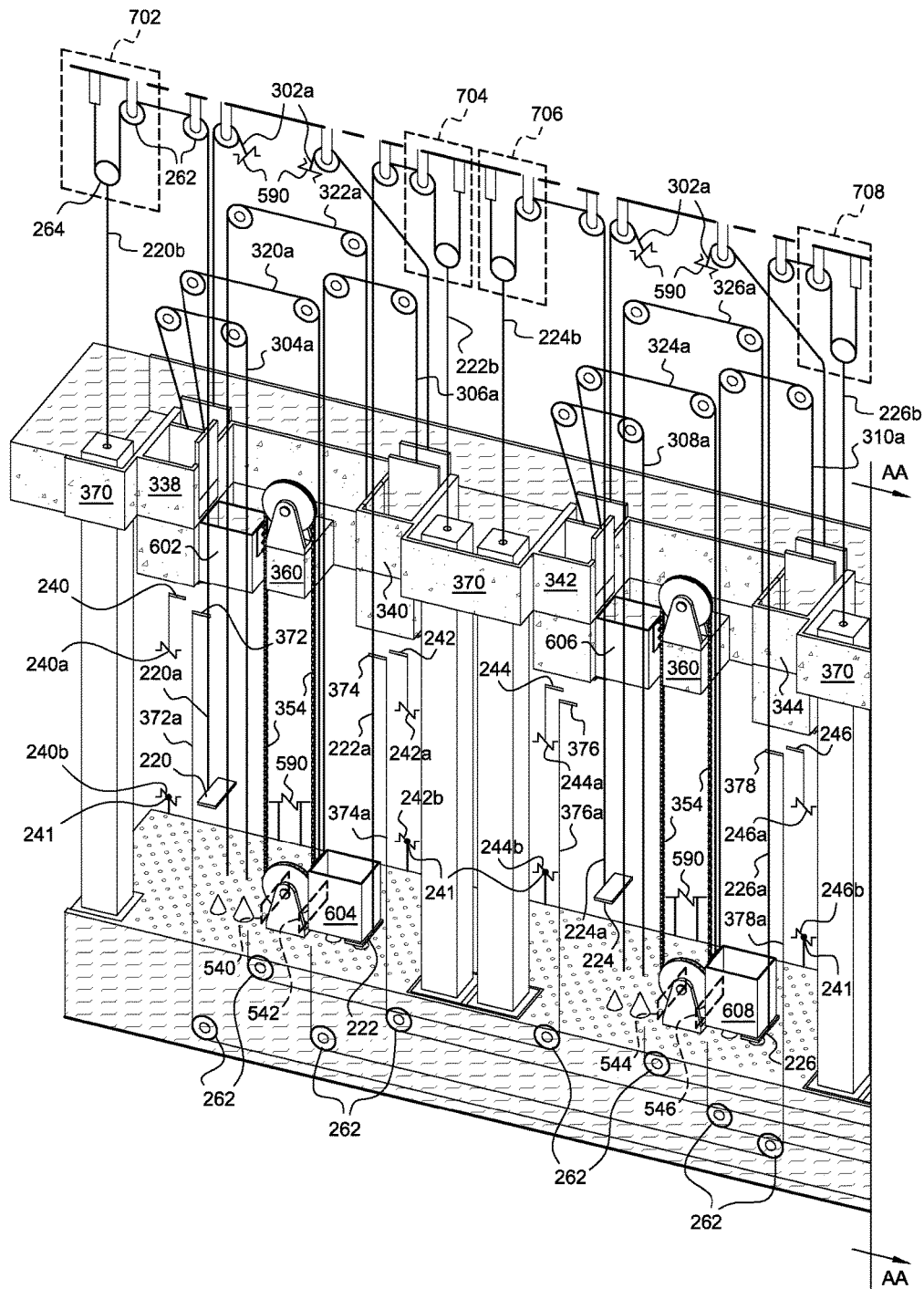
FIG. 23A and FIG. 23B are perspective, side views of a four MEPU system design, or COU, of a second, non-limiting embodiment of a system of producing energy via use of gravity according to the present invention, showing most of the system components, pulleys, cables, gates, Fluid Feeding Bays (FFB) and so on as they pertain to the four MEPU system design configuration and operation. This COU can clearly be identified with most of its working components.
Figure 23B:
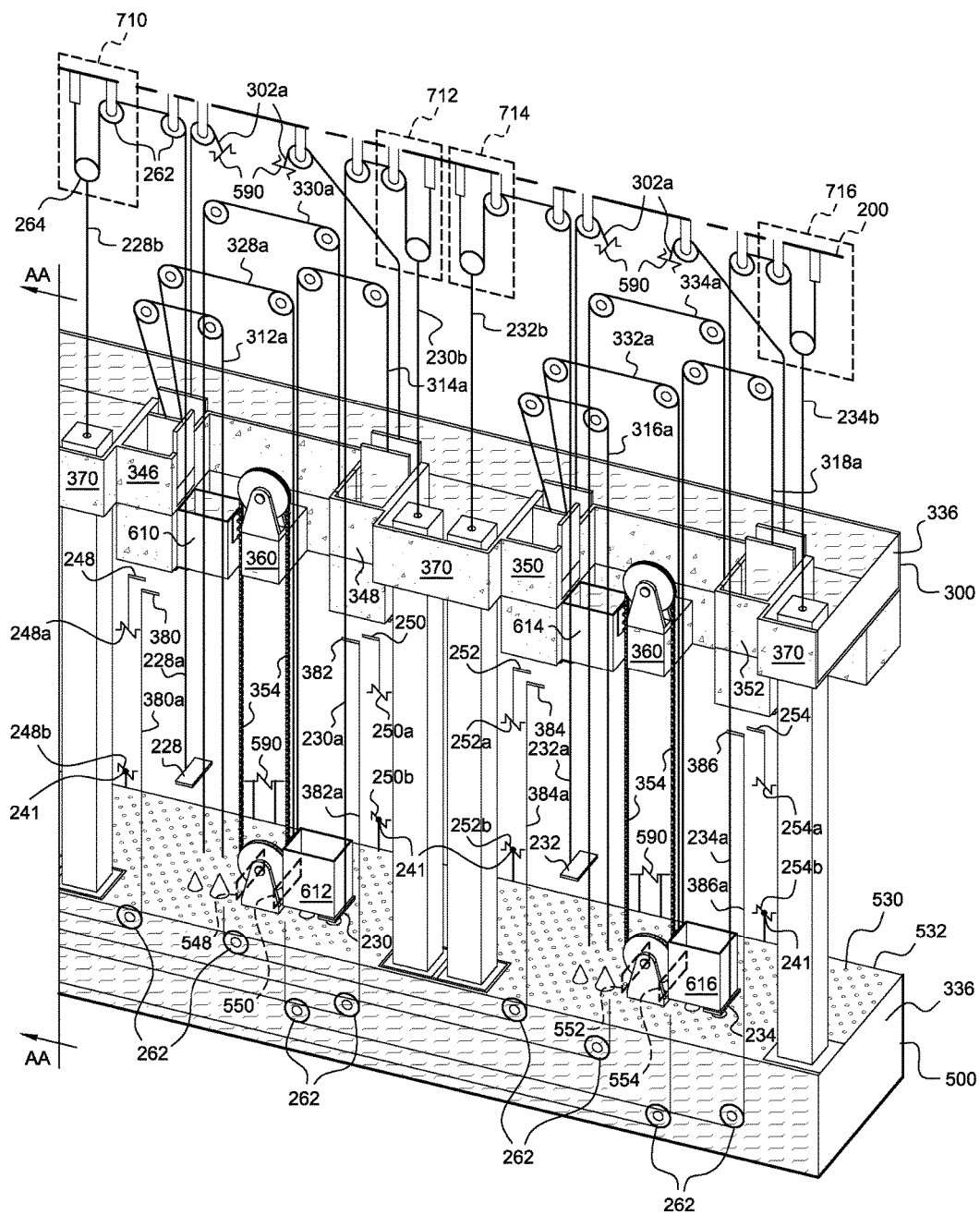
Figure 23C:
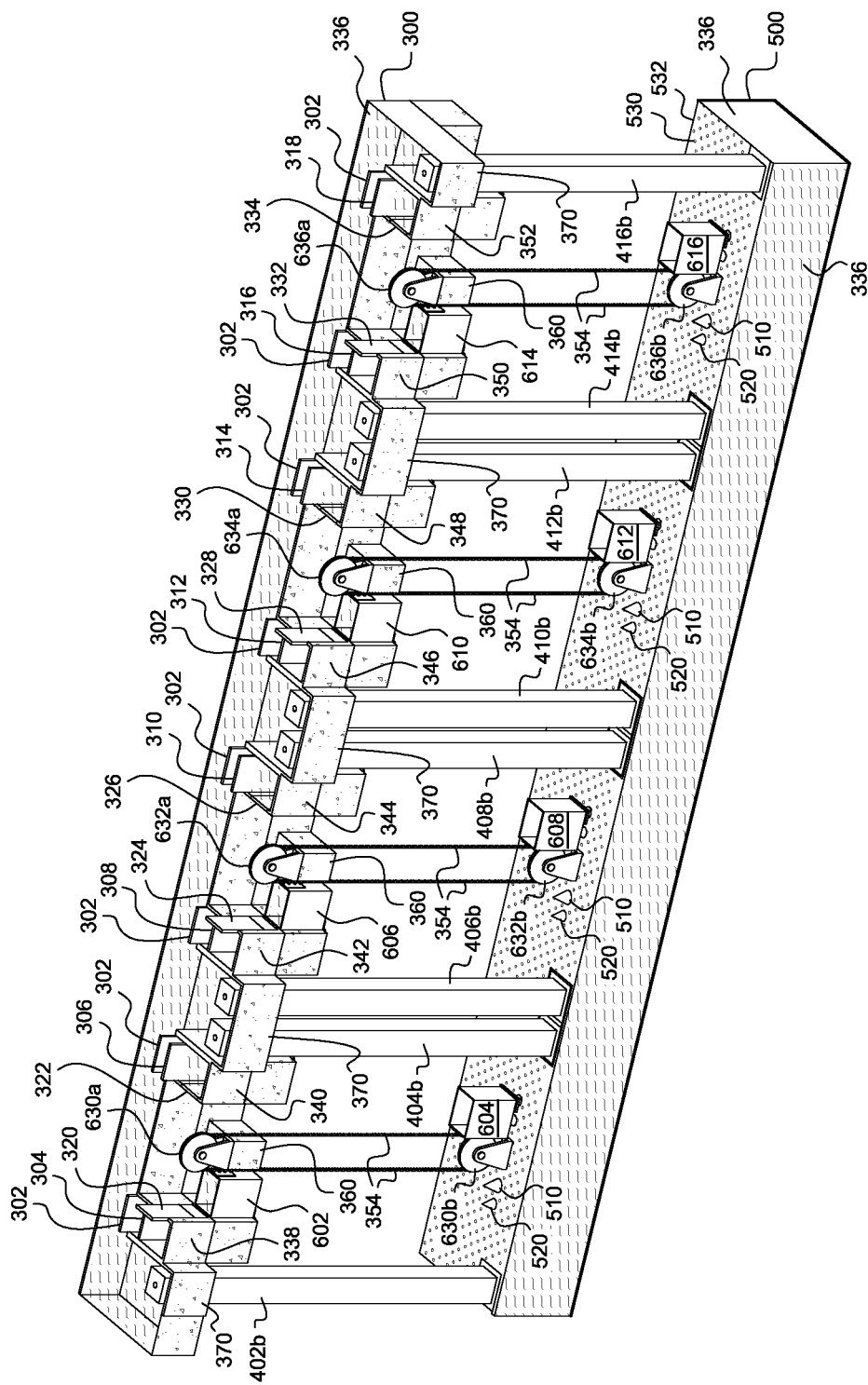
FIG. 23C is a perspective, side view of a four MEPU system design, or COU, of a second, non-limiting embodiment of a system of producing energy via use of gravity according to the present invention, showing most of the system components as they pertain to four MEPU system design operation without the system's pulleys and cables.
Figure 24A:
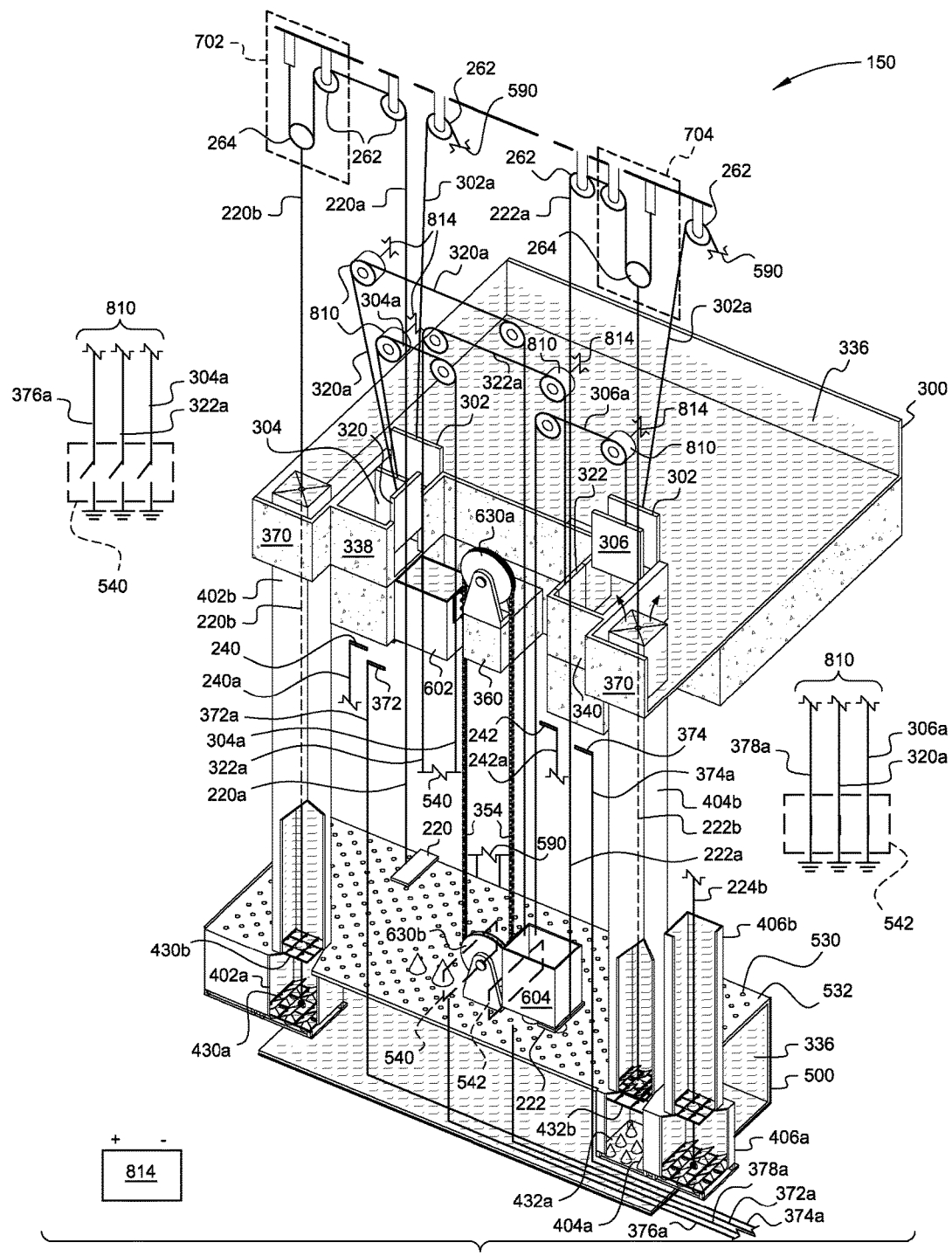
FIG. 24A is a perspective, side view of one MEPU of a second, non-limiting embodiment of a system of producing energy via use of gravity according to the present invention, showing most if not all, of the MEPU components along with its corresponding Fluid Displacement Tanks (FDT). The MEPU in this figure is comprised practically of the same system working components and operate in a similar manner as all MEPU in the system, adhering to the guiding principles discussed in the "Electromechanical Mode" of operation.
Figure 24B:
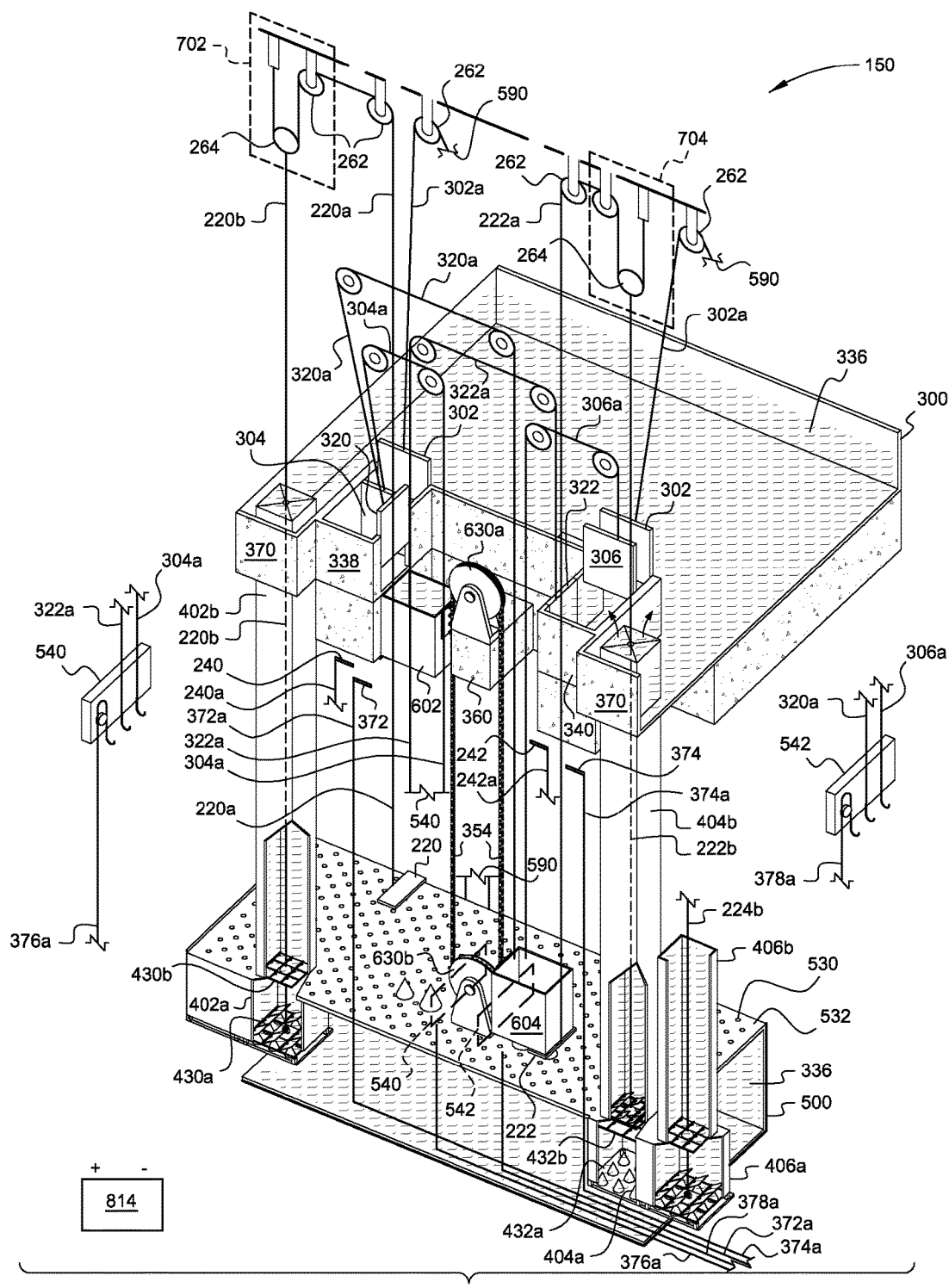
FIG. 24B is a perspective, side view of one MEPU of a second, non-limiting embodiment of a system of producing energy via use of gravity according to the present invention that is similar to FIG. 24A, showing most of the system components along with the perspective view of its corresponding FDT as outlined above. The MEPU in this figure is comprised and operated in a similar manner like all MEPU in the system, adhering to the guiding principles as discussed in the "Mechanical Mode" of operation.
Figure 25A:
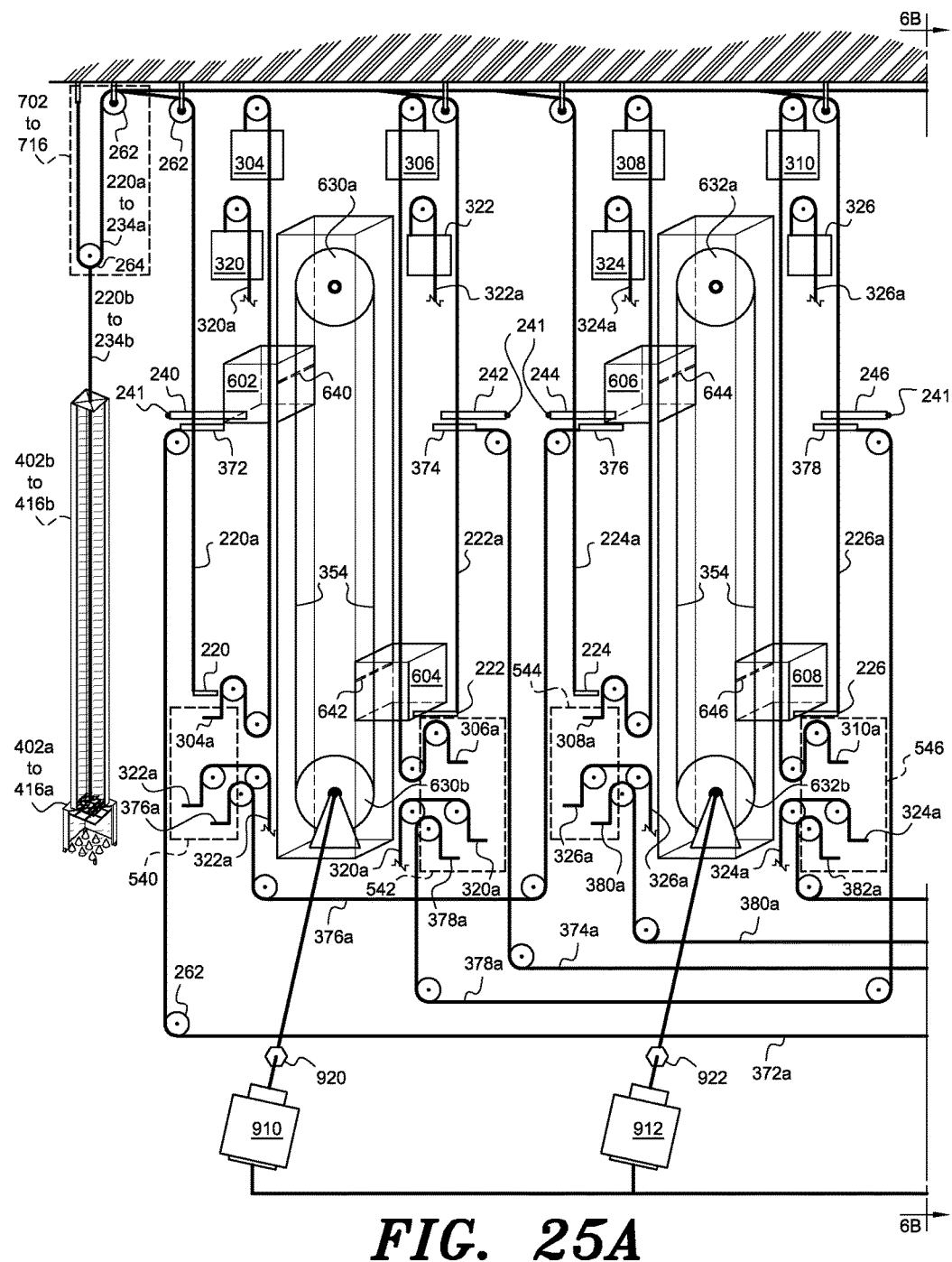
FIG. 25A and FIG. 25B are side views of a second, non-limiting embodiment of a system of producing energy via use of gravity according to the present invention, wherein these two figures, put side by side, depict the "Mechanical Sequence" mechanism of the system as it pertains to its functionality in providing a timing sequence of motion to its moving working components. This "Mechanical Sequence" mechanism is the facilitator of the system's command and control to its moving components that facilitate the system's motion throughout its operation pertaining to the "Mechanical Mode" of operation as well as to the "Electromechanical Mode" of operation.
Figure 25B:
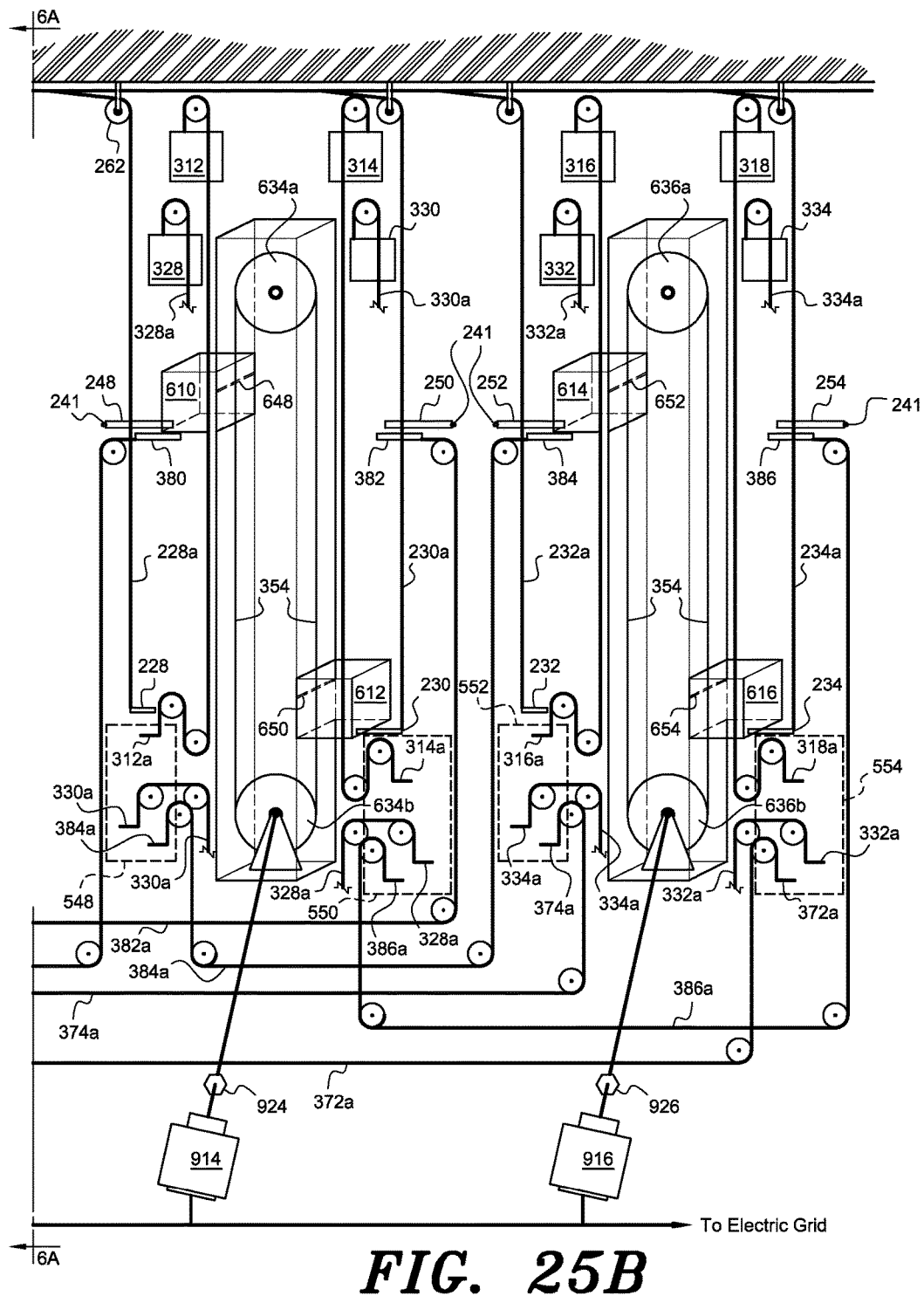
Figure 26:
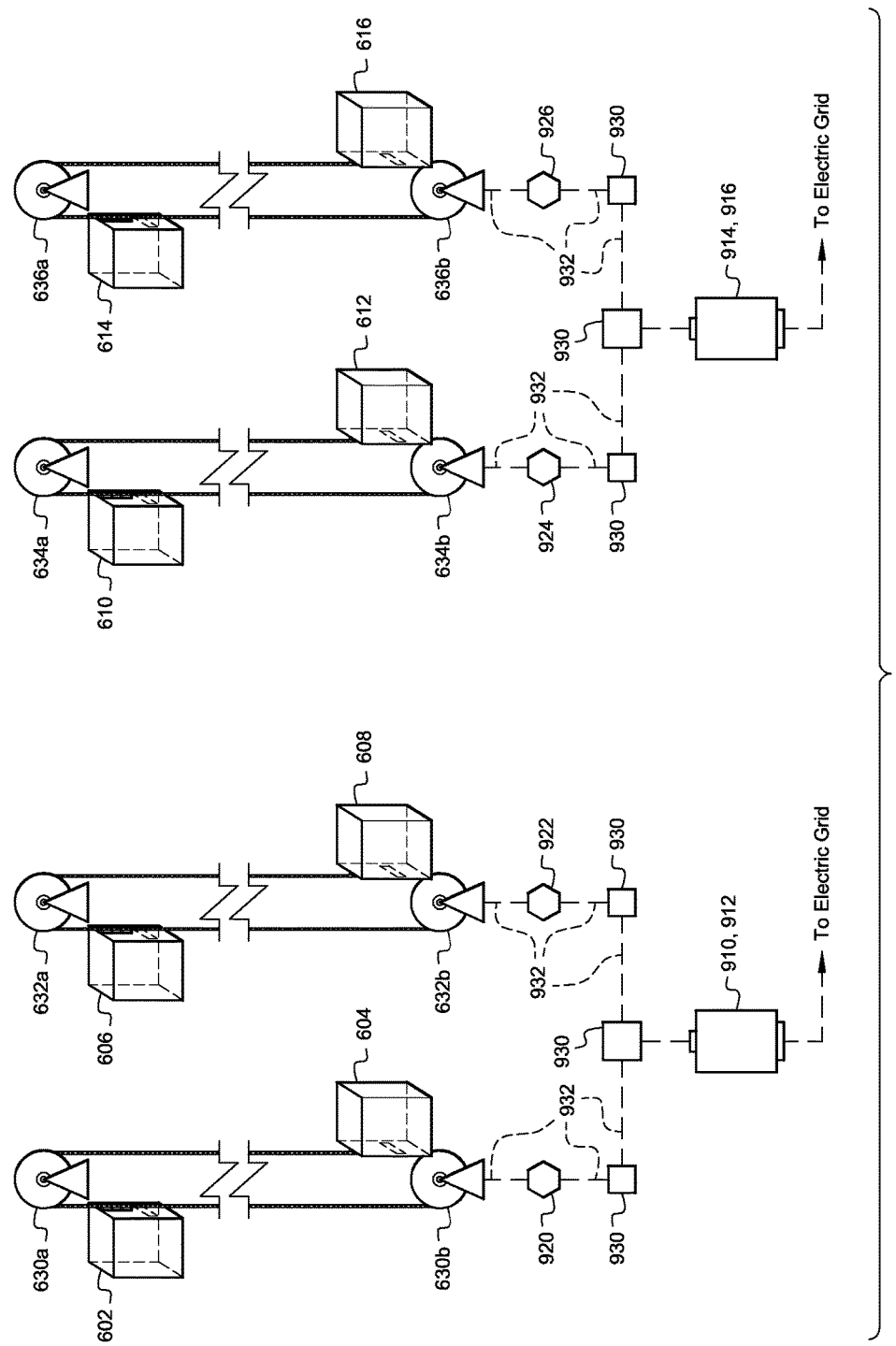
FIG. 26 shows how two system MEPU of a second, non-limiting embodiment of a system can be combined together in their operation to power a single electric generator.
Figure 27:
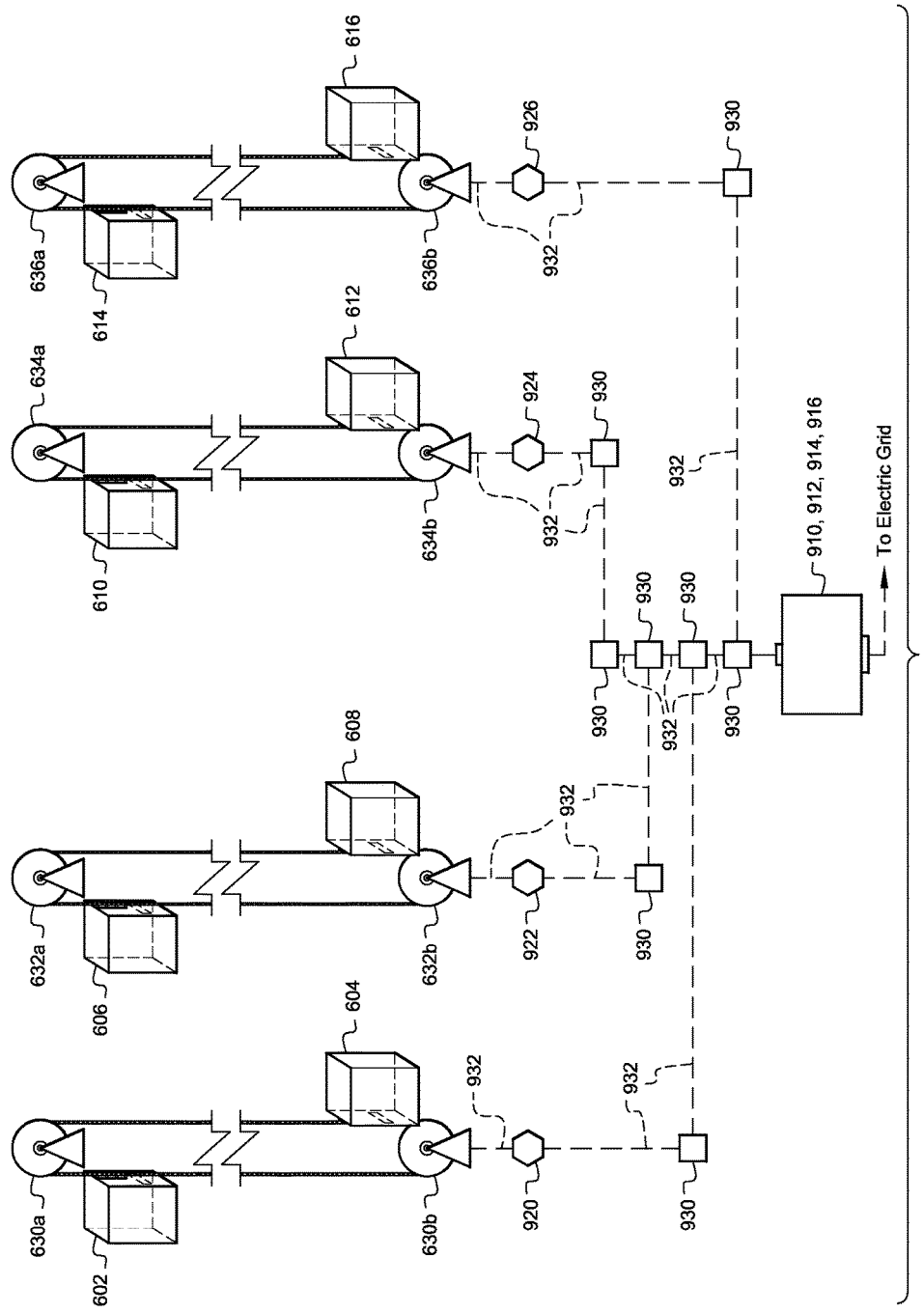
FIG. 27 shows how four system MEPU of a second, non-limiting embodiment of a system can be combined together in their operation to power a single electric generator.
Figure 28:
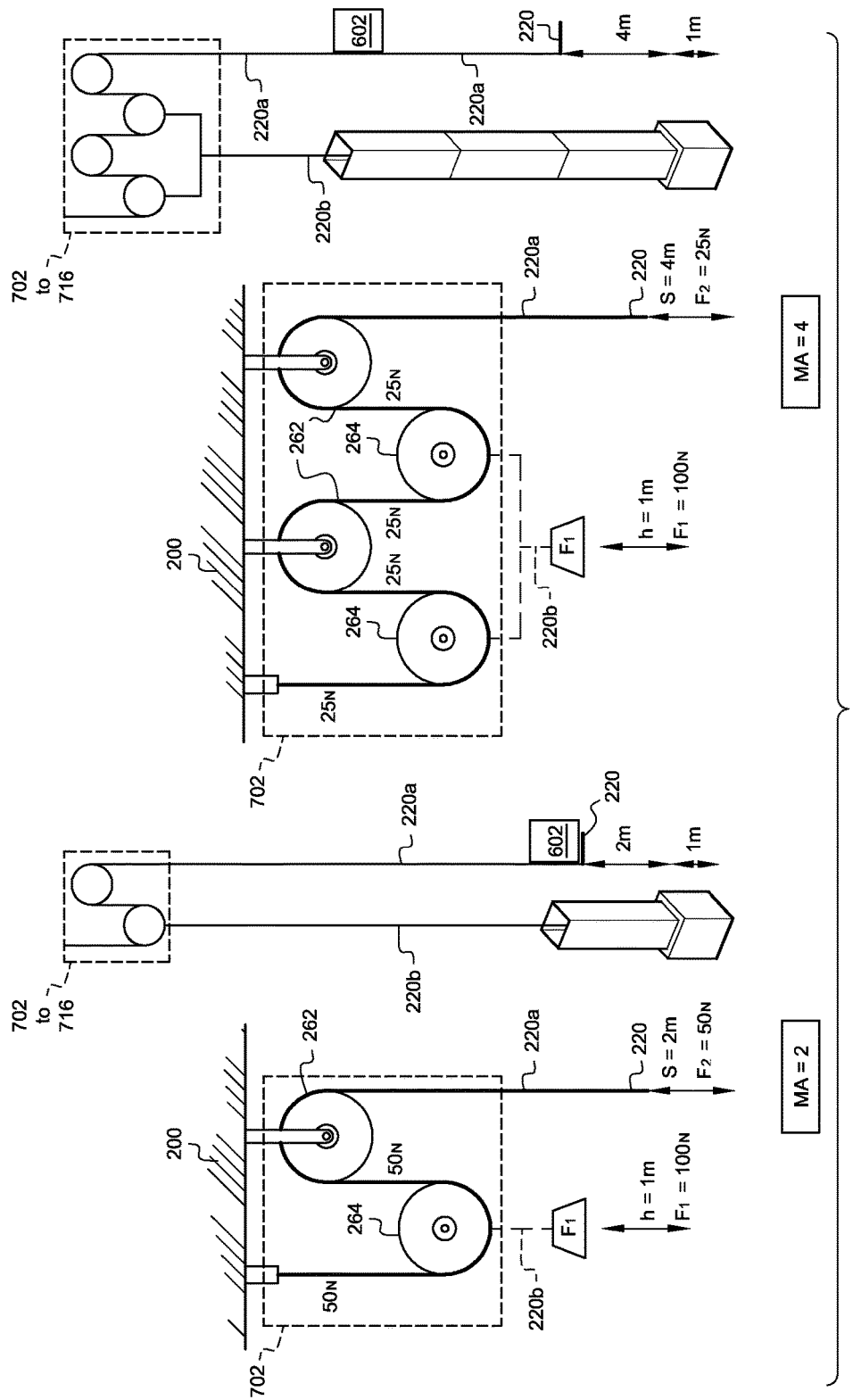
FIG. 28 shows the principle difference between the two pulley systems of a second, non-limiting embodiment of a system. One having a Mechanical Advantage (MA) of MA=2 and the other having a Mechanical Advantage of MA=4. It also shows how the difference in the Mechanical Advantage can increase the separation between the main two tanks, namely upper or Potential Tank (PT) and lower or Kinetic Tank (KT). In the MA=4 pulley system design, the system can achieve three times the distance separation between the PT and the KT than previously achieved by the use of the MA=2 pulley system design.
Figure 29:
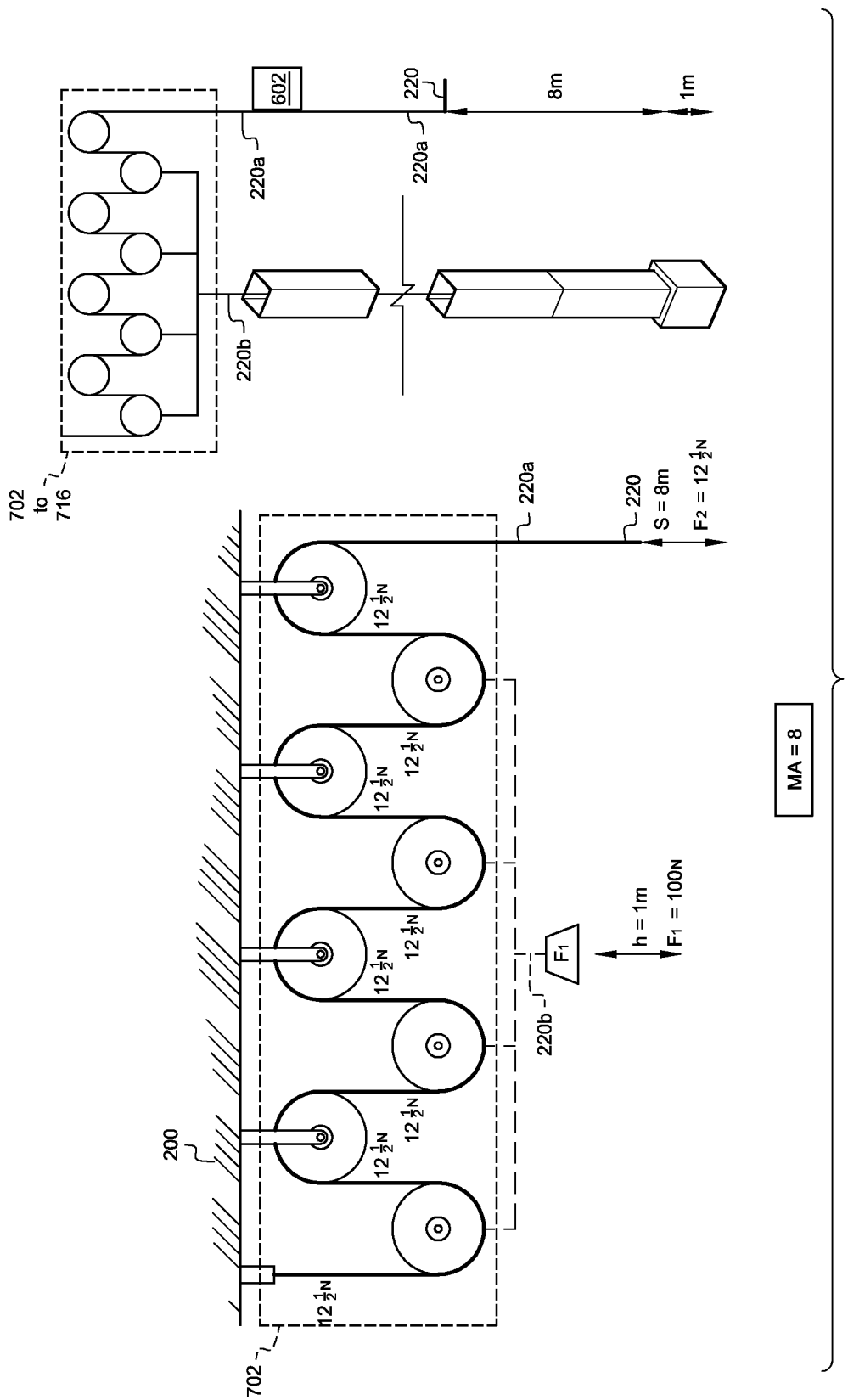
FIG. 29 shows the principles of a pulley system of a second, non-limiting embodiment of a system having a Mechanical Advantage of MA=8 which in translation can give us seven times the separation between the PT and the KT than that in the MA=2 pulley system design.
Figure 30:
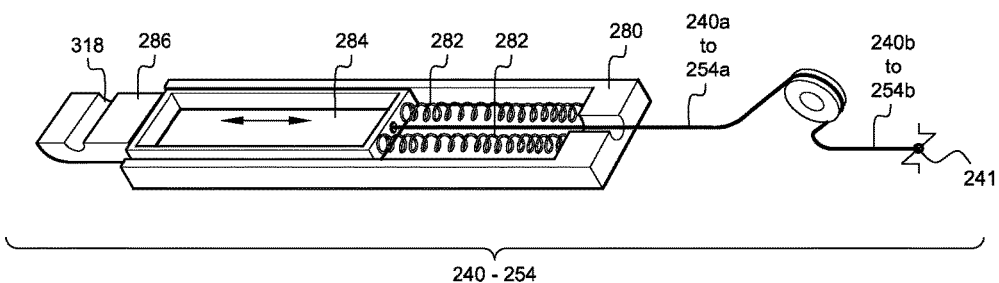
FIG. 30 shows a sliding platform, namely Fluid Transport Cell Emergency Platform (FTCEP) that initiates system operation, when the system is at steady state, of a second, non-limiting embodiment of a system of producing energy via use of gravity according to the present invention. It also makes its use to interrupt system operation in an emergency situation and prevent system damage.
Figure 31:
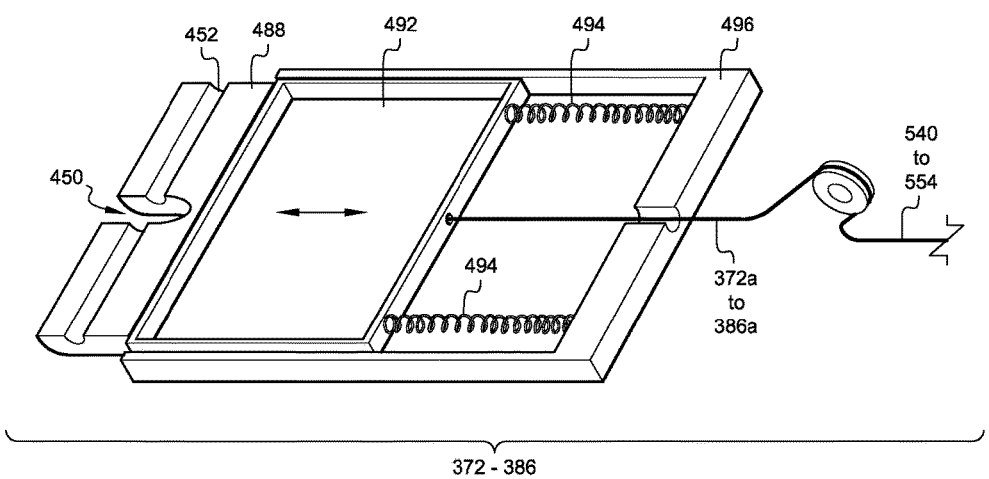
FIG. 31 shows a sliding platform, namely Fluid Transport Cell Release Platform (FTCRP) which makes possible the lock and hold to potential status and then the release from potential status the system's fluid transport cells (FTC), of a second, non-limiting embodiment of a system of producing energy via use of gravity according to the present invention. It is a major contributor of our system's timing motion to its working components and a vital facilitator in implementing the system's "Mechanical Sequence" and "Electromechanical Sequence" mechanisms.
Figure 32A:
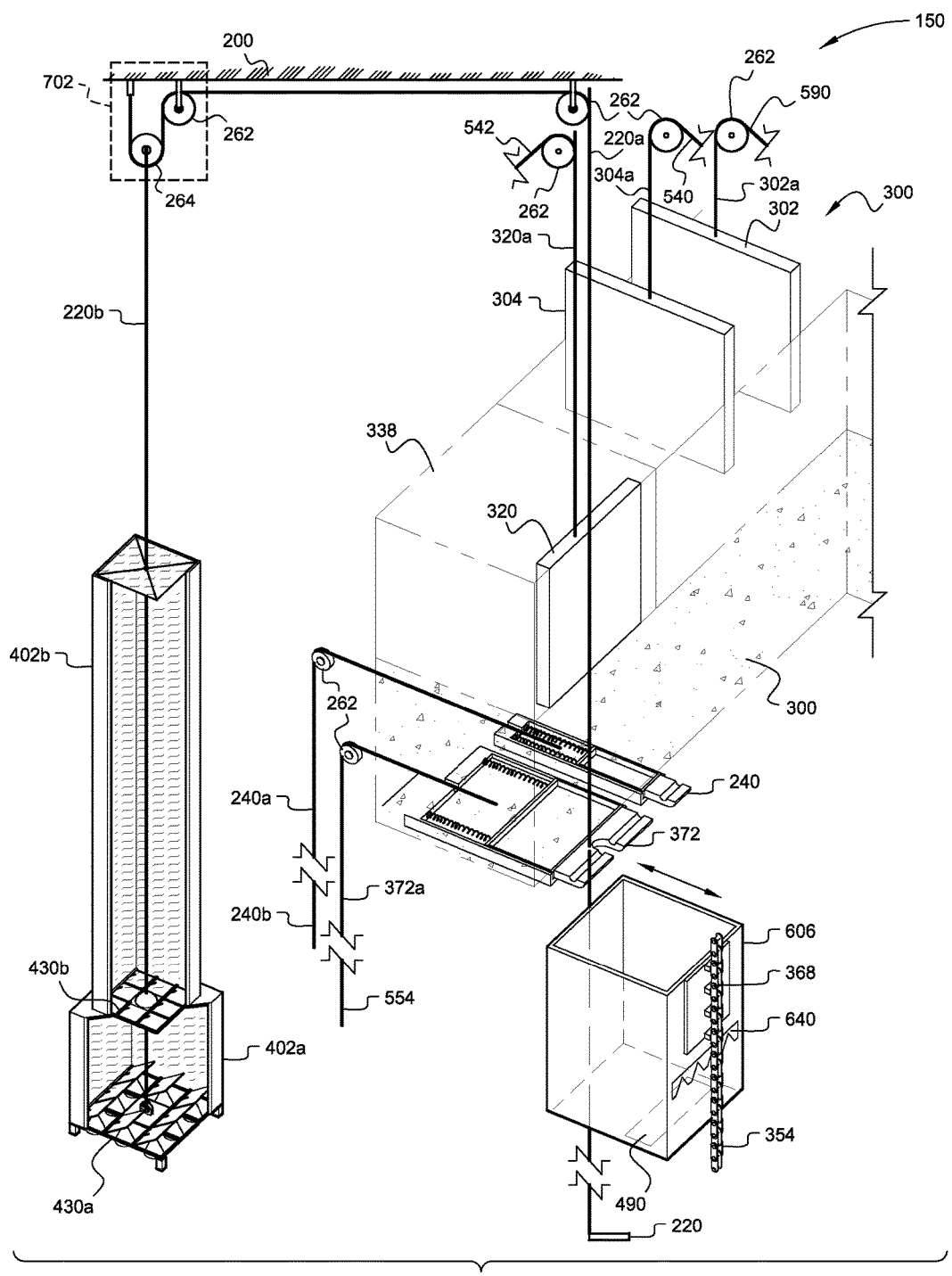
FIG. 32A is a zoom-in drawing which depicts the components associated with the left half side of one MEPU, excluding its Motor Gear Wheel Assembly (MGWA), of a second, non-limiting embodiment of a system. It shows the relationship among its Fluid Feeding Bays (FFB) with its enclosed operating gates (Ejection Gate, Fluid Regulating Gate, and Emergency Shut-Off Gate), as well as its corresponding Fluid Transport Cell Emergency Platform (FTCEP), its Fluid Transport Cell Release Platform (FTCRP), its Fluid Transport Cell (FTC), its Fluid Displacement Tanks (FDT), along with their internal and external mechanism of fluid lift and the associated pulleys and cables in the "Mechanical Mode" of operation.
Figure 32B:
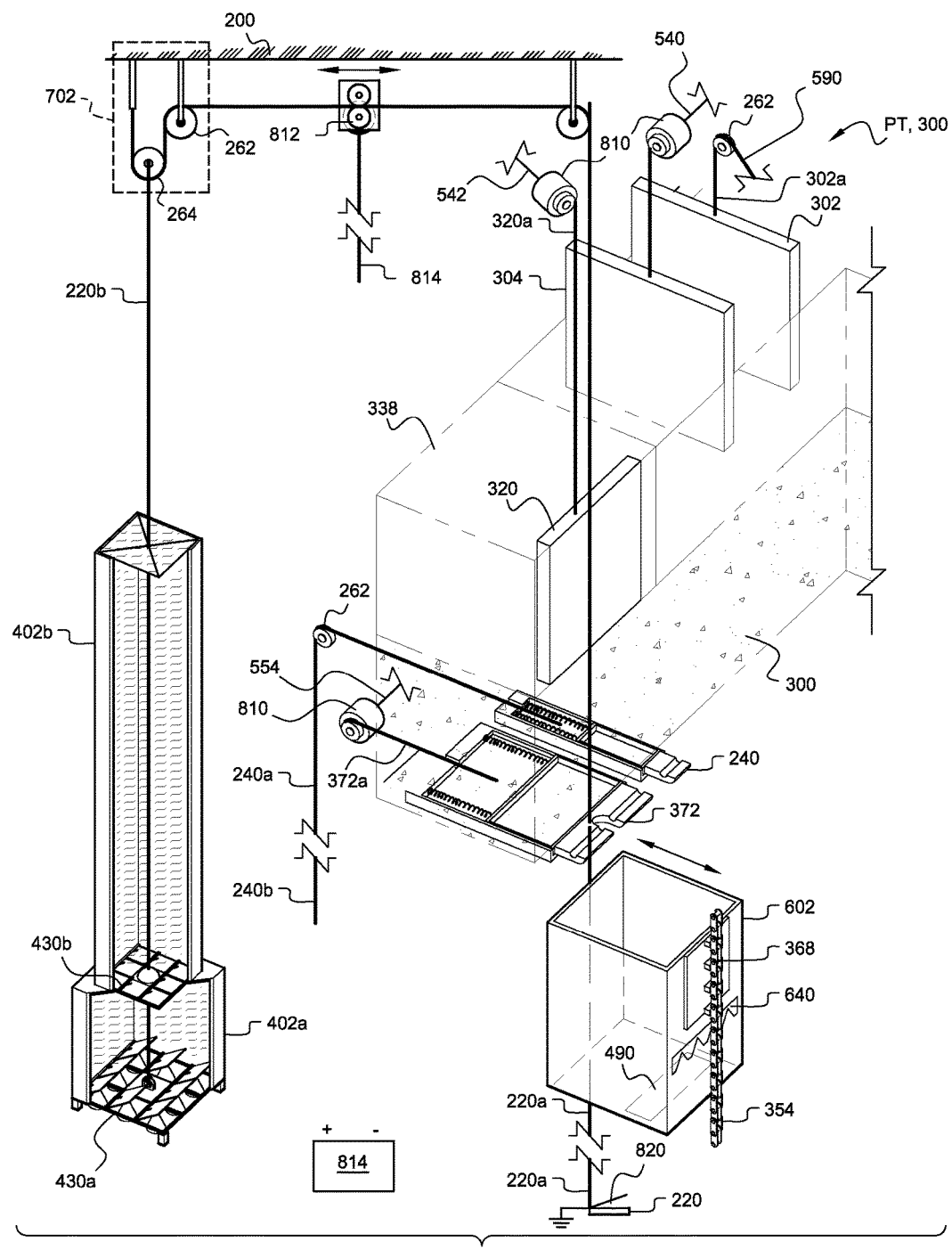
FIG. 32B depicts the same schematic as in FIG. 32A above, but here we make the use of electrical motors instead of just mechanical pulleys to "Electromechanical Mode" to System Operation in order to create the required motion to power the system's moving components that would in turn operate the system of producing energy via use of gravity.
Figures 33, 34:
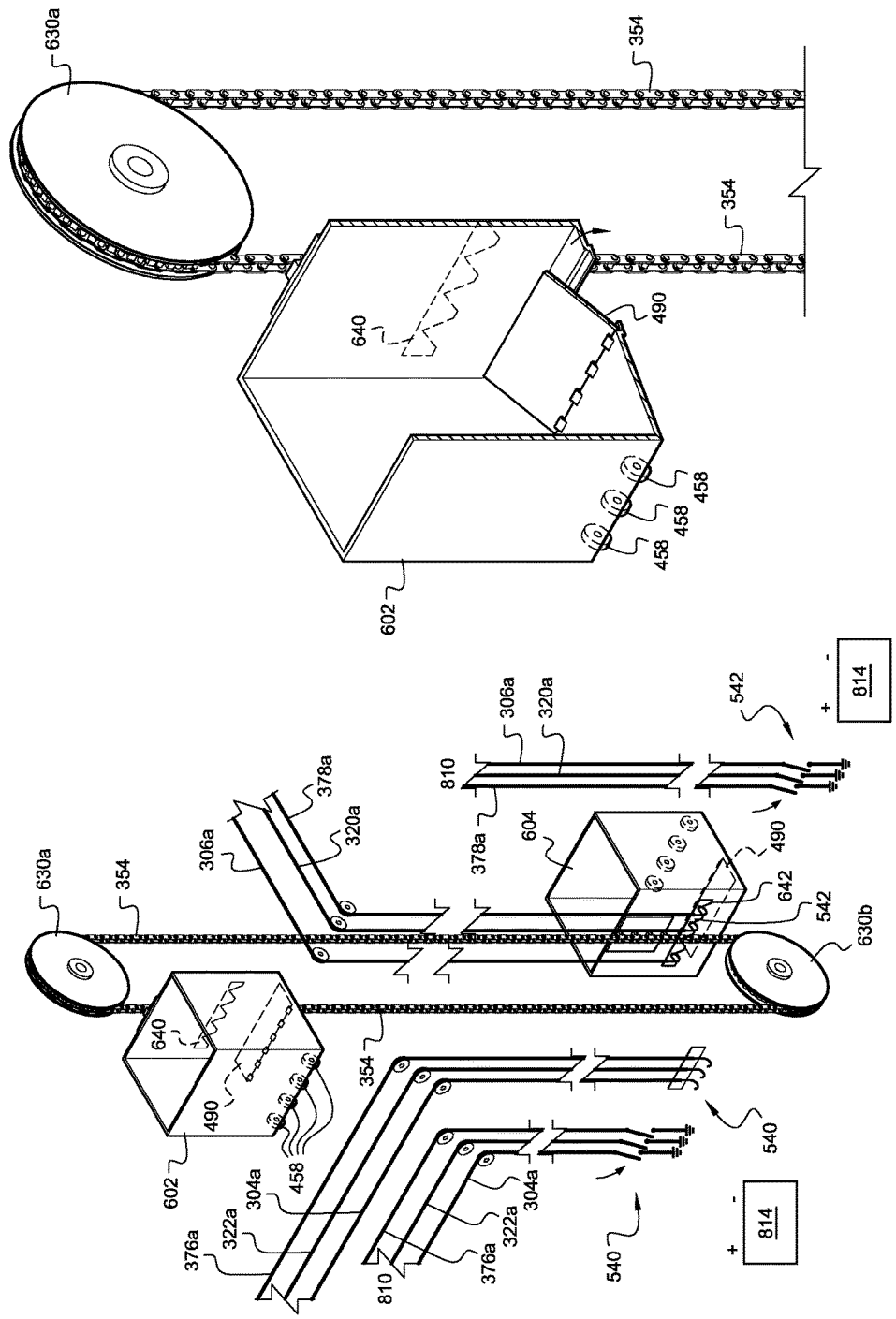
FIG. 33 is a schematic diagram that depicts the relationship between the system's Fluid Transport Cells (FTC), their placement in relation to their Gear Chain (GC) on its Motor Gear Wheels Assembly (MGWA), and its corresponding Strike Point Contact Junction (SPCJ) of one MEPU in the "Mechanical Mode" or "Electromechanical Mode" of operation of a second, non-limiting embodiment of a system.
FIG. 34 is a schematic diagram showing a cross section of the Fluid Transport Cell (FTC) with its Lift Door, its External Wheels, its corresponding Motor Gear Wheel Assembly (MGWA), as well as its associated mounted Engaging Bracket, of a second, non-limiting embodiment of a system.
Figure 36:
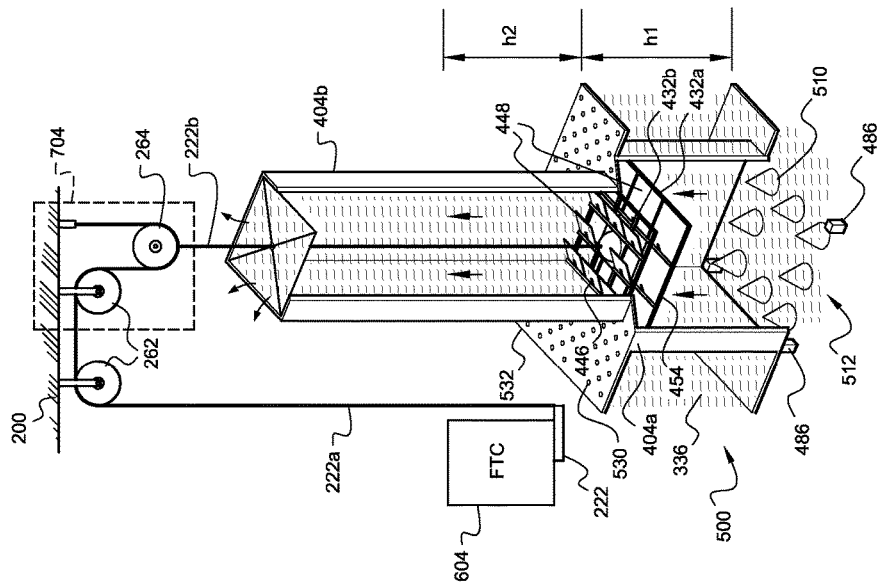
FIG. 36 is a schematic diagram of the cross-section area of the right Fluid Displacement Tank (FDT) of one MEPU and its associated components which are the same as those described in FIG. 35 above, of a second, non-limiting embodiment of a system. Both of FIGS. 35 and 36 comprise the two FDTs associated with each MEPU in the system.
Figure 35:
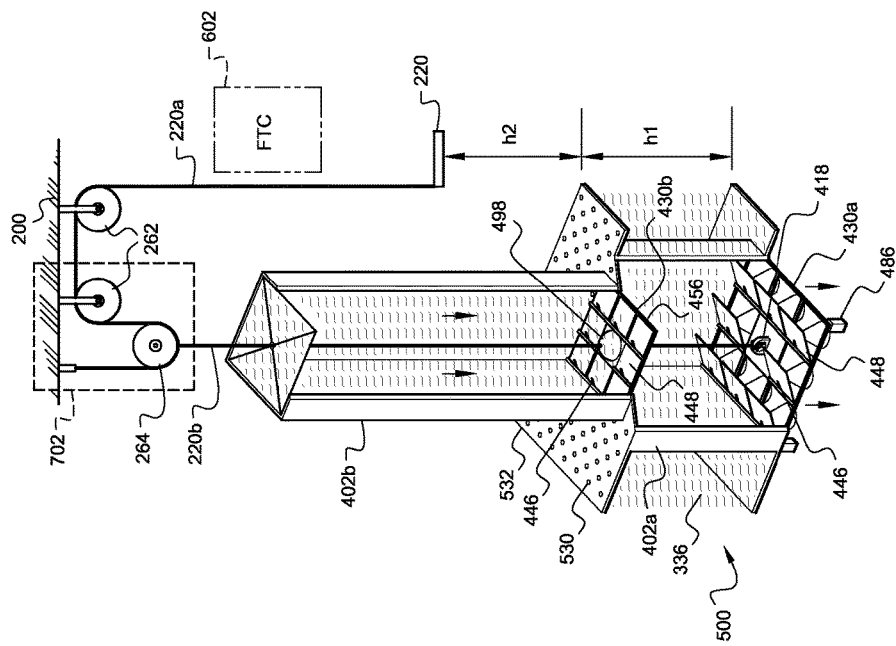
FIG. 35 is a schematic diagram of the cross-section area of the left Fluid Displacement Tanks (FDT), of one MEPU, with its associated Sub Surface Tank (SST) and Upper Surface Tank (UST), the positioning of their Door Platform Assembly (DPA) and its Between Tank Door Assembly (BTDA) in relationship to FDT inner structure, the mechanical advantage assembly, Lift Assembly of Desired Mechanical Advantage (LADMA) and associated pulleys and cables, its FTC unit, its positioning between the PT and KT as they all come together to operate in accordance with the principles specified in the present application of a second, non-limiting embodiment of a system.
Figure 37:
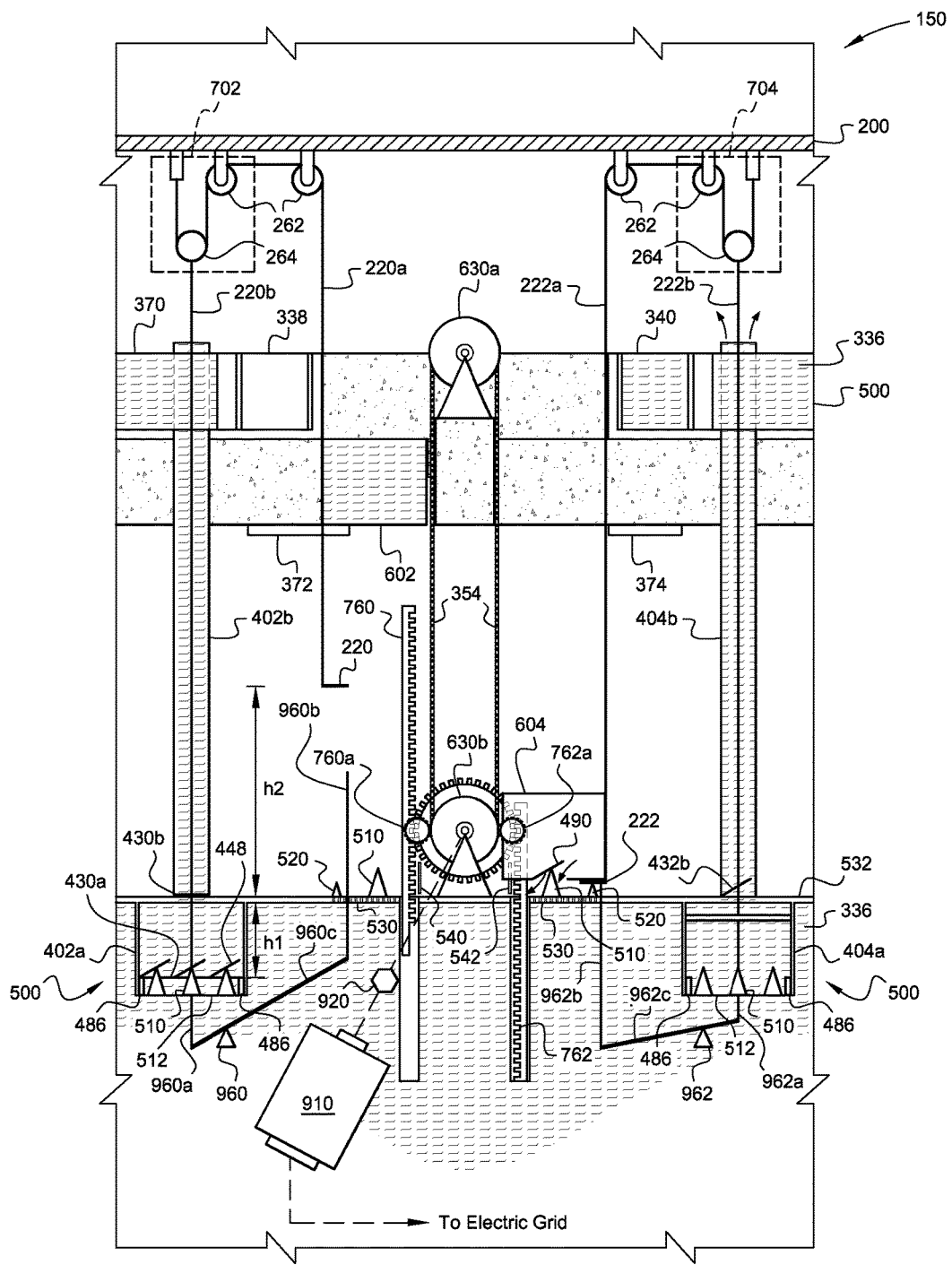
FIG. 37 is a side view of a schematic diagram of one MEPU of a second, non-limiting embodiment of a system that utilizes the concept of Dynamic Descent to System operation.
Figure 38:
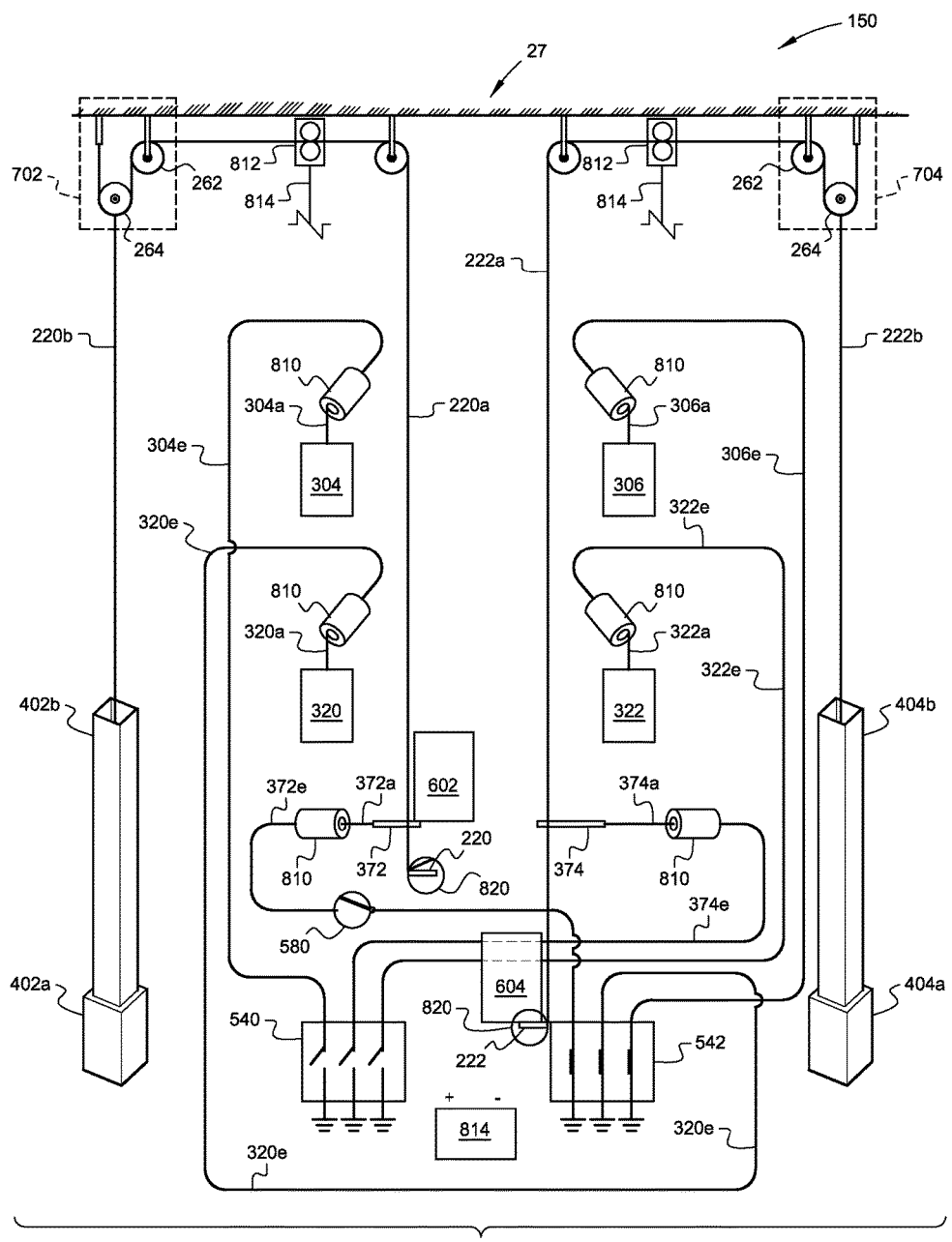
FIG. 38 is a schematic diagram of the "Single MEPU Operation" in the "Electromechanical Mode" of operation of a second, non-limiting embodiment of a system.

With regard to the second, non-limiting embodiment and as shown in FIGS. 20-38, the system 100 (some examples of which could be 100a, 100b, 100c or 100d) is substantially the same as system 10 (some examples which could be 10a, 10b, 10c or 10d), except for the addition of a lever mechanism(s) LM, which is/are another optional force multiplier system that could be introduced into our system design in a way that each corresponding LM will work in conjunction with our system's corresponding LADMA 702-716 in order to better enhance the fluid lift force of the system through the corresponding FDT (402a, 402b)-(416a, 416b) and therefore enhance our system's recycling efficiency. To not be redundant with the first embodiment, components, systems, etc. that are the same in the second embodiment as in the first embodiment will not be discussed below. The lever mechanism LM is specifically shown in FIGS. 21, 22 and 37. Each lever mechanism LM comprises a beam or rod BR (preferably a rigid beam or rigid rod) 960c, 962c, 964c, 966c, 968c, 970c, 972c, 974c (or shortened as 960c-974c) that is provided on a fixed hinge called fulcrum FL 960, 962, 964, 966, 968, 970, 972, 974 (or shortened as 960-974). On the short side section of each of the beam or rod 960c-974c, from the fulcrum 960-974 to the end of the rod 960c-974c which does the lifting, we have an extension lift rod ELR 960a, 962a, 964a, 966a, 968a, 970a, 972a and 974a (or shortened as 960a-974a), that communicates (connects) the corresponding beam or rod 960c-974c with its corresponding Door Platform Assembly DPA 430a-444a. The longer side of the lever rod section, from the fulcrum 960-974 to the opposite end of the rod 960c-974c, makes contact with a vertical rod called Vertical Extension Rod VER 960b, 962b, 964b, 966b, 968b, 970b, 972b and 974b (or shortened as 960b-974b) that applies the input force to the LM by the pressure applied to it by the corresponding descending FTC 602-616. Each time a corresponding descending FTC 602-616 strikes a corresponding vertical extension rod 960b-974b, it uplifts its corresponding extension lift rod 960a-974a on the opposite end which in turn applies the multiplying force pressure to uplift its corresponding door platform assembly DPA 430a-444a. This action will enhance the uplift process of the fluids within the corresponding FDT (402a, 402b)-(416a, 416b) by the use of this methodology which we called "Pull Lift Affect." Note that the fluid within the corresponding FDT (402a, 402b)-(416a, 416b) will be pulled upwards during the system's recycling process by the use of its corresponding LADMA 702-716 which will apply a lift force to its corresponding DPA 430a-444a and then the multiplying force of its corresponding lever mechanism LM will push the fluid upwards, from below, by applying its force to its corresponding DPA 430a-444a. This combination of "Pull Lift Affect" increases the recycling capacity in the process and therefore, the overall efficiency of the system.

The introduction of this system 100 of enhanced fluid recycling does not affect the previous system design (system 10) in any way other than making it better and more efficient. There is no effect in the "Mechanical Sequence" to Mechanical Mode of operation" described above, neither to the "Electromechanical Sequence" to Electromechanical Mode of Operation" described above. All sequences of operation described before are also the same with the addition of the LM.

The Mechanical and Electromechanical sequences as systems of command and control can also integrate computerized software and other systems of command and control to better its operation and make more effective in its design.

It is to be understood that the present invention is not limited to the embodiments described above or as shown in the attached figures, but encompasses any and all embodiments within the spirit of the invention.

APPENDIX I

Glossary of Terms

AP: Anchor Point, 590
APFTCEP: Anchor Point Fluid Transport Cell Emergency Platform, 240b, 242b, 244b, 246b, 248b, 250b, 252b, 254b.
BGW: Bottom Gear Wheel, 630b, 632b, 634b, 636b
BHD: Beehive Dome, 498
BR: Beam Rod 960c, 962c, 964c, 966c, 968c, 970c, 972c and 974c

BTDA: Between Tank Door Assembly, 430b, 432b, 434b, 436b, 438b, 440b, 442b, 444b
COU: Complete Operating Unit
CS: Connecting Shafts, 932
DD: Dynamic Descent
DPA: Door Platform Assembly, 430a, 432a, 434a, 436a, 438a, 440a, 442a, 444a
DPALR: Door Platform Assembly Lift Ring, 418
EB: Engaging Brocket, 640, 642, 644, 646, 648, 650, 652, 654
EF: External Frame, 496
EFEP: External Frame Emergency Platform, 280
EG: Electric Generator, 910, 912, 914, 916
ELR: Extension Lift Rod 960a, 962a, 964a, 966a, 968a, 970a, 972a and 974a
EM: Electric Motor, 810
EMB: Electric Motor Buster, 812
EPS: Emergency Platform Spring, 282
EW: External Wheel, 458
FP: Fixed Pulleys, 262
FDTP: Fluid Displacement Tank Pairs, (402a, 402b); (404a, 404b); (406a, 406b); (408a, 408b); (410a, 410b); (412a, 412b); (414a, 414b); (416a, 416b).
FFB: Fluid Feeding Bays, 338, 340,342,344, 346, 348, 350, 352
FDT: Fluid Displacement Tanks, (402a, 402b); (404a, 404b); (406a, 406b); (408a, 408b); (410a, 410b); (412a, 412b); (414a, 414b); (416a, 416b).
FL: Fulcrum 960, 962, 964, 966, 968, 970, 972 and 974
FRB: Fluid Return Bay, 370
FP: Fixed Pulleys, 262
FTC: Fluid Transport Cell, 602, 604, 606, 608, 610, 612, 614, 616
FTCEP: Fluid Transport Cell Emergency Platform, 240, 242, 244, 246, 248, 250, 252, 254
FTC/GCMP: Fluid Transport Cell/to Gear Chain Mounting Point, 368
FTCEPC: Fluid Transport Cell Emergency Platform Cable, 240a, 242a, 244a, 246a, 248, 250a, 252a, 254a
FTCID: Fluid Transport Cell Inner Door, 490
FTCWRG: Fluid Transport Cell Wheel Rest Groove, 452
FTCRPC: Fluid Transport Cell Release Platform Cable, 372a, 374a, 376a, 378a, 380a, 382a, 384a, 386a
FTCRP: Fluid Transport Cell Release Platform, 372, 374, 376, 378, 380, 382, 384, 386
FTCS: Fluid Transport Cell Stopper, 520
GB: Gear Box, 930
GBR: Gear Bar Rod, 760, 762, 764, 766, 768, 770, 772, 774
GC: Gear Chain, 354
Gea: Fluid Ejection Gate Cable, 320a, 322a, 324a, 326, 328a, 330a, 332a, 334a
Ge: Fluid Ejection Gate, 320, 322, 324, 326, 328, 330, 332, 334
Gr: Fluid Regulating Gate, 304, 306, 308, 310, 312, 314, 316, 318
Gra: Fluid Regulating Gate Cable, 304a, 306a, 308a, 310a, 312a, 314a, 316a, 318a
Gx: Fluid Emergency Shut-off Gate, 302
Gxa: Fluid Emergency Shut-off Gate Cable, 302a
IFEP: Inner Frame Emergency Platform, 284
IFP: Inner Frame Platform, 492
IPS: Internal Power Source, 814
KT: Kinetic Tank, 500
KTB: Kinetic Tank Bottom, 512
KTPFP: Kinetic Tank Platform Floor Perforations, 530
KTP: Kinetic Tank Platform, 532

KEC: Kinetic Energy Cable, 220a, 222a, 224a, 226a, 228a, 230a, 232a, 234a
KESP: Kinetic Energy Strike Platform, 220, 222, 224, 226, 228, 230, 232, 234
KECPTG: Kinetic Energy Cable Pass through Gap, 450
LADMA: Lift Assembly of Desired Mechanical Advantage, 702, 704, 706, 708, 710, 712, 714, 716
LC: Lift Cable, 220b, 222b, 224b, 226b, 228b, 230b, 232b, 234b
LD: Little Doors, 448
LDC: Lift Door Cone, 510
LDAS: Lift Door Angle Stopper, 446
LM: Lever Mechanism
MA: Mechanical Advantage, MA=2, MA=4, MA=8
MEPU: Multiple Energy Producing Unit, 150, 152, 154, 156.
MP: Movable Pulley, 264
MGWA: Motor Gear Wheel Assembly, (630a, 630b); (632a, 632b); (634a, 634b); (636a, 636b)
MGWP: Motor Gear Wheel Platform, 360
MGW: Motor Gear Wheel, 630a, 630b, 632a, 632b, 634a, 634b, 636a, 636b
PSA: Pulley Support Assembly, 200
PEP: Pivoting Emergency Platform, 286
PF: Potential Fluid, 336
PS: Platform Springs, 494
PP: Pivoting Platform, 488
Power source, 241
PT: Potential Tank, 300
RF: Rectangular Frame, 456
RGB: Reverse Gear Box, 920, 922, 924, 926
SP: Stationary Pulley, 262
SPCJ: Strike Point Contact Junction, 540, 542, 544, 546, 548, 550, 552, 554
SF: Square Frame, 454
SST: Sub Surface Tank, 402a, 404a, 406a, 408a, 410a, 412a, 414a, 416a
SSTS: Sub Surface Tank Spacers, 486
SW: Switch 580
TGW: Top Gear Wheel, 630a, 632a, 634a, 636a
TS: Trigger Switches, 820
TU: Transmission Unit, 760a, 762a, 764a, 766a, 768a, 770a, 772a, 774a
UST: Upper Surface Tank, 402b, 404b, 406b, 408b, 410b, 412b, 414b, 416b
VER: Vertical Extension Rod 960b, 962b, 964b, 966b, 968b, 970b, 972b and 974b

What is claimed is:

1. A system for producing energy via use of gravity, said system comprising:
   a fluid lift support assembly comprising a supporting structure and a plurality of fluid lift systems,
   wherein said fluid lift systems are secured to said supporting structure,
   wherein said system for producing energy is set to a potential status, at t=0, prior to initiation of operation and motion processes of said system, and
   wherein said fluid lift systems comprise a plurality of fluid lift mechanisms that engage in said operation and in said motion processes of said system via mechanical operation;
   a fluid tank system comprising an upper fluid tank, a lower fluid tank, and a plurality of fluid transfer path controls,
   wherein said fluid tanks are positioned vertically with respect to one another, wherein said fluid tanks are in communication with said fluid lift systems to operate and to set in said motion processes of said system, wherein each of said fluid tanks comprises a sufficient amount of fluid, wherein said upper fluid tank comprises a plurality of extensions for transferring fluid along a plurality of fluid transfer paths from said upper fluid tank into corresponding fluid transports cells of a plurality of fluid transports cells (FTCs), and further comprises a plurality of fluid transport cell release platforms (FTCRPs) and at least one fluid transport cell emergency platform (FTCEP), wherein each fluid transfer path includes corresponding fluid transfer path controls to regulate the transfer of fluid in and out of said fluid transfer path, wherein said lower fluid tank is positioned on a supporting surface and comprises a lower fluid tank platform, wherein said lower fluid tank collects descending fluid from said upper fluid tank via corresponding FTCs that descend via gravity from said upper fluid tank, wherein said lower fluid tank platform comprises at least one opening that enables fluid from descending FTCs of said plurality of FTCs to enter into said lower fluid tank, and wherein said plurality of FTCRPs provide means of temporary support to potential heights on said upper fluid tank and release from said potential heights to descend their corresponding FTCs as corresponding FTCs are designed to operate in descending and ascending motion processes, and wherein said FTCRPs serve to stabilize corresponding FTCs and temporarily lock them in place, upon their return from said lower fluid tank to a potential state position on said upper fluid tank in a continuous fluid recycling process once again, wherein another affected set of corresponding FTCs will be triggered to initiate the same mechanisms for a next round of fluid entry into said plurality of fluid transfer paths while corresponding FTCs simultaneously will deny fluid entry to corresponding plurality of fluid transfer paths which in turn will adhere to said descending and ascending motion processes;

a plurality of fluid displacement tanks (FDTs) in communication with said fluid lift systems, corresponding FTCs, corresponding fluid lift mechanisms, and said upper and lower fluid tanks, wherein each of said FDTs comprises an upper section, a lower section connected vertically to said upper section, and a Between Tank Door Assembly (BTDA) disposed between said upper section and said lower section, wherein said upper section comprises an upper end and a lower end, wherein said lower section comprises an upper end and a lower end, and is sufficiently submerged in the fluid that is present in said lower fluid tank, wherein said lower end of said upper section is connected to said upper end of said lower section, wherein said upper section is thinner in length and width but taller in height than said lower section, wherein said upper section and said lower section create a fluid transfer path from inside said lower fluid tank onto said upper fluid tank, and wherein said BTDA prevents backflow of fluid from said upper section to enter said lower section;

said fluid lift mechanisms, wherein each of said fluid lift mechanisms is in communication with corresponding FDT, said fluid tank system, and corresponding FTC, wherein each of said fluid lift mechanisms provides a lifting force to each corresponding door platform assembly (DPA) which will elevate fluid located above said corresponding DPA and within said lower section of a corresponding FDT, from inside said lower fluid tank back up onto said upper fluid tank, wherein upon lift of corresponding DPAs, the volume of fluid within said lower section of corresponding FDTs will be displaced into said upper section of corresponding FDTs, and the already existing fluid within said upper section of corresponding FDTs will be ejected or displaced onto said upper fluid tank of about equal volume to said volume displaced from said lower section of corresponding FDT thus achieving potential fluid height and recycling in the upward direction resulting in increased potential and kinetic energies of said system;

a plurality of FTC lift assemblies in communication with said fluid lift systems, said plurality of FTCRPs, said at least one FTCEP, said plurality of fluid lift mechanisms, said plurality of FDTs, said plurality of fluid transfer path controls, at least one electric generator, and said upper and lower fluid tanks, wherein each of said FTC lift assemblies moves corresponding FTCs in a vertical motion, upward and downward, and provides controlled descent of potential fluid through corresponding FTCs, wherein each of said FTC lift assemblies powers a corresponding electric generator via gravity thus producing electricity to the grid, wherein said FTCs act as potential fluid transport containers of controlled fluid descent from said upper fluid tank onto said lower fluid tank and act as power givers of motion to a corresponding electric generator, wherein said FTCs facilitate potential controlled descent of fluid and will drive a corresponding electric generator and that will supply electricity to the grid, wherein descending FTCs provide the required force, upon engaging corresponding fluid lift mechanisms, to uplift through its corresponding FDTs path about the same amount of fluid as that discharged by its corresponding FTCs upon descent from said upper fluid tank on said lower fluid tank, wherein said FTCs provide a triggering or operating force to activate or deactivate corresponding fluid transfer path controls, corresponding fluid lift mechanisms, and corresponding FTCRPs, wherein physical contact is made directly between corresponding FTCs and corresponding fluid lift mechanisms associated with corresponding fluid transfer path controls and corresponding FTCRPs that sets them into motion at a corresponding strike point contact junction (SPCJ), said at least one electric generator is being powered by said plurality of FTC lift assemblies, wherein said at least one electric generator delivers power to the grid, wherein, after said system is initiated, for said system to operate in its modular expansion form requires introduction into said motion processes a mechanical sequence, and wherein said mechanical sequence is for command and control to synchronize and regulate said motion processes of its operational components throughout operation of said system; and at least one power source providing energy to initiate operation and said motion processes of said system by triggering a corresponding FTCEP, wherein said at least one power source also re-initiates said motion processes of said system when said motion processes stop.

2. The system for producing energy via use of gravity according to claim 1, wherein said upper fluid tank and said lower fluid tank are contiguous.

3. The system for producing energy via use of gravity according to claim 1, wherein said system is in an expanded modular design such that motion of one Multiple Energy Producing Unit (MEPU) in said expanded modular design affects motion in a corresponding affected MEPU which in turn affects a next corresponding affected MEPU until said sequence starts over again in an operational state of motion.

4. The system for producing energy via use of gravity according to claim 1, wherein said fluid lift mechanism is a plurality of lift assembly of desired mechanical advantage (LADMAs), and wherein said LADMAs are pulley systems of desired mechanical advantage, wherein each LADMA is a force multiplier utilizing its pulley principles to uplift a corresponding DPA and, with it, to uplift fluid resting upon said corresponding DPA from inside said lower fluid tank onto said upper fluid tank through a corresponding FDT path.

5. The system for producing energy via use of gravity according to claim 4, wherein each of said LADMAs comprises a kinetic energy strike platform (KESP).

6. The system for producing energy via use of gravity according to claim 1, wherein desired mechanical advantage (MA) is MA=2 or MA=4 or MA=8 and so on, wherein said desired mechanical advantage is implemented according to desired design of said system, and wherein the higher the MA of said system the higher the uplift force would be as well as the higher the vertical separation between said upper fluid tank and said lower fluid tank and therefore the higher the potential energy and the kinetic energy of said system.

7. The system for producing energy via use of gravity according to claim 1, wherein the larger the fluid capacity of said FTCs and an analogous fluid capacity of corresponding FDTs increase the potential energy and the kinetic energy of said system.

8. The system for producing energy via use of gravity according to claim 1, further comprising lift door cones (LDCs).

9. The system for producing energy via use of gravity according to claim 1, wherein each FTC comprises at least one engaging bracket (EB).

10. The system for producing energy via use of gravity according to claim 1, wherein each FTC comprises at least one fluid transport cell inner door (FTCID).

11. The system for producing energy via use of gravity according to claim 1, further comprising a plurality of Multiple Energy Producing Units (MEPUs).

12. The system for producing energy via use of gravity according to claim 1, wherein the descent of the FTCs is a continuous descent.

13. The system for producing energy via use of gravity according to claim 1, wherein the descent of the FTCs is a dynamic descent.

14. The system for producing energy via use of gravity according to claim 1, wherein said at least one FTCEP is a plurality of FTCEPs, and wherein, at steady state, one of said FTCEPs supports a corresponding FTC at said upper fluid tank and initiates said motion processes of said system while the rest of said FTCEPs could start or stop said motion processes at any point in said operation of said system by employment of any of said FTCEPs activating a corresponding tension point when said system stops.

15. The system for producing energy via use of gravity according to claim 1, wherein said fluid lift support assembly is a pulley support assembly (PSA), wherein said plurality of fluid lift systems is a plurality of pulley and cable systems, and wherein said plurality of fluid lift mechanisms is a plurality of pulleys and a plurality of cables.

16. The system for producing energy via use of gravity according to claim 1, wherein said at least one FTCEP is a plurality of FTCEPs, and wherein said at least one power source also re-initiates said motion processes of said system when said motion processes stop at an affected, corresponding FTC pair section of said system, and wherein said system is reset for re-initiation of said motion processes at said affected, corresponding FTC pair section of said system.

17. The system for producing energy via use of gravity according to claim 1, wherein said upper fluid tank further comprises Fluid Feeding Bays (FFBs), wherein each of said FFBs comprises a fluid ejection gate (Ge), a fluid regulating gate (Gr), and a fluid emergency shut-off gate (Gx), wherein FFBs are physical outward bay extensions of perimeter walls of said upper fluid tank extending outward of main perimeter of said upper fluid tank wall formation as a continuous part of said upper fluid tank in order to carry said fluid of said upper fluid tank to a distance away from a main perimeter wall of said upper fluid tank for a more efficient distribution of said fluid of said upper fluid tank, wherein, from there, said fluid of said upper fluid tank will be ready, when called upon, to be transferred into corresponding Fluid Transport Cell (FTC), wherein said fluid of said upper fluid tank transfers from said FFBs into its corresponding FTCs through its corresponding Ge will contribute and facilitate said system's downward controlled fluid transfer that will provide the required energy force to operate electric generators (EGs) via gravity that will, in turn, provide electricity to the grid.

18. The system for producing energy via use of gravity according to claim 1, wherein said fluid lift mechanism is a plurality of lift assembly of desired mechanical advantage (LADMAs) together with a plurality of lever mechanisms, wherein said LADMAs are pulley systems of desired mechanical advantage, wherein each LADMA is a force multiplier utilizing its pulley principles to uplift corresponding DPA and, with it, to uplift fluid resting upon corresponding DPA from inside said lower fluid tank onto said upper fluid tank through a corresponding FDT path, and wherein each lever mechanism is a force multiplier utilizing a principle of lever mechanism to uplift a corresponding DPA and, with it, to uplift fluid resting upon said corresponding DPA from inside said lower fluid tank onto said upper fluid tank through a corresponding FDT path.

19. A system for producing energy via use of gravity, said system comprising:

a fluid lift support assembly comprising a supporting structure, a plurality of electric motors, and a plurality of fluid lift systems, wherein said fluid lift systems are secured to said supporting structure, wherein said system for producing energy is set to a potential status, at t=0, prior to initiation of operation and motion processes of said system, wherein said fluid lift systems comprise a plurality of fluid lift mechanisms that engage in said operation and in said motion processes of said system via electromechanical contact, and wherein said electric motors are in operational communication with said fluid lift systems to carry out said operation and said motion processes of said system;

a fluid tank system comprising an upper fluid tank, a lower fluid tank, and at least two fluid transfer path controls for each of at least two fluid transfer paths, wherein said fluid tanks are positioned vertically with respect to one another, wherein said fluid tanks are in communication with said fluid lift systems and said electric motors to operate and to set in said motion processes of said system, wherein each of said fluid tanks comprises a sufficient amount of fluid, wherein said upper fluid tank comprises at least two extensions for transferring fluid along said fluid transfer paths from said upper fluid tank into at least two corresponding fluid transports cells (FTCs), and further comprises at least two fluid transport cell release platforms (FTCRPs), wherein each fluid transfer path includes at least two corresponding fluid transfer path controls to regulate the transfer of fluid in and out of said fluid transfer path, wherein said lower fluid tank is positioned on a supporting base and comprises a lower fluid tank platform, wherein said lower fluid tank collects descending fluid from said upper fluid tank via corresponding FTCs of said at least two FTCs that descend via gravity from said upper fluid tank, wherein said lower fluid tank platform comprises at least one opening that enables fluid from descending FTCs of said at least two FTCs to enter into said lower fluid tank, and wherein said at least two fluid transport cell release platforms (FTCRPs) provide means of temporary support to potential heights on said upper fluid tank and release from said potential heights to descend corresponding FTCs as corresponding FTCs are designed to operate in descending and ascending motion processes, and wherein said FTCRPs serve to stabilize corresponding FTCs and temporarily lock it in place, upon its return from said lower fluid tank to a potential state position on said upper fluid tank in a continuous fluid recycling process once again, wherein corresponding FTCs will initiate the same mechanisms for a next round of fluid entry into said fluid transfer paths while corresponding FTCs simultaneously will deny fluid entry to a corresponding fluid transfer path which in turn will adhere to said descending and ascending motion processes;

at least two fluid displacement tanks (FDTs) in communication with said fluid lift systems, said plurality of electric motors, corresponding FTCs, corresponding fluid lift mechanisms, and said upper and lower fluid tanks, wherein each of said FDTs comprises an upper section, a lower section connected vertically to said upper section, and a Between Tank Door Assembly (BTDA) disposed between said upper section and said lower section, wherein said upper section comprises an upper end and a lower end, wherein said lower section comprises an upper end and a lower end, and is sufficiently submerged in the fluid that is present in said lower fluid tank, wherein said lower end of said upper section is connected to said upper end of said lower section, wherein said upper section is thinner in length and width but taller in height than said lower section, wherein said upper section and said lower section create a fluid transfer path from inside said lower fluid tank onto said upper fluid tank, and wherein said BTDA prevents backflow of fluid from said upper section to enter said lower section;

at least two fluid lift mechanisms, wherein each of said at least two fluid lift mechanisms is in communication with corresponding FDT, said fluid tank system, at least one corresponding electric motor, and corresponding FTC, wherein said fluid lift mechanism provides a lifting force to each corresponding door platform assembly (DPA) which will elevate fluid located above said corresponding DPA and within said lower section of a corresponding FDT, from inside said lower fluid tank back up onto said upper fluid tank, wherein upon lift of a corresponding DPA, the volume of fluid within said lower section of corresponding FDTs will be displaced into said upper section of corresponding FDTs, and the already existing fluid within said upper section of corresponding FDTs will be ejected or displaced onto said upper fluid tank of about equal volume to said volume displaced from said lower section of corresponding FDTs thus achieving potential fluid height and recycling in the upward direction resulting in increased potential and kinetic energies of said system;

at least one FTC lift assembly in communication with said fluid lift systems, said plurality of electric motors, said at least two FTCRPs, said at least two fluid lift mechanisms, said at least two FDTs, said at least two fluid transfer path controls, at least one electric generator (EG), and said upper and lower fluid tanks, wherein each FTC lift assembly moves corresponding FTCs in a vertical motion, upward and downward, and provides controlled descent of potential fluids through corresponding FTCs, wherein each of said at least one FTC lift assembly powers a corresponding electric generator via gravity thus producing electricity to the grid, wherein said FTCs act as potential fluid transport containers of controlled fluid descent from said upper fluid tank onto said lower fluid tank and act as power givers of motion to a corresponding electric generator, wherein said FTCs facilitate potential controlled descent of fluid and will drive a corresponding electric generator and that will supply electricity to the grid, wherein descending FTCs provide the required force, upon engaging said fluid lift mechanisms, to uplift through its corresponding FDTs path about the same amount of fluid as that discharged by its corresponding FTCs upon descent from said upper fluid tank on said lower fluid tank, wherein one of said FTCs provides a triggering or operating force to activate or deactivate corresponding fluid transfer path controls, corresponding fluid lift mechanisms, and corresponding FTCRPs, wherein electrical switch contact is made by corresponding FTCs at a corresponding strike point contact junction (SPCJ), a corresponding trigger switch (TS) where an electric power source is connecting, or disconnecting by the absence of such contact, corresponding electric motors that will operate corresponding fluid transfer path controls, corresponding fluid lift mechanisms and corresponding FTCRPs;

said at least one electric generator is powered by said at least one FTC lift assembly, wherein said at least one electric generator delivers power to the grid, wherein said plurality of electric motors are employed in operation of said fluid path controls, wherein said electric motors are in communication via corresponding electric cables to an electric power source, wherein each descending FTC will make electrical contact with its corresponding SPCJ located on said lower tank platform, wherein there are at least two SPCJs, and wherein corresponding FTC will engage or disengage into motion the corresponding fluid path controls, corresponding fluid lift mechanisms, and corresponding FTCRPs by providing the appropriate electric connectivity to their corresponding electric motors by connecting or disconnecting said electric motors during said system's operational process from said electric power source; and said electric power source providing energy to initiate operation and said motion processes of said system by placing an initiation switch in a first position and maintaining it in said first position for duration of said motion processes, wherein said electric power source also provides energy to continue said motion processes of said system.

20. The system for producing energy via use of gravity according to claim 19, wherein said upper fluid tank and said lower fluid tank are contiguous.

21. The system for producing energy via use of gravity according to claim 19, wherein said fluid lift mechanism is at least two lift assemblies of desired mechanical advantage (LADMAs), and wherein said LADMAs are pulley systems of desired mechanical advantage, wherein each LADMA is a force multiplier utilizing its pulley principles to uplift a corresponding DPA and, with it, to uplift fluid resting upon said corresponding DPA from inside said lower fluid tank onto said upper fluid tank through a corresponding FDT path.

22. The system for producing energy via use of gravity according to claim 21, wherein each of said LADMAs comprises a kinetic energy strike platform (KESP).

23. The system for producing energy via use of gravity according to claim 19, wherein desired mechanical advantage (MA) is MA=2 or MA=4 or MA=8 and so on, wherein said desired mechanical advantage is implemented according to desired design of said system, and wherein the higher the MA of said system the higher the uplift force would be as well as the higher the vertical separation between said upper fluid tank and said lower fluid tank and therefore the higher the potential energy and the kinetic energy of said system.

24. The system for producing energy via use of gravity according to claim 19, wherein the larger the fluid capacity of said FTCs and an analogous fluid capacity of corresponding FDTs increase the potential energy and the kinetic energy of said system.

25. The system for producing energy via use of gravity according to claim 19, further comprising lift door cones (LDC).

26. The system for producing energy via use of gravity according to claim 19, wherein each FTC comprises at least one engaging bracket (EB).

27. The system for producing energy via use of gravity according to claim 19, wherein each FTC comprises at least one fluid transport cell inner door (FTCID).

28. The system for producing energy via use of gravity according to claim 19, further comprising one Multiple Energy Producing Unit (MEPU).

29. The system for producing energy via use of gravity according to claim 19, wherein said upper fluid tank further comprises Fluid Feeding Bays (FFBs), wherein each of said FFBs comprises a fluid ejection gate (Ge), a fluid regulating gate (Gr), and a fluid emergency shut-off gate (Gx), wherein FFBs are physical outward bay extensions of perimeter walls of said upper fluid tank extending outward of main perimeter of said upper fluid tank wall formation as a continuous part of said upper fluid tank in order to carry said fluid of said upper fluid tank to a distance away from a main perimeter wall of said upper fluid tank for a more efficient distribution of said fluid of said upper fluid tank, wherein, from there, said fluid of said upper fluid tank will be ready, when called upon, to be transferred into corresponding Fluid Transport Cell (FTC), wherein said fluid of said upper fluid tank transfers from said FFBs into its corresponding FTCs through its corresponding Ge will contribute and facilitate said system's downward controlled fluid transfer that will provide the required energy force to operate electric generators (EGs) via gravity that will, in turn, provide electricity to the grid.

30. The system for producing energy via use of gravity according to claim 19, wherein said electric motors are electric motors with built-in, adjustable time delays.

31. The system for producing energy via use of gravity according to claim 19, wherein said fluid lift mechanism is a plurality of lift assembly of desired mechanical advantage (LADMAs) together with a plurality of lever mechanisms, wherein said LADMAs are pulley systems of desired mechanical advantage, wherein each LADMA is a force multiplier utilizing its pulley principles to uplift corresponding DPA and, with it, to uplift fluid resting upon corresponding DPA from inside said lower fluid tank onto said upper fluid tank through a corresponding FDT path, and wherein each lever mechanism is a force multiplier utilizing a principle of lever mechanism to uplift a corresponding DPA and, with it, to uplift fluid resting upon said corresponding DPA from inside said lower fluid tank onto said upper fluid tank through a corresponding FDT path.

32. A system for producing energy via use of gravity, said system comprising:
  a fluid lift support assembly comprising a supporting structure, a plurality of electric motors, and a plurality of fluid lift systems,
  wherein said fluid lift systems are secured to said supporting structure,
  wherein said system for producing energy is set to a potential status, at t=0, prior to initiation of operation and motion processes of said system,
  wherein said fluid lift systems comprise a plurality of fluid lift mechanisms that engage in said operation and in said motion processes of said system via electromechanical contact, and wherein said electric motors are in operational communication with said fluid lift systems to carry out said operation and said motion processes of said system;

a fluid tank system comprising an upper fluid tank, a lower fluid tank, and a plurality of fluid transfer path controls, wherein said fluid tanks are positioned vertically with respect to one another, wherein said fluid tanks are in communication with said fluid lift systems and said electric motors to operate and to set in said motion processes of said system, wherein each of said fluid tanks comprises a sufficient amount of fluid, wherein said upper fluid tank comprises a plurality of extensions for transferring fluid along a plurality of fluid transfer paths from said upper fluid tank into corresponding fluid transports cells of a plurality of fluid transports cells (FTCs), and further comprises a plurality of fluid transport cell release platforms (FTCRPs) and at least one fluid transport cell emergency platform (FTCEP), wherein at least one of said FTCEPs provides energy to initiate said system, wherein at least one of said FTCEPs also re-initiates said motion processes of said system when said motion processes stop, wherein each fluid transfer path includes corresponding fluid transfer path controls to regulate the transfer of fluid in and out of said fluid transfer path, wherein said lower fluid tank is positioned on a supporting surface and comprises a lower fluid tank platform, wherein said lower fluid tank collects descending fluid from said upper fluid tank via corresponding FTCs that descend via gravity from said upper fluid tank, wherein said lower fluid tank platform comprises at least one opening that enables fluid from descending FTCs of said plurality of FTCs to enter into said lower fluid tank, and wherein said FTCRPs provide means of temporary support to potential heights on said upper fluid tank and release from said potential heights to descend their corresponding FTCs as corresponding FTCs are designed to operate in descending and ascending motion processes, and wherein said FTCRPs serve to stabilize corresponding FTCs and temporarily lock them in place, upon their return from said lower fluid tank to a potential state position on said upper fluid tank in a continuous fluid recycling process once again, wherein another affected set of corresponding FTCs will be triggered to initiate the same mechanisms for a next round of fluid entry into said plurality of fluid transfer paths while corresponding FTCs simultaneously will deny fluid entry to corresponding plurality of fluid transfer paths which in turn will adhere to said descending and ascending motion processes;

a plurality of fluid displacement tanks (FDTs) in communication with said fluid lift systems, said plurality of electric motors, corresponding FTCs, corresponding fluid lift mechanisms, and said upper and lower fluid tanks, wherein each of said FDTs comprises an upper section, a lower section connected vertically to said upper section, and a Between Tank Door Assembly (BTDA) disposed between said upper section and said lower section, wherein said upper section comprises an upper end and a lower end, wherein said lower section comprises an upper end and a lower end, and is sufficiently submerged in the fluid that is present in said lower fluid tank, wherein said lower end of said upper section is connected to said upper end of said lower section, wherein said upper section is thinner in length and width but taller in height than said lower section, wherein said upper section and said lower section create a fluid transfer path from inside said lower fluid tank onto said upper fluid tank, and wherein said BTDA prevents backflow of fluid from said upper section to enter said lower section;

said fluid lift mechanisms, wherein each of said fluid lift mechanisms is in communication with corresponding FDT, said fluid tank system, at least one corresponding electric motor, and corresponding FTC, wherein each of said fluid lift mechanisms provides a lifting force to each corresponding door platform assembly (DPA) which will elevate fluid located above said corresponding DPA and within said lower section of a corresponding FDT, from inside said lower fluid tank back up onto said upper fluid tank, wherein upon lift of corresponding DPAs, the volume of fluid within said lower section of corresponding FDTs will be displaced into said upper section of corresponding FDTs, and the already existing fluid within said upper section of corresponding FDTs will be ejected or displaced onto said upper fluid tank of about equal volume to said volume displaced from said lower section of corresponding FDTs thus achieving potential fluid height and recycling in the upward direction resulting in increased potential and kinetic energies of said system; and a plurality of FTC lift assemblies in communication with said fluid lift systems, said plurality of electric motors, said plurality of FTCRPs, said at least one FTCEP, said plurality of fluid lift mechanisms, said plurality of FDTs, said plurality of fluid transfer path controls, at least one electric generator (EG), and said upper and lower fluid tanks, wherein each of said FTC lift assemblies moves corresponding FTCs in a vertical motion, upward and downward, and provides controlled descent of potential fluids through corresponding FTCs, wherein each of said FTC lift assemblies powers a corresponding electric generator via gravity thus producing electricity to the grid, wherein said FTCs act as potential fluid transport containers of controlled fluid descent from said upper fluid tank onto said lower fluid tank and act as power givers of motion to a corresponding electric generator, wherein said FTCs facilitate potential controlled descent of fluid and will drive a corresponding electric generator and that will supply electricity to the grid, wherein descending FTCs provide the required force, upon engaging corresponding fluid lift mechanisms, to uplift through its corresponding FDTs path about the same amount of fluid as that discharged by its corresponding FTCs upon descent from said upper fluid tank on said lower fluid tank, wherein said FTCs provide a triggering or operating force to activate or deactivate corresponding fluid transfer path controls, corresponding fluid lift mechanisms, and corresponding FTCRPs, wherein electrical switch contact is made by corresponding FTCs at a corresponding SPCJ and a corresponding trigger switch (TS) where an electric power source is connecting, or disconnecting by the absence of such contact, corresponding electric motors that will operate corresponding fluid transfer path controls, corresponding fluid lift mechanisms, and corresponding FTCRPs, said at least one electric generator is powered by said plurality of FTC lift assemblies, wherein said at least one electric generator delivers power to the grid, wherein, after said system is initiated, for said system to operate in its modular expansion form requires introduction into said motion processes an electromechanical sequence, and wherein said electromechanical sequence is for command and control to synchronize and regulate said motion processes of its operational components throughout operation of said system; and at least one power source providing energy to initiate operation and said motion processes of said system by triggering a corresponding FTCEP, wherein said at least one power source also re-initiates said motion processes of said system when said motion processes stop, wherein said system is reset for re-initiation of said motion processes at an affected, corresponding FTC pair section of said system, and wherein said at least one power source also provides energy to continue and maintain said motion process of said system.

33. The system for producing energy via use of gravity according to claim 32, wherein said upper fluid tank and said lower fluid tank are contiguous.

34. The system for producing energy via use of gravity according to claim 32, wherein said system is in an expanded modular design such that motion of one Multiple Energy Producing Unit (MEPU) in said expanded modular design affects motion in a corresponding affected MEPU which in turn affects a next corresponding affected MEPU until said sequence starts over again in a continuous state of motion.

35. The system for producing energy via use of gravity according to claim 32, wherein said fluid lift mechanism is a plurality of lift assembly of desired mechanical advantage (LADMAs), and wherein said LADMAs are pulley systems of desired mechanical advantage, wherein each LADMA is a force multiplier utilizing its pulley principles to uplift a corresponding DPA and, with it, to uplift fluid resting upon said corresponding DPA from inside said lower fluid tank onto said upper fluid tank through a corresponding FDT path.

36. The system for producing energy via use of gravity according to claim 35, wherein each of said LADMAs comprises a kinetic energy strike platform (KESP).

37. The system for producing energy via use of gravity according to claim 32, wherein desired mechanical advantage (MA) is MA=2 or MA=4 or MA=8 and so on, wherein said desired mechanical advantage is implemented according to desired design of said system, and wherein the higher the MA of said system the higher the uplift force would be as well as the higher the vertical separation between said upper fluid tank and said lower fluid tank and therefore the higher the potential energy and the kinetic energy of said system.

38. The system for producing energy via use of gravity according to claim 32, wherein the larger the fluid capacity of said FTCs and an analogous fluid capacity of corresponding FDTs increase the potential energy and the kinetic energy of said system.

39. The system for producing energy via use of gravity according to claim 32, further comprising lift door cones (LDCs).

40. The system for producing energy via use of gravity according to claim 32, wherein each FTC comprises at least one engaging bracket (EB).

41. The system for producing energy via use of gravity according to claim 32, wherein each FTC comprises at least one fluid transport cell inner door (FTCID).

42. The system for producing energy via use of gravity according to claim 32, further comprising a plurality of Multiple Energy Producing Units (MEPUs).

43. The system for producing energy via use of gravity according to claim 32, wherein the descent of the FTCs is a continuous descent.

44. The system for producing energy via use of gravity according to claim 32, wherein the descent of the FTCs is a dynamic descent.

45. The system for producing energy via use of gravity according to claim 32, wherein at steady state, a corresponding FTCEP of said at least one FTCEP supports a corresponding FTC at said upper fluid tank and initiates said motion processes of said system, and wherein a corresponding FTCEP of said at least one FTCEP could start or stop said motion processes at any point in said operation of said system by employment of a corresponding FTCEP of said at least one FTCEP activating a corresponding tension point.

46. The system for producing energy via use of gravity according to claim 32, wherein said upper fluid tank further comprises Fluid Feeding Bays (FFBs), wherein each of said FFBs comprises a fluid ejection gate (Ge), a fluid regulating gate (Gr), and a fluid emergency shut-off gate (Gx), wherein FFBs are physical outward bay extensions of perimeter walls of said upper fluid tank extending outward of main perimeter of said upper fluid tank wall formation as a continuous part of said upper fluid tank in order to carry said fluid of said upper fluid tank to a distance away from a main perimeter wall of said upper fluid tank for a more efficient distribution of said fluid of said upper fluid tank, wherein, from there, said fluid of said upper fluid tank will be ready, when called upon, to be transferred into corresponding Fluid Transport Cell (FTC), wherein said fluid of said upper fluid tank transfers from said FFBs into its corresponding FTCs through its corresponding Ge will contribute and facilitate said system's downward controlled fluid transfer that will provide the required energy force to operate electric generators (EGs) via gravity that will, in turn, provide electricity to the grid.

47. The system for producing energy via use of gravity according to claim 32, wherein said fluid lift support assembly is a pulley support assembly (PSA), wherein said plurality of fluid lift systems is a plurality of pulley and cable systems, and wherein said plurality of fluid lift mechanisms is a plurality of pulleys and a plurality of cables.

48. The system for producing energy via use of gravity according to claim 47, wherein said fluid lift mechanism is a plurality of lift assembly of desired mechanical advantage (LADMAs) together with a plurality of lever mechanisms, wherein said LADMAs are pulley systems of desired mechanical advantage, wherein each LADMA is a force multiplier utilizing its pulley principles to uplift corresponding DPA and, with it, to uplift fluid resting upon corresponding DPA from inside said lower fluid tank onto said upper fluid tank through a corresponding FDT path, and wherein each lever mechanism is a force multiplier utilizing a principle of lever mechanism to uplift a corresponding DPA and, with it, to uplift fluid resting upon said corresponding DPA from inside said lower fluid tank onto said upper fluid tank through a corresponding FDT path.

* * * * *